United States Patent
Jeon et al.

(10) Patent No.: US 11,683,846 B2
(45) Date of Patent: Jun. 20, 2023

(54) RANDOM ACCESS RESPONSE RECEPTION FOR A TWO-STEP RANDOM ACCESS PROCEDURE

(71) Applicant: Ofinno, LLC, Reston, VA (US)

(72) Inventors: Hyoungsuk Jeon, Centreville, VA (US); Esmael Hejazi Dinan, McLean, VA (US); Yunjung Yi, Vienna, VA (US)

(73) Assignee: Ofinno, LLC, Reston, VA (US)

(*) Notice: Subject to any disclaimer, the term of this patent is extended or adjusted under 35 U.S.C. 154(b) by 0 days.

(21) Appl. No.: 17/876,520

(22) Filed: Jul. 28, 2022

(65) Prior Publication Data

US 2022/0377814 A1 Nov. 24, 2022

Related U.S. Application Data

(63) Continuation of application No. 16/864,288, filed on May 1, 2020, now Pat. No. 11,412,550.
(Continued)

(51) Int. Cl.
| | | |
|---|---|---|
| *H04W 72/04* | (2023.01) | |
| *H04W 74/08* | (2009.01) | |
| *H04W 72/0446* | (2023.01) | |
| *H04W 76/11* | (2018.01) | |
| *H04W 76/27* | (2018.01) | |

(Continued)

(52) U.S. Cl.
CPC ....... *H04W 74/0841* (2013.01); *H04L 1/1642* (2013.01); *H04W 72/0446* (2013.01); *H04W 72/23* (2023.01); *H04W 76/11* (2018.02); *H04W 76/27* (2018.02); *H04W 80/02* (2013.01)

(58) Field of Classification Search
CPC .......... H04W 74/0841; H04W 72/042; H04W 72/0446; H04W 76/11; H04W 76/27; H04W 80/02; H04L 1/1642; H04L 5/0094; H04L 5/0044; H04L 5/0053
See application file for complete search history.

(56) References Cited

U.S. PATENT DOCUMENTS

| | | | |
|---|---|---|---|
| 10,993,128 B2 | 4/2021 | Wei et al. | |
| 2014/0293946 A1* | 10/2014 | Suzuki | H04W 72/23 370/329 |

(Continued)

OTHER PUBLICATIONS

3GPP TS 38.211 V15.5.0 (Mar. 2019); Technical Specification; 3rd Generation Partnership Project; Technical Specification Group Radio Access Network; NR; Physical channels and modulation; (Release 15).

(Continued)

*Primary Examiner* — Jamal Javaid
(74) *Attorney, Agent, or Firm* — Brett K. Gardner; Kavon Nasabzadeh; Jacob L. Mangan

(57) ABSTRACT

A wireless device may transmit a first message, for a random access procedure, including a contention resolution identifier of the wireless device. The wireless device may receive, via a first slot indicated by downlink control information (DCI), a first response of the first message. The first response may include the contention resolution identifier and indicate a slot offset and a start symbol. The wireless device may receive a second response of the first message from the start symbol of a second slot, wherein the second slot is based on a time offset and the slot offset with respect to the first slot.

20 Claims, 38 Drawing Sheets

Related U.S. Application Data

(60) Provisional application No. 62/842,344, filed on May 2, 2019.

(51) Int. Cl.
*H04W 80/02* (2009.01)
*H04L 1/1607* (2023.01)
*H04W 72/23* (2023.01)

(56) References Cited

U.S. PATENT DOCUMENTS

| | | | |
|---|---|---|---|
| 2019/0082431 A1* | 3/2019 | Yi | H04L 5/0053 |
| 2019/0149365 A1 | 5/2019 | Chatterjee et al. | |
| 2019/0174502 A1 | 6/2019 | Li et al. | |
| 2019/0223084 A1* | 7/2019 | John Wilson | H04W 76/11 |

OTHER PUBLICATIONS

3GPP TS 38.212 V15.5.0 (Mar. 2019); Technical Specification; 3rd Generation Partnership Project; Technical Specification Group Radio Access Network; NR; Multiplexing and channel coding; (Release 15).
3GPP TS 38.213 V15.5.0 (Mar. 2019); Technical Specification; 3rd Generation Partnership Project; Technical Specification Group Radio Access Network; NR;Physical layer procedures for control (Release 15).
3GPP TS 38.214 V15.5.0 (Mar. 2019); Technical Specification; 3rd Generation Partnership Project; Technical Specification Group Radio Access Network; NR; Physical layer procedures for data; (Release 15).
3GPP TS 38.300 V15.5.0 (Mar. 2019); Technical Specification; 3rd Generation Partnership Project; Technical Specification Group Radio Access Network; NR; NR and NG-RAN Overall Description; Stage 2; (Release 15).
3GPP TS 38.321 V15.5.0 (Mar. 2019); Technical Specification; 3rd Generation Partnership Project; Technical Specification Group Radio Access Network; NR; Medium Access Control (MAC) protocol specification; (Release 15).
3GPP TS 38.331 V15.5.0 (Mar. 2019); Technical Specification; 3rd Generation Partnership Project; Technical Specification Group Radio Access Network; NR; Radio Resource Control (RRC) protocol specification; (Release 15).
3GPP TSG RAN WG1 Meeting #96bis; Xi'an, China, Apr. 8-12, 2019; Title: RAN1 Chairman's Notes.
R1-1903878; 3GPP TSG RAN WG1 Meeting #96bis; Xi'an, China, Apr. 8-12, 2019; Source: ZTE, Sanechips; Title: On the channel structure of msgA; Agenda item: 7.2.1.1.
R1-1903879; 3GPP TSG RAN WG1 Meeting #96bis; Xi'an, China, Apr. 8-Apr. 12, 2019; Source: ZTE, Sanechips; Title: On 2-Step RACH Procedures; Agenda Item: 7.2.1.2.
R1-1903923; 3GPP TSG RAN WG1 Meeting #96bis; Xi'an, China, Apr. 8-12, 2019; Agenda Item: 7.2.1.1; Source: Huawei, HiSilicon; Title: Further discussion on channel structure for 2-step RACH.
R1-1903924; 3GPP TSG RAN WG1 Meeting #96bis; Xi'an, China, Apr. 8-Apr. 12, 2019; Agenda Item: 7.2.1.2; Source: Huawei, HiSilicon; Title: Further discussion on 2-step RACH procedure.
R1-1904059; 3GPP TSG RAN WG1 #96bis; Xi'an, China, Apr. 8-12, 2019; Source: vivo; Title: Discussion on channel structure for 2-step RACH; Agenda Item: 7.2.1.1.
R1-1904060; 3GPP TSG RAN WG1 #96bis; Xi'an, China, Apr. 8-12, 2019; Source: vivo; Title: Discussion on 2-step RACH procedure; Agenda Item: 7.2.1.2.
R1-1904196; 3GPP TSG RAN WG1 Meeting #96bis; Xi'an, China, Apr. 8-12, 2019; Agenda Item: 7.2.1.1; Source: LG Electronics; Title: Channel Structure for Two-Step RACH.
R1-1904197; 3GPP TSG RAN WG1 Meeting #96bis; Xian, China, Apr. 8-12, 2019; Agenda Item: 7.2.1.2; Source: LG Electronics; Title: Discussion on 2step RACH Procedure.
R1-1904247; 3GPP TSG RAN WG1 #96bis; Xi'an, China, Apr. 8-12, 2019; Agenda Item: 7.2.1.2; Source: Sony; Title: Discussion on Procedure for 2-step RACH.
R1-1904280; 3GPP TSG RAN WG1 #96bis; Xi'an, China, Apr. 8-12, 2019; Source: Intel Corporation; Title: Channel structure for 2-step RACH; Agenda item: 7.2.1.1.
R1-1904281; 3GPP TSG RAN WG1 #96bis; Xi'an, China, Apr. 8-12, 2019; Source: Intel Corporation; Title: Procedure for 2-step RACH; Agenda item: 7.2.1.2.
R1-1904392; 3GPP TSG RAN WG1 #96bis; Xi'an, China, Apr. 8-12, 2019; Agenda item: 7.2.1.1; Source: Samsung; Title: Channel Structure for Two-Step RACH.
R1-1904393; 3GPP TSG RAN WG1 #96bis; Xi'an, China, Apr. 8-12, 2019; Agenda item: 7.2.1.2; Source: Samsung; Title: Procedure for Two-step RACH.
R1-1904715; 3GPP TSG RAN WG1 #96bis; Xi'an, China, Apr. 8-12, 2019; Agenda item: 7.2.1.1; Source: Nokia, Nokia Shanghai Bell; Title: On 2-step RACH Channel Structure.
R1-1904716; 3GPP TSG RAN WG1 #96bis; Xi'an, China, Apr. 8-12, 2019; Agenda item: 7.2.1.2; Source: Nokia, Nokia Shanghai Bell; Title: On 2-step RACH Procedure.
R1-1904842; 3GPP TSG-RAN WG1 Meeting #96bis; Xi'an, China, Apr. 8-12, 2019; Agenda Item: 7.2.1.1; Source: Ericsson; Title: Channel Structure for Two-Step RACH.
R1-1904843; 3GPP TSG-RAN WG1 Meeting #96bis; Xi'an, China, Apr. 8-12, 2019; Agenda Item: 7.2.1.2; Source: Ericsson; Title: Procedure for Two-step RACH.
R1-1904848; 3GPP TSG RAN WG1 Meeting #96b; Xi'an, China, Apr. 8-12, 2019; Source: InterDigital Inc.; Title: On PUSCH Transmission in msgA; Agenda item: 7.2.1.1.
R1-1904850; 3GPP TSG RAN WG1 Meeting #96b; Xi'an, China, Apr. 8-12, 2019; Source: InterDigital Inc.; Title: Discussion on Procedures for Two-Step RACH; Agenda item: 7.2.1.1.
R1-1904928; 3GPP TSG RAN WG1 #96bis; Xi'an, China, Apr. 3-12, 2019; Source: Motorola Mobility, Lenovo; Title: 2-step RACH procedure; Agenda item: 7.2.1.2.
R1-1904944; 3GPP TSG RAN WG1 #96bis; Xi'an, China, Apr. 8-12, 2019; Source: NTT DOCOMO, Inc.; Title: Discussion on Channel Structure for Two-Step RACH; Agenda Item: 7.2.1.1.
R1-1904945; 3GPP TSG RAN WG1 #96bis; Xi'an, China, Apr. 8-12, 2019; Source: NTT DOCOMO, Inc.; Title: Discussion on Procedure for Two-step RACH; Agenda Item: 7.2.1.2.
R1-1904992; 3GPP TSG-RAN WG1 Meeting #96Bis; Apr. 8-Apr. 12, 2019; Xi'an, China; Title: Channel Structure for Two-Step RACH; Source: Qualcomm Incorporated; Agenda item: 7.2.1.1.
R1-1904993; 3GPP TSG-RAN WG1 Meeting #96Bis; Apr. 8-Apr. 12, 2019; Xi'an, China; Title: Procedures for Two-Step RACH; Source: Qualcomm Incorporated; Agenda item: 7.2.1.2.
R1-1905051; 3GPP TSG RAN WG1 #96bis; Xi'an, China, Apr. 8-12, 2019; Source: OPPO; Title: On Channel Structure for 2-step RACH; Agenda Item: 7.2.1.1.
R1-1905052; 3GPP TSG RAN WG1 #96bis; Xi'an, China, Apr. 8-12, 2019; Source: OPPO; Title: On Procedure for 2-step RACH; Agenda Item:7.2.1.2.
R2-19xxxxx; 3GPP TSG-RAN WG2 Meeting #105bis; Xi'an, China, Apr. 8-Apr. 12, 2019; Source: R2 Vice Chairman (Mediatek); Title: DRAFT Breakout Session Notes NRUP IAB IIOT NR-U.
3GPP TSG RAN WG2 Meeting #105bis; Xi'an, China, Apr. 8-12, 2019; Source: RAN2 Chairman (Intel); Title: Chair notes.

* cited by examiner

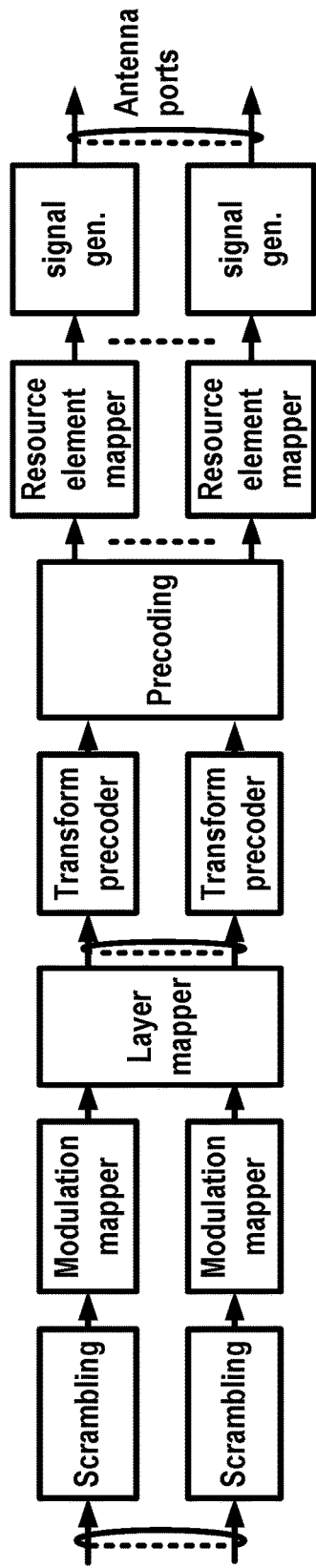
FIG. 4A
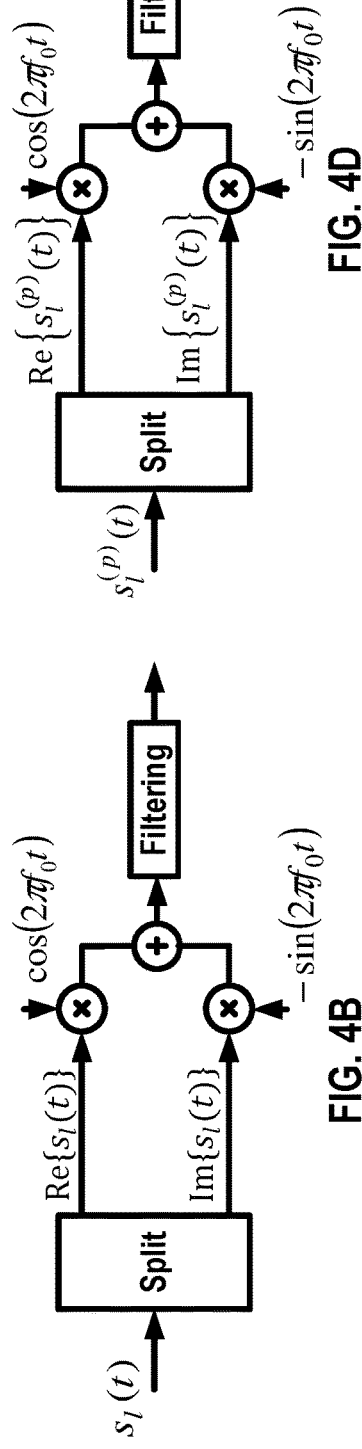
FIG. 4B
FIG. 4D
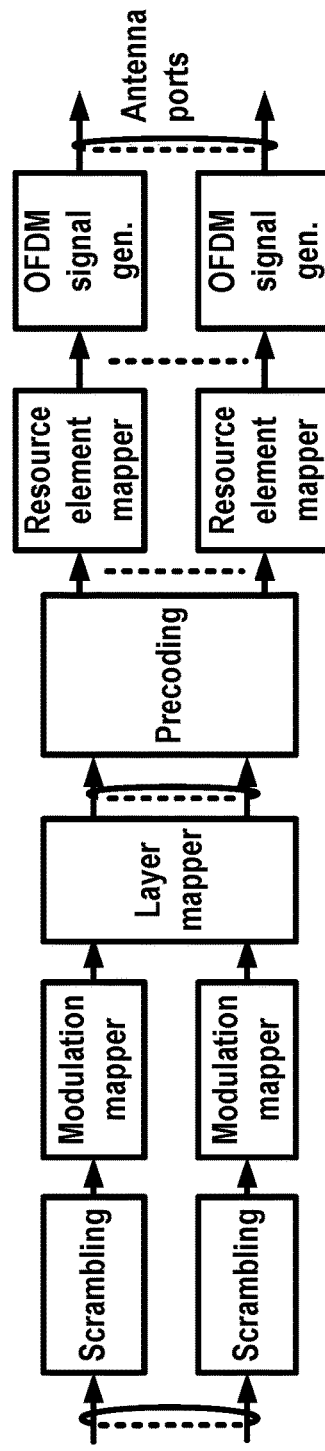
FIG. 4C

PRACH Mask index values

| PRACH Mask Index | Allowed PRACH occasion(s) of SSB |
|---|---|
| 0 | All |
| 1 | PRACH occasion index 1 |
| 2 | PRACH occasion index 2 |
| 3 | PRACH occasion index 3 |
| 4 | PRACH occasion index 4 |
| 5 | PRACH occasion index 5 |
| 6 | PRACH occasion index 6 |
| 7 | PRACH occasion index 7 |
| 8 | PRACH occasion index 8 |
| 9 | Every even PRACH occasion |
| 10 | Every odd PRACH occasion |
| 11 | Reserved |
| 12 | Reserved |
| 13 | Reserved |
| 14 | Reserved |
| 15 | Reserved |

| | |
|---|---|
| R | UE contention resolution identity | Oct 1
| | UE contention resolution identity | Oct 2
| | UE contention resolution identity | Oct 3
| | UE contention resolution identity | Oct 4
| | UE contention resolution identity | Oct 5
| | UE contention resolution identity | Oct 6

FIG. 23A

| | |
|---|---|
| Temporary C-RNTI | Oct 1
| Temporary C-RNTI | Oct 2
| TC-RNT / UE contention resolution identity | Oct 3
| UE contention resolution identity | Oct 4
| UE contention resolution identity | Oct 5
| UE contention resolution identity | Oct 6
| UE contention resolution identity | Oct 7
| UE contention resolution identity | Oct 8

```
┌─────────────────────────────────────────────────────────┐
│ Transmit a 1st message comprising a preamble and a transport │
│                          block                          │
│                          3310                           │
└─────────────────────────────────────────────────────────┘
                             │
                             ▼
┌─────────────────────────────────────────────────────────┐
│ Receive downlink control information indicating a 1st slot offset │
│     and a 1st start symbol number in an allocation table │
│                          3320                           │
└─────────────────────────────────────────────────────────┘
                             │
                             ▼
┌─────────────────────────────────────────────────────────┐
│ Receive, via a 1st slot determined based on the 1st slot offset │
│   and the 1st start symbol number, a 1st response of the 1st │
│ message, the 1st response indicating a 2nd slot offset and a 2nd │
│        start symbol number in the allocation table      │
│                          3330                           │
└─────────────────────────────────────────────────────────┘
                             │
                             ▼
┌─────────────────────────────────────────────────────────┐
│ Determine, for receiving a second response of the first message, │
│                 a second slot based on:                 │
│   the second slot offset starting with respect to the first slot; and │
│      a time offset configured for the second response   │
│                          3340                           │
└─────────────────────────────────────────────────────────┘
                             │
                             ▼
┌─────────────────────────────────────────────────────────┐
│ Receive the second response from a start symbol of the second │
│   slot, the start symbol determined based on the second start │
│                       symbol number                     │
│                          3350                           │
└─────────────────────────────────────────────────────────┘
```

FIG. 33

RANDOM ACCESS RESPONSE RECEPTION FOR A TWO-STEP RANDOM ACCESS PROCEDURE

CROSS-REFERENCE TO RELATED APPLICATIONS

This application is a continuation of U.S. patent application Ser. No. 16/864,288, filed May 1, 2020, which claims the benefit of U.S. Provisional Application No. 62/842,344, filed May 2, 2019, all of which are hereby incorporated by reference in their entireties.

BRIEF DESCRIPTION OF THE DRAWINGS

Examples of several of the various embodiments of the present disclosure are described herein with reference to the drawings.

FIG. 4A, FIG. 4B, FIG. 4C and FIG. 4D are example diagrams for uplink and downlink signal transmission as per an aspect of an embodiment of the present disclosure.

FIG. 19 is an example of PRACH occasion(s) as per an aspect of an embodiment of the present disclosure.

FIG. 23A, and FIG. 23B are example MAC RAR formats as per an aspect of an embodiment of the present disclosure.

FIG. 33 is an example flow diagram as per an aspect of an embodiment of the present disclosure.

DETAILED DESCRIPTION

Figure 1:
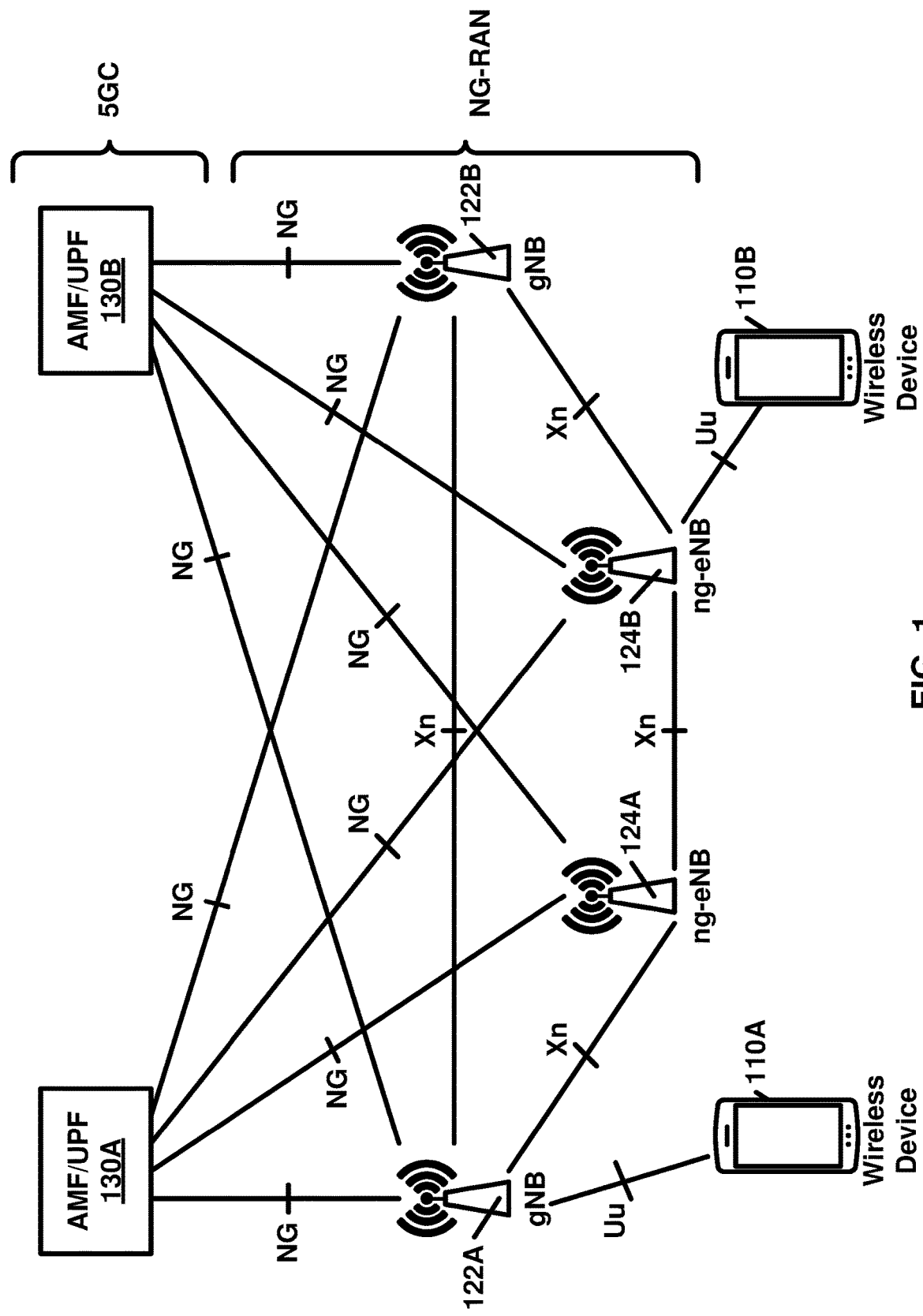
FIG. 1 is a diagram of an example RAN architecture as per an aspect of an embodiment of the present disclosure.

Example embodiments of the present disclosure enable operation of random access. Embodiments of the technology disclosed herein may be employed in the technical field of multicarrier communication systems. More particularly, the embodiments of the technology disclosed herein may relate to one or more random access procedures in multicarrier communication systems.

The following Acronyms are used throughout the present disclosure:

3GPP 3rd Generation Partnership Project
5GC 5G Core Network
ACK Acknowledgement
AMF Access and Mobility Management Function
ARQ Automatic Repeat Request
AS Access Stratum
ASIC Application-Specific Integrated Circuit
BA Bandwidth Adaptation
BCCH Broadcast Control Channel
BCH Broadcast Channel
BPSK Binary Phase Shift Keying
BWP Bandwidth Part
CA Carrier Aggregation
CC Component Carrier
CCCH Common Control CHannel
CDMA Code Division Multiple Access
CN Core Network
CP Cyclic Prefix
CP-OFDM Cyclic Prefix-Orthogonal Frequency Division Multiplex
C-RNTI Cell-Radio Network Temporary Identifier
CS Configured Scheduling
CSI Channel State Information
CSI-RS Channel State Information-Reference Signal
CQI Channel Quality Indicator
CSS Common Search Space
CU Central Unit
DC Dual Connectivity
DCCH Dedicated Control CHannel
DCI Downlink Control Information
DL Downlink
DL-SCH Downlink Shared CHannel
DM-RS DeModulation Reference Signal
DRB Data Radio Bearer
DRX Discontinuous Reception
DTCH Dedicated Traffic CHannel
DU Distributed Unit
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
gNB next generation Node B
HARQ Hybrid Automatic Repeat reQuest
HDL Hardware Description Languages
IE Information Element
IP Internet Protocol
LCID Logical Channel IDentifier
LTE Long Term Evolution
MAC Media Access Control
MCG Master Cell Group
MCS Modulation and Coding Scheme
MeNB Master evolved Node B
MIB Master Information Block
MME Mobility Management Entity
MN Master Node
NACK Negative Acknowledgement
NAS Non-Access Stratum
NG CP Next Generation Control Plane
NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NSSAI Network Slice Selection Assistance Information
O&M Operation and Maintenance
OFDM Orthogonal Frequency Division Multiplexing
PBCH Physical Broadcast CHannel
PCC Primary Component Carrier
PCCH Paging Control CHannel
PCell Primary Cell
PCH Paging CHannel
PDCCH Physical Downlink Control CHannel
PDCP Packet Data Convergence Protocol
PDSCH Physical Downlink Shared CHannel
PDU Protocol Data Unit
PHICH Physical HARQ Indicator CHannel
PHY PHYsical
PLMN Public Land Mobile Network
PMI Precoding Matrix Indicator
PRACH Physical Random Access CHannel
PRB Physical Resource Block
PSCell Primary Secondary Cell
PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QFI Quality of Service Indicator
QoS Quality of Service
QPSK Quadrature Phase Shift Keying
RA Random Access
RACH Random Access CHannel
RAN Radio Access Network
RAT Radio Access Technology
RA-RNTI Random Access-Radio Network Temporary Identifier
RB Resource Blocks
RBG Resource Block Groups
RI Rank Indicator
RLC Radio Link Control
RRC Radio Resource Control
RS Reference Signal
RSRP Reference Signal Received Power
SCC Secondary Component Carrier
SCell Secondary Cell
SCG Secondary Cell Group
SC-FDMA Single Carrier-Frequency Division Multiple Access
SDAP Service Data Adaptation Protocol
SDU Service Data Unit
SeNB Secondary evolved Node B
SFN System Frame Number
S-GW Serving GateWay
SI System Information
SIB System Information Block
SMF Session Management Function
SN Secondary Node
SpCell Special Cell
SRB Signaling Radio Bearer SRS Sounding Reference Signal
SS Synchronization Signal
SSS Secondary Synchronization Signal
sTAG secondary Timing Advance Group
TA Timing Advance
TAG Timing Advance Group
TAI Tracking Area Identifier
TAT Time Alignment Timer
TB Transport Block
TC-RNTI Temporary Cell-Radio Network Temporary Identifier
TDD Time Division Duplex
TDMA Time Division Multiple Access
TTI Transmission Time Interval
UCI Uplink Control Information
UE User Equipment
UL Uplink
UL-SCH Uplink Shared CHannel
UPF User Plane Function
UPGW User Plane Gateway
VHDL VHSIC Hardware Description Language
Xn-C Xn-Control plane
Xn-U Xn-User plane Example embodiments of the disclosure may be implemented using various physical layer modulation and transmission mechanisms. Example transmission mechanisms may comprise, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes comprise, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is an example Radio Access Network (RAN) architecture as per an aspect of an embodiment of the present disclosure. As illustrated in this example, a RAN node may be a next generation Node B (gNB) (e.g. 120A, 120B) providing New Radio (NR) user plane and control plane protocol terminations towards a first wireless device (e.g. 110A). In an example, a RAN node may be a next generation evolved Node B (ng-eNB) (e.g. 124A, 124B), providing Evolved UMTS Terrestrial Radio Access (E-UTRA) user plane and control plane protocol terminations towards a second wireless device (e.g. 110B). The first wireless device may communicate with a gNB over a Uu interface. The second wireless device may communicate with a ng-eNB over a Uu interface. In this disclosure, wireless device 110A and 110B are structurally similar to wireless device 110. Base stations 120A and/or 120B may be structurally similarly to base station 120. Base station 120 may comprise at least one of a gNB (e.g. 122A and/or 122B), ng-eNB (e.g. 124A and/or 124B), and or the like.

A gNB or an ng-eNB may host functions such as: radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of UEs in RRC_INACTIVE state, distribution function for Non-Access Stratum (NAS) messages, RAN sharing, and dual connectivity or tight interworking between NR and E-UTRA.

In an example, one or more gNBs and/or one or more ng-eNBs may be interconnected with each other by means of Xn interface. A gNB or an ng-eNB may be connected by means of NG interfaces to 5G Core Network (5GC). In an example, 5GC may comprise one or more AMF/User Plan Function (UPF) functions (e.g. 130A or 130B). A gNB or an ng-eNB may be connected to a UPF by means of an NG-User plane (NG-U) interface. The NG-U interface may provide delivery (e.g. non-guaranteed delivery) of user plane Protocol Data Units (PDUs) between a RAN node and the UPF. A gNB or an ng-eNB may be connected to an AMF by means of an NG-Control plane (NG-C) interface. The NG-C interface may provide, for example, NG interface management, UE context management, UE mobility management, transport of NAS messages, paging, PDU session management, configuration transfer and/or warning message transmission, combinations thereof, and/or the like.

In an example, a UPF may host functions such as anchor point for intra-/inter-Radio Access Technology (RAT) mobility (when applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

In an example, an AMF may host functions such as NAS signaling termination, NAS signaling security, Access Stratum (AS) security control, inter Core Network (CN) node signaling for mobility between 3rd Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection.

Figure 2A:
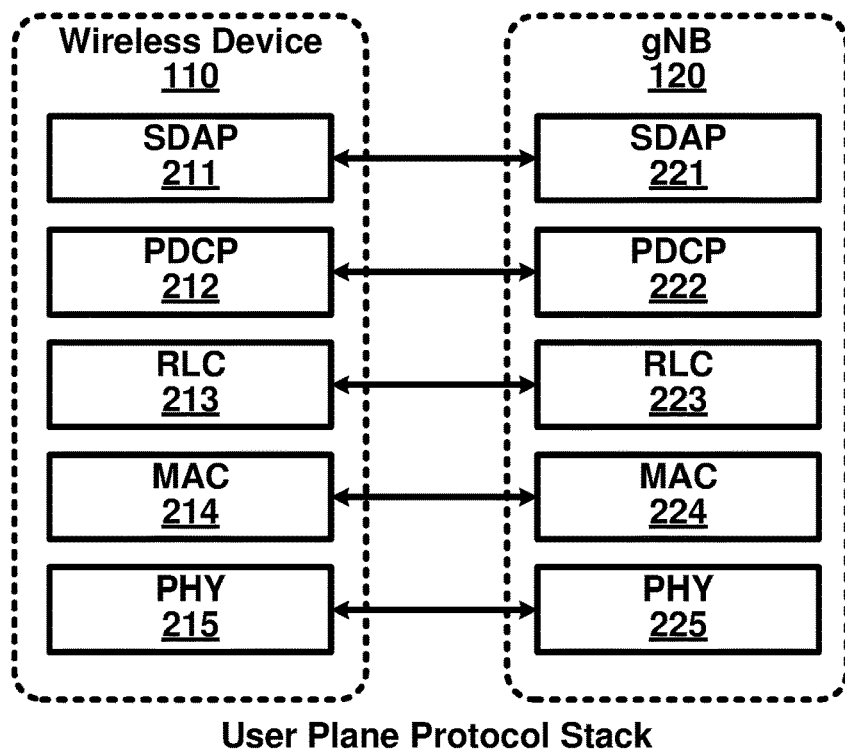
FIG. 2A is a diagram of an example user plane protocol stack as per an aspect of an embodiment of the present disclosure.

FIG. 2A is an example user plane protocol stack, where Service Data Adaptation Protocol (SDAP) (e.g. 211 and 221), Packet Data Convergence Protocol (PDCP) (e.g. 212 and 222), Radio Link Control (RLC) (e.g. 213 and 223) and Media Access Control (MAC) (e.g. 214 and 224) sublayers and Physical (PHY) (e.g. 215 and 225) layer may be terminated in wireless device (e.g. 110) and gNB (e.g. 120) on the network side. In an example, a PHY layer provides transport services to higher layers (e.g. MAC, RRC, etc.). In an example, services and functions of a MAC sublayer may comprise mapping between logical channels and transport channels, multiplexing/demultiplexing of MAC Service Data Units (SDUs) belonging to one or different logical channels into/from Transport Blocks (TBs) delivered to/from the PHY layer, scheduling information reporting, error correction through Hybrid Automatic Repeat request (HARQ) (e.g. one HARQ entity per carrier in case of Carrier Aggregation (CA)), priority handling between UEs by means of dynamic scheduling, priority handling between logical channels of one UE by means of logical channel prioritization, and/or padding. A MAC entity may support one or multiple numerologies and/or transmission timings. In an example, mapping restrictions in a logical channel prioritization may control which numerology and/or transmission timing a logical channel may use. In an example, an RLC sublayer may supports transparent mode (TM), unacknowledged mode (UM) and acknowledged mode (AM) transmission modes. The RLC configuration may be per logical channel with no dependency on numerologies and/or Transmission Time Interval (TTI) durations. In an example, Automatic Repeat Request (ARQ) may operate on any of the numerologies and/or TTI durations the logical channel is configured with. In an example, services and functions of the PDCP layer for the user plane may comprise sequence numbering, header compression and decompression, transfer of user data, reordering and duplicate detection, PDCP PDU routing (e.g. in case of split bearers), retransmission of PDCP SDUs, ciphering, deciphering and integrity protection, PDCP SDU discard, PDCP re-establishment and data recovery for RLC AM, and/or duplication of PDCP PDUs. In an example, services and functions of SDAP may comprise mapping between a QoS flow and a data radio bearer. In an example, services and functions of SDAP may comprise mapping Quality of Service Indicator (QFI) in DL and UL packets. In an example, a protocol entity of SDAP may be configured for an individual PDU session.

Figure 2B:
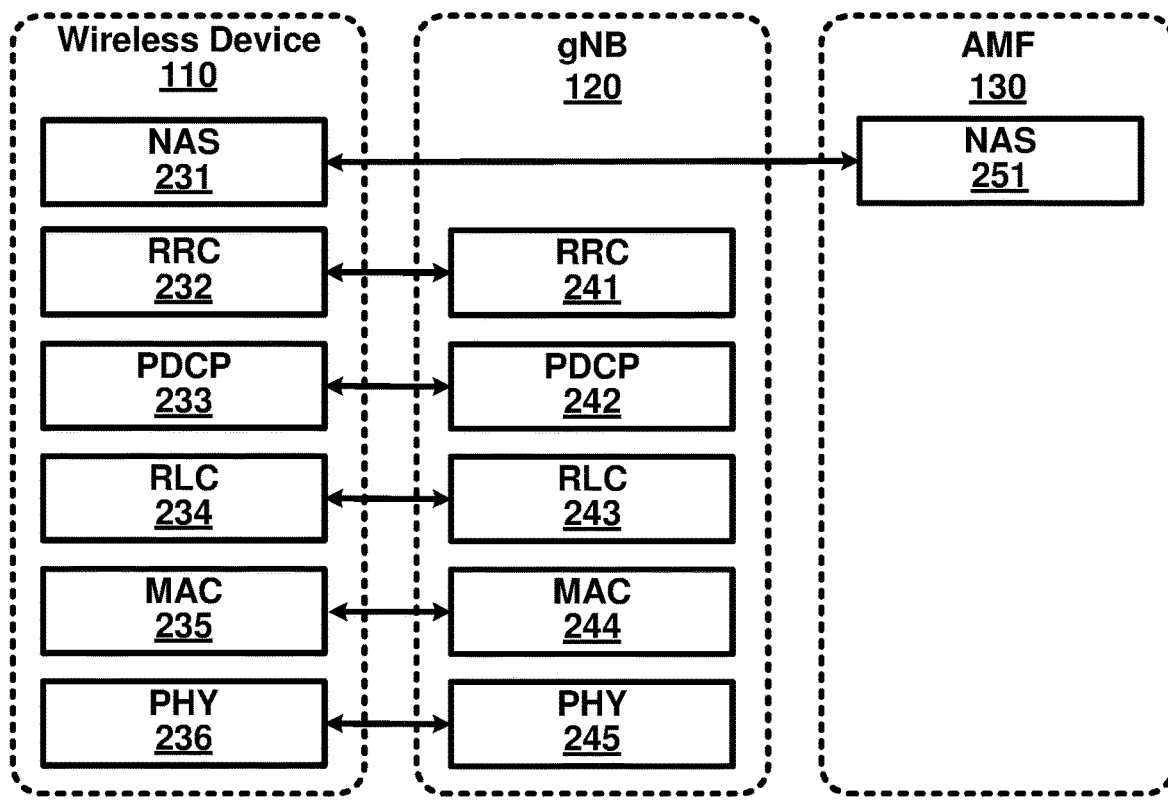
FIG. 2B is a diagram of an example control plane protocol stack as per an aspect of an embodiment of the present disclosure.

FIG. 2B is an example control plane protocol stack where PDCP (e.g. 233 and 242), RLC (e.g. 234 and 243) and MAC (e.g. 235 and 244) sublayers and PHY (e.g. 236 and 245) layer may be terminated in wireless device (e.g. 110) and gNB (e.g. 120) on a network side and perform service and functions described above. In an example, RRC (e.g. 232 and 241) may be terminated in a wireless device and a gNB on a network side. In an example, services and functions of RRC may comprise broadcast of system information related to AS and NAS, paging initiated by 5GC or RAN, establishment, maintenance and release of an RRC connection between the UE and RAN, security functions including key management, establishment, configuration, maintenance and release of Signaling Radio Bearers (SRBs) and Data Radio Bearers (DRBs), mobility functions, QoS management functions, UE measurement reporting and control of the reporting, detection of and recovery from radio link failure, and/or NAS message transfer to/from NAS from/to a UE. In an example, NAS control protocol (e.g. 231 and 251) may be terminated in the wireless device and AMF (e.g. 130) on a network side and may perform functions such as authentication, mobility management between a UE and a AMF for 3GPP access and non-3GPP access, and session management between a UE and a SMF for 3GPP access and non-3GPP access.

In an example, a base station may configure a plurality of logical channels for a wireless device. A logical channel in the plurality of logical channels may correspond to a radio bearer and the radio bearer may be associated with a QoS requirement. In an example, a base station may configure a logical channel to be mapped to one or more TTIs/numerologies in a plurality of TTIs/numerologies. The wireless device may receive a Downlink Control Information (DCI) via Physical Downlink Control CHannel (PDCCH) indicating an uplink grant. In an example, the uplink grant may be for a first TTI/numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or one or more MAC Control Elements (CEs). The one or more first logical channels may be mapped to the first TTI/numerology. The MAC layer at the wireless device may multiplex one or more MAC CEs and/or one or more MAC SDUs (e.g., logical channel) in a MAC PDU (e.g., transport block). In an example, the MAC PDU may comprise a MAC header comprising a plurality of MAC sub-headers. A MAC sub-header in the plurality of MAC sub-headers may correspond to a MAC CE or a MAC SUD (logical channel) in the one or more MAC CEs and/or one or more MAC SDUs. In an example, a MAC CE or a logical channel may be configured with a Logical Channel IDentifier (LCID). In an example, LCID for a logical channel or a MAC CE may be fixed/pre-configured. In an example, LCID for a logical channel or MAC CE may be configured for the wireless device by the base station. The MAC sub-header corresponding to a MAC CE or a MAC SDU may comprise LCID associated with the MAC CE or the MAC SDU.

In an example, a base station may activate and/or deactivate and/or impact one or more processes (e.g., set values of one or more parameters of the one or more processes or start and/or stop one or more timers of the one or more processes) at the wireless device by employing one or more MAC commands. The one or more MAC commands may comprise one or more MAC control elements. In an example, the one or more processes may comprise activation and/or deactivation of PDCP packet duplication for one or more radio bearers. The base station may transmit a MAC CE comprising one or more fields, the values of the fields indicating activation and/or deactivation of PDCP duplication for the one or more radio bearers. In an example, the one or more processes may comprise Channel State Information (CSI) transmission of on one or more cells. The base station may transmit one or more MAC CEs indicating activation and/or deactivation of the CSI transmission on the one or more cells. In an example, the one or more processes may comprise activation or deactivation of one or more secondary cells. In an example, the base station may transmit a MA CE indicating activation or deactivation of one or more secondary cells. In an example, the base station may transmit one or more MAC CEs indicating starting and/or stopping one or more Discontinuous Reception (DRX) timers at the wireless device. In an example, the base station may transmit one or more MAC CEs indicating one or more timing advance values for one or more Timing Advance Groups (TAGs).

Figure 3:
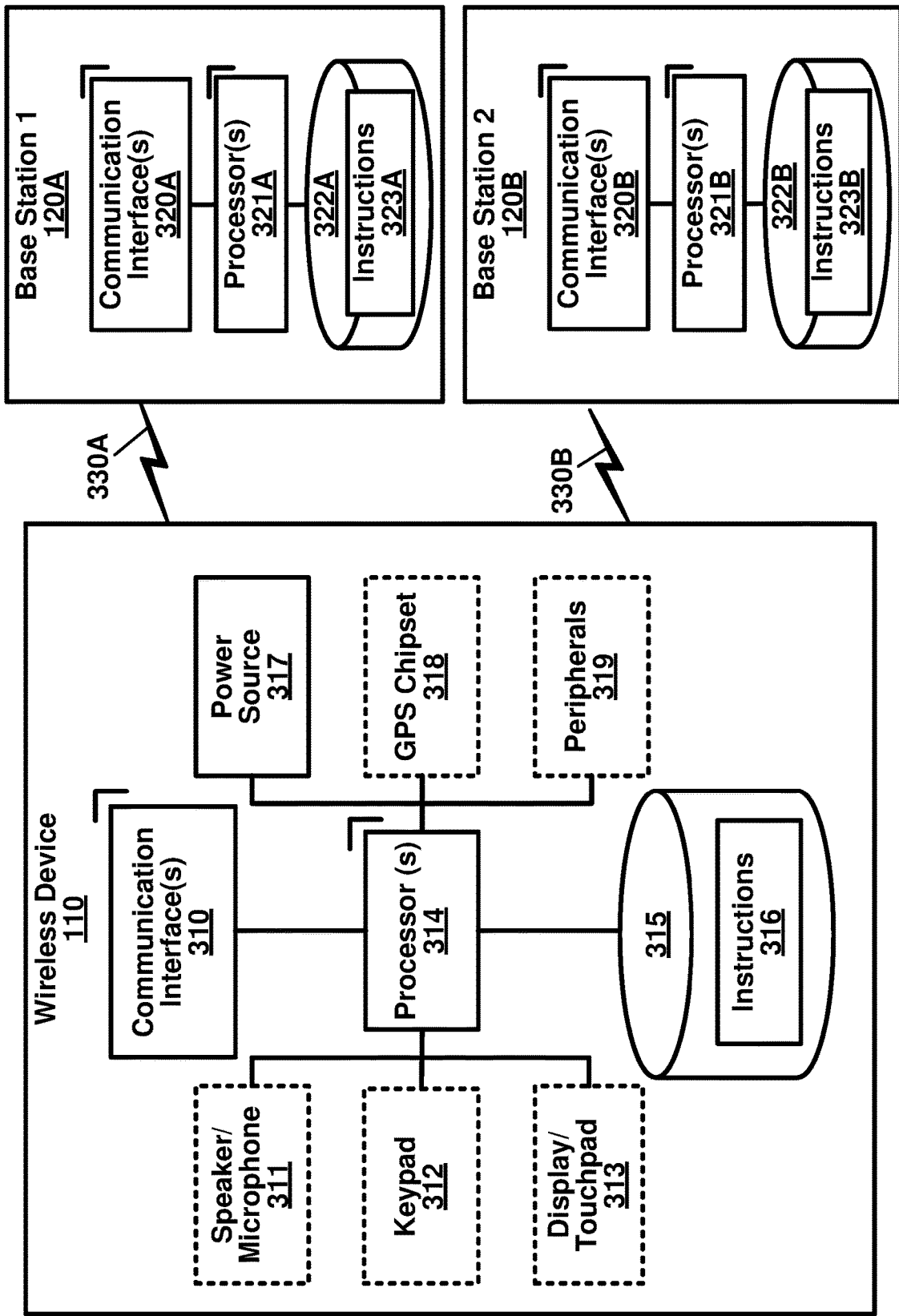
FIG. 3 is a diagram of an example wireless device and two base stations as per an aspect of an embodiment of the present disclosure.

FIG. 3 is a block diagram of base stations (base station 1, 120A, and base station 2, 120B) and a wireless device 110. A wireless device may be called a UE. A base station may be called a NB, eNB, gNB, and/or ng-eNB. In an example, a wireless device and/or a base station may act as a relay node. The base station 1, 120A, may comprise at least one communication interface 320A (e.g. a wireless modem, an antenna, a wired modem, and/or the like), at least one processor 321A, and at least one set of program code instructions 323A stored in non-transitory memory 322A and executable by the at least one processor 321A. The base station 2, 120B, may comprise at least one communication interface 320B, at least one processor 321B, and at least one set of program code instructions 323B stored in non-transitory memory 322B and executable by the at least one processor 321B.

A base station may comprise many sectors for example: 1, 2, 3, 4, or 6 sectors. A base station may comprise many cells, for example, ranging from 1 to 50 cells or more. A cell may be categorized, for example, as a primary cell or secondary cell. At Radio Resource Control (RRC) connection establishment/re-establishment/handover, one serving cell may provide the NAS (non-access stratum) mobility information (e.g. Tracking Area Identifier (TAI)). At RRC connection re-establishment/handover, one serving cell may provide the security input. This cell may be referred to as the Primary Cell (PCell). In the downlink, a carrier corresponding to the PCell may be a DL Primary Component Carrier (PCC), while in the uplink, a carrier may be an UL PCC. Depending on wireless device capabilities, Secondary Cells (SCells) may be configured to form together with a PCell a set of serving cells. In a downlink, a carrier corresponding to an SCell may be a downlink secondary component carrier (DL SCC), while in an uplink, a carrier may be an uplink secondary component carrier (UL SCC). An SCell may or may not have an uplink carrier.

A cell, comprising a downlink carrier and optionally an uplink carrier, may be assigned a physical cell ID and a cell index. A carrier (downlink or uplink) may belong to one cell. The cell ID or cell index may also identify the downlink carrier or uplink carrier of the cell (depending on the context it is used). In the disclosure, a cell ID may be equally referred to a carrier ID, and a cell index may be referred to a carrier index. In an implementation, a physical cell ID or a cell index may be assigned to a cell. A cell ID may be determined using a synchronization signal transmitted on a downlink carrier. A cell index may be determined using RRC messages. For example, when the disclosure refers to a first physical cell ID for a first downlink carrier, the disclosure may mean the first physical cell ID is for a cell comprising the first downlink carrier. The same concept may apply to, for example, carrier activation. When the disclosure indicates that a first carrier is activated, the specification may equally mean that a cell comprising the first carrier is activated.

A base station may transmit to a wireless device one or more messages (e.g. RRC messages) comprising a plurality of configuration parameters for one or more cells. One or more cells may comprise at least one primary cell and at least one secondary cell. In an example, an RRC message may be broadcasted or unicasted to the wireless device. In an example, configuration parameters may comprise common parameters and dedicated parameters.

Services and/or functions of an RRC sublayer may comprise at least one of: broadcast of system information related to AS and NAS; paging initiated by 5GC and/or NG-RAN; establishment, maintenance, and/or release of an RRC connection between a wireless device and NG-RAN, which may comprise at least one of addition, modification and release of carrier aggregation; or addition, modification, and/or release of dual connectivity in NR or between E-UTRA and NR. Services and/or functions of an RRC sublayer may further comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g. intra NR mobility or inter-RAT mobility) and a context transfer; or a wireless device cell selection and reselection and control of cell selection and reselection. Services and/or functions of an RRC sublayer may further comprise at least one of QoS management functions; a wireless device measurement configuration/reporting; detection of and/or recovery from radio link failure; or NAS message transfer to/from a core network entity (e.g. AMF, Mobility Management Entity (MME)) from/to the wireless device.

An RRC sublayer may support an RRC_Idle state, an RRC_Inactive state and/or an RRC_Connected state for a wireless device. In an RRC_Idle state, a wireless device may perform at least one of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRX for CN paging configured via NAS. In an RRC_Inactive state, a wireless device may perform at least one of: receiving broadcasted system information; cell selection/re-selection; monitoring/receiving a RAN/CN paging initiated by NG-RAN/5GC; RAN-based notification area (RNA) managed by NG-RAN; or DRX for RAN/CN paging configured by NG-RAN/NAS. In an RRC_Idle state of a wireless device, a base station (e.g. NG-RAN) may keep a 5GC-NG-RAN connection (both C/U-planes) for the wireless device; and/or store a UE AS context for the wireless device. In an RRC_Connected state of a wireless device, a base station (e.g. NG-RAN) may perform at least one of: establishment of 5GC-NG-RAN connection (both C/U-planes) for the wireless device; storing a UE AS context for the wireless device; transmit/receive of unicast data to/from the wireless device; or network-controlled mobility based on measurement results received from the wireless device. In an RRC_Connected state of a wireless device, an NG-RAN may know a cell that the wireless device belongs to.

System information (SI) may be divided into minimum SI and other SI. The minimum SI may be periodically broadcast. The minimum SI may comprise basic information required for initial access and information for acquiring any other SI broadcast periodically or provisioned on-demand, i.e. scheduling information. The other SI may either be broadcast, or be provisioned in a dedicated manner, either triggered by a network or upon request from a wireless device. A minimum SI may be transmitted via two different downlink channels using different messages (e.g. MasterInformationBlock and SystemInformationBlockType1). Another SI may be transmitted via SystemInformationBlockType2. For a wireless device in an RRC_Connected state, dedicated RRC signaling may be employed for the request and delivery of the other SI. For the wireless device in the RRC_Idle state and/or the RRC_Inactive state, the request may trigger a random-access procedure.

A wireless device may report its radio access capability information which may be static. A base station may request what capabilities for a wireless device to report based on band information. When allowed by a network, a temporary capability restriction request may be sent by the wireless device to signal the limited availability of some capabilities (e.g. due to hardware sharing, interference or overheating) to the base station. The base station may confirm or reject the request. The temporary capability restriction may be transparent to 5GC (e.g., static capabilities may be stored in 5GC).

When CA is configured, a wireless device may have an RRC connection with a network. At RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition and removal of SCells may be performed by RRC. At intra-NR handover, RRC may also add, remove, or reconfigure SCells for usage with the target PCell. When adding a new SCell, dedicated RRC signaling may be employed to send all required system information of the SCell i.e. while in connected mode, wireless devices may not need to acquire broadcasted system information directly from the SCells.

The purpose of an RRC connection reconfiguration procedure may be to modify an RRC connection, (e.g. to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify an RRC connection. It may convey information for measurement configuration, mobility control, radio resource configuration (e.g. RBs, MAC main configuration and physical channel configuration) comprising any associated dedicated NAS information and security configuration. If the received RRC Connection Reconfiguration message comprises the sCellToReleaseList, the wireless device may perform an SCell release. If the received RRC Connection Reconfiguration message comprises the sCellToAddModList, the wireless device may perform SCell additions or modification.

An RRC connection establishment (or reestablishment, resume) procedure may be to establish (or reestablish, resume) an RRC connection. an RRC connection establishment procedure may comprise SRB1 establishment. The RRC connection establishment procedure may be used to transfer the initial NAS dedicated information/message from a wireless device to E-UTRAN. The RRCConnectionReestablishment message may be used to re-establish SRB1.

A measurement report procedure may be to transfer measurement results from a wireless device to NG-RAN. The wireless device may initiate a measurement report procedure after successful security activation. A measurement report message may be employed to transmit measurement results.

The wireless device 110 may comprise at least one communication interface 310 (e.g. a wireless modem, an antenna, and/or the like), at least one processor 314, and at least one set of program code instructions 316 stored in non-transitory memory 315 and executable by the at least one processor 314. The wireless device 110 may further comprise at least one of at least one speaker/microphone 311, at least one keypad 312, at least one display/touchpad 313, at least one power source 317, at least one global positioning system (GPS) chipset 318, and other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and the like. The processor 314 of the wireless device 110, the processor 321A in base station 1 120A, and/or the processor 321B in base station 2 120B may perform at least one of signal coding/processing, data processing, power control, input/output processing, and/or any other functionality that may enable the wireless device 110, the base station 1 120A and/or the base station 2 120B to operate in a wireless environment.

The processor 314 of the wireless device 110 may be connected to the speaker/microphone 311, the keypad 312, and/or the display/touchpad 313. The processor 314 may receive user input data from and/or provide user output data to the speaker/microphone 311, the keypad 312, and/or the display/touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and the like. The processor 314 may be connected to the GPS chipset 318. The GPS chipset 318 may be configured to provide geographic location information of the wireless device 110.

The processor 314 of the wireless device 110 may further be connected to other peripherals 319, which may comprise one or more software and/or hardware modules that provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and the like.

The communication interface 320A of the base station 1, 120A, and/or the communication interface 320B of the base station 2, 120B, may be configured to communicate with the communication interface 310 of the wireless device 110 via a wireless link 330A and/or a wireless link 330B respectively. In an example, the communication interface 320A of the base station 1, 120A, may communicate with the communication interface 320B of the base station 2 and other RAN and core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110 and/or the base station 2 120B and the wireless device 110 may be configured to send and receive transport blocks via the wireless link 330A and/or via the wireless link 330B, respectively. The wireless link 330A and/or the wireless link 330B may employ at least one frequency carrier. According to some of various aspects of embodiments, transceiver(s) may be employed. A transceiver may be a device that comprises both a transmitter and a receiver. Transceivers may be employed in devices such as wireless devices, base stations, relay nodes, and/or the like. Example embodiments for radio technology implemented in the communication interface 310, 320A, 320B and the wireless link 330A, 330B are illustrated in FIG. 4A, FIG. 4B, FIG. 4C, FIG. 4D, FIG. 6, FIG. 7A, FIG. 7B, FIG. 8, and associated text.

In an example, other nodes in a wireless network (e.g. AMF, UPF, SMF, etc.) may comprise one or more communication interfaces, one or more processors, and memory storing instructions.

A node (e.g. wireless device, base station, AMF, SMF, UPF, servers, switches, antennas, and/or the like) may comprise one or more processors, and memory storing instructions that when executed by the one or more processors causes the node to perform certain processes and/or functions. Example embodiments may enable operation of single-carrier and/or multi-carrier communications. Other example embodiments may comprise a non-transitory tangible computer readable media comprising instructions executable by one or more processors to cause operation of single-carrier and/or multi-carrier communications. Yet other example embodiments may comprise an article of manufacture that comprises a non-transitory tangible computer readable machine-accessible medium having instructions encoded thereon for enabling programmable hardware to cause a node to enable operation of single-carrier and/or multi-carrier communications. The node may comprise processors, memory, interfaces, and/or the like.

An interface may comprise at least one of a hardware interface, a firmware interface, a software interface, and/or a combination thereof. The hardware interface may comprise connectors, wires, electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and code stored in and/or in communication with a memory device to implement connections, electronic device operations, protocol(s), protocol layers, communication drivers, device drivers, hardware operations, combinations thereof, and/or the like.

FIG. 4A, FIG. 4B, FIG. 4C and FIG. 4D are example diagrams for uplink and downlink signal transmission as per an aspect of an embodiment of the present disclosure. FIG. 4A shows an example uplink transmitter for at least one physical channel. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 4A. These functions are illustrated as examples and it is anticipated that other mechanisms may be implemented in various embodiments.

An example structure for modulation and up-conversion to the carrier frequency of the complex-valued SC-FDMA or CP-OFDM baseband signal for an antenna port and/or the complex-valued Physical Random Access CHannel (PRACH) baseband signal is shown in FIG. 4B. Filtering may be employed prior to transmission.

An example structure for downlink transmissions is shown in FIG. 4C. The baseband signal representing a downlink physical channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

In an example, a base station may transmit a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. In an example, a first antenna port and a second antenna port may be quasi co-located if one or more large-scale properties of the channel over which a first symbol on the first antenna port is conveyed may be inferred from the channel over which a second symbol on a second antenna port is conveyed. The one or more large-scale properties may comprise at least one of: delay spread; doppler spread; doppler shift; average gain; average delay; and/or spatial Receiving (Rx) parameters.

An example modulation and up-conversion to the carrier frequency of the complex-valued OFDM baseband signal for an antenna port is shown in FIG. 4D. Filtering may be employed prior to transmission.

Figure 5A:
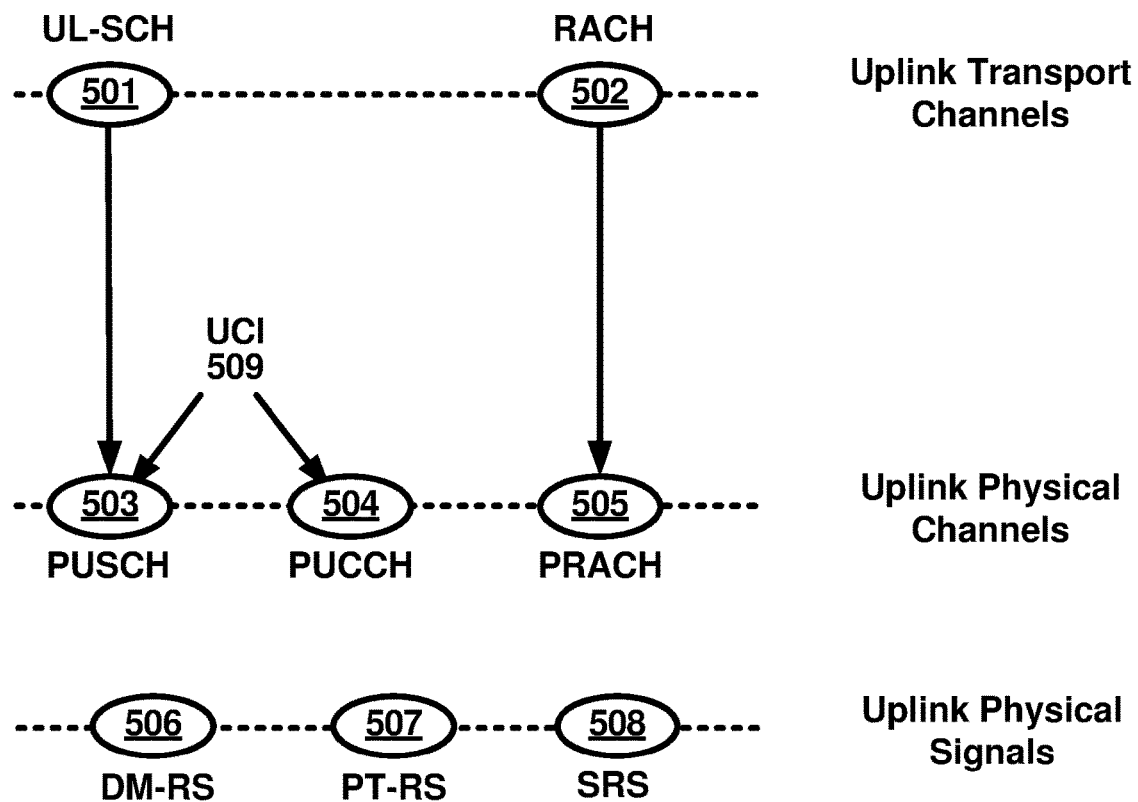
FIG. 5A is a diagram of an example uplink channel mapping and example uplink physical signals as per an aspect of an embodiment of the present disclosure.
Figure 5B:
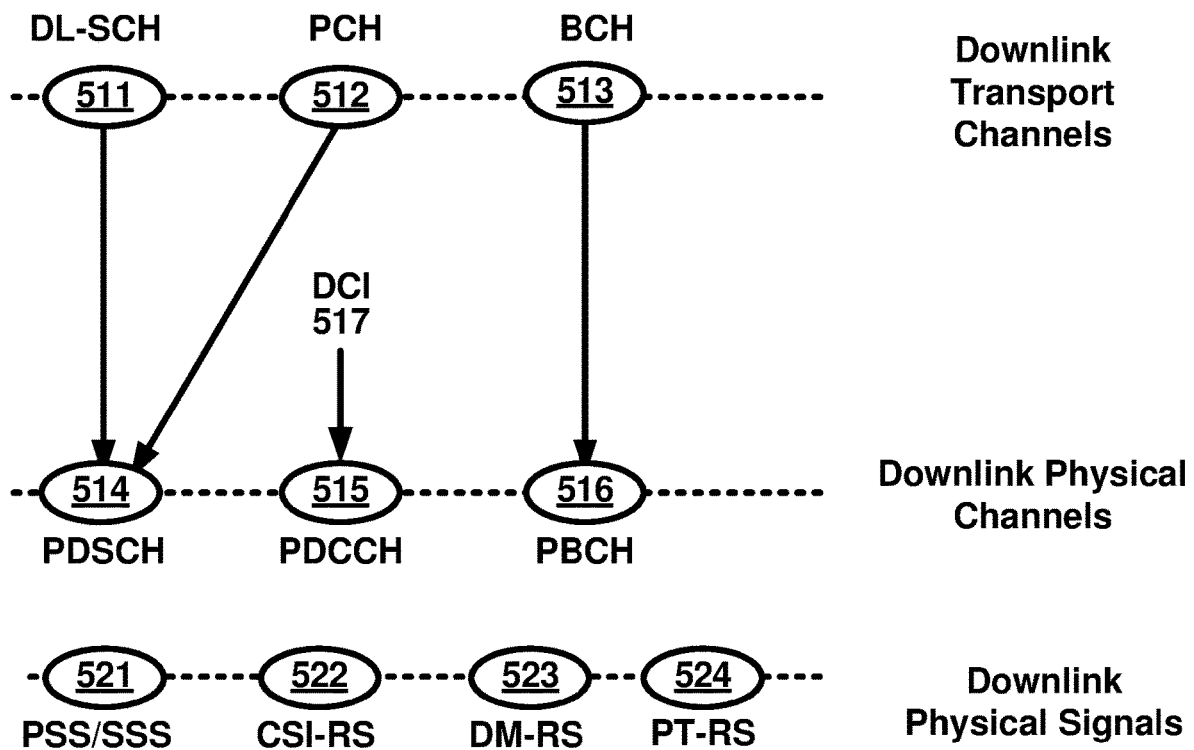
FIG. 5B is a diagram of an example downlink channel mapping and example downlink physical signals as per an aspect of an embodiment of the present disclosure.

FIG. 5A is a diagram of an example uplink channel mapping and example uplink physical signals. FIG. 5B is a diagram of an example downlink channel mapping and a downlink physical signals. In an example, a physical layer may provide one or more information transfer services to a MAC and/or one or more higher layers. For example, the physical layer may provide the one or more information transfer services to the MAC via one or more transport channels. An information transfer service may indicate how and with what characteristics data are transferred over the radio interface.

In an example embodiment, a radio network may comprise one or more downlink and/or uplink transport channels. For example, a diagram in FIG. 5A shows example uplink transport channels comprising Uplink-Shared CHannel (UL-SCH) 501 and Random Access CHannel (RACH) 502. A diagram in FIG. 5B shows example downlink transport channels comprising Downlink-Shared CHannel (DL-SCH) 511, Paging CHannel (PCH) 512, and Broadcast CHannel (BCH) 513. A transport channel may be mapped to one or more corresponding physical channels. For example, UL-SCH 501 may be mapped to Physical Uplink Shared CHannel (PUSCH) 503. RACH 502 may be mapped to PRACH 505. DL-SCH 511 and PCH 512 may be mapped to Physical Downlink Shared CHannel (PDSCH) 514. BCH 513 may be mapped to Physical Broadcast CHannel (PBCH) 516.

There may be one or more physical channels without a corresponding transport channel. The one or more physical channels may be employed for Uplink Control Information (UCI) 509 and/or Downlink Control Information (DCI) 517. For example, Physical Uplink Control CHannel (PUCCH) 504 may carry UCI 509 from a UE to a base station. For example, Physical Downlink Control CHannel (PDCCH) 515 may carry DCI 517 from a base station to a UE. NR may support UCI 509 multiplexing in PUSCH 503 when UCI 509 and PUSCH 503 transmissions may coincide in a slot at least in part. The UCI 509 may comprise at least one of CSI, Acknowledgement (ACK)/Negative Acknowledgement (NACK), and/or scheduling request. The DCI 517 on a PDCCH 515 may indicate at least one of following: one or more downlink assignments and/or one or more uplink scheduling grants In uplink, a UE may transmit one or more Reference Signals (RSs) to a base station. For example, the one or more RSs may be at least one of Demodulation-RS (DM-RS) 506, Phase Tracking-RS (PT-RS) 507, and/or Sounding RS (SRS) 508. In downlink, a base station may transmit (e.g., unicast, multicast, and/or broadcast) one or more RSs to a UE. For example, the one or more RSs may be at least one of Primary Synchronization Signal (PSS)/Secondary Synchronization Signal (SSS) 521, CSI-RS 522, DM-RS 523, and/or PT-RS 524.

In an example, a UE may transmit one or more uplink DM-RSs 506 to a base station for channel estimation, for example, for coherent demodulation of one or more uplink physical channels (e.g., PUSCH 503 and/or PUCCH 504). For example, a UE may transmit a base station at least one uplink DM-RS 506 with PUSCH 503 and/or PUCCH 504, wherein the at least one uplink DM-RS 506 may be spanning a same frequency range as a corresponding physical channel. In an example, a base station may configure a UE with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to transmit at one or more symbols of a PUSCH and/or PUCCH. A base station may semi-statically configure a UE with a maximum number of front-loaded DM-RS symbols for PUSCH and/or PUCCH. For example, a UE may schedule a single-symbol DM-RS and/or double symbol DM-RS based on a maximum number of front-loaded DM-RS symbols, wherein a base station may configure the UE with one or more additional uplink DM-RS for PUSCH and/or PUCCH. A new radio network may support, e.g., at least for CP-OFDM, a common DM-RS structure for DL and UL, wherein a DM-RS location, DM-RS pattern, and/or scrambling sequence may be same or different.

In an example, whether uplink PT-RS 507 is present or not may depend on an RRC configuration. For example, a presence of uplink PT-RS may be UE-specifically configured. For example, a presence and/or a pattern of uplink PT-RS 507 in a scheduled resource may be UE-specifically configured by a combination of RRC signaling and/or association with one or more parameters employed for other purposes (e.g., Modulation and Coding Scheme (MCS)) which may be indicated by DCI. When configured, a dynamic presence of uplink PT-RS 507 may be associated with one or more DCI parameters comprising at least MCS. A radio network may support plurality of uplink PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, uplink PT-RS 507 may be confined in the scheduled time/frequency duration for a UE.

In an example, a UE may transmit SRS 508 to a base station for channel state estimation to support uplink channel dependent scheduling and/or link adaptation. For example, SRS 508 transmitted by a UE may allow for a base station to estimate an uplink channel state at one or more different frequencies. A base station scheduler may employ an uplink channel state to assign one or more resource blocks of good quality for an uplink PUSCH transmission from a UE. A base station may semi-statically configure a UE with one or more SRS resource sets. For an SRS resource set, a base station may configure a UE with one or more SRS resources. An SRS resource set applicability may be configured by a higher layer (e.g., RRC) parameter. For example, when a higher layer parameter indicates beam management, an SRS resource in each of one or more SRS resource sets may be transmitted at a time instant. A UE may transmit one or more SRS resources in different SRS resource sets simultaneously. A new radio network may support aperiodic, periodic and/or semi-persistent SRS transmissions. A UE may transmit SRS resources based on one or more trigger types, wherein the one or more trigger types may comprise higher layer signaling (e.g., RRC) and/or one or more DCI formats (e.g., at least one DCI format may be employed for a UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH 503 and SRS 508 are transmitted in a same slot, a UE may be configured to transmit SRS 508 after a transmission of PUSCH 503 and corresponding uplink DM-RS 506.

In an example, a base station may semi-statically configure a UE with one or more SRS configuration parameters indicating at least one of following: a SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, a SRS bandwidth, a frequency hopping bandwidth, a cyclic shift, and/or a SRS sequence ID.

In an example, in a time domain, an SS/PBCH block (SSB) may comprise one or more OFDM symbols (e.g., 4 OFDM symbols numbered in increasing order from 0 to 3) within the SS/PBCH block. An SS/PBCH block may comprise PSS/SSS 521 and PBCH 516.

In an example, in the frequency domain, an SS/PBCH block may comprise one or more contiguous subcarriers (e.g., 240 contiguous subcarriers with the subcarriers numbered in increasing order from 0 to 239) within the SS/PBCH block. For example, a PSS/SSS 521 may occupy 1 OFDM symbol and 127 subcarriers. For example, PBCH 516 may span across 3 OFDM symbols and 240 subcarriers. A UE may assume that one or more SS/PBCH blocks transmitted with a same block index may be quasi co-located, e.g., with respect to Doppler spread, Doppler shift, average gain, average delay, and spatial Rx parameters. A UE may not assume quasi co-location for other SS/PBCH block transmissions. A periodicity of an SS/PBCH block may be configured by a radio network (e.g., by an RRC signaling) and one or more time locations where the SS/PBCH block may be sent may be determined by sub-carrier spacing. In an example, a UE may assume a band-specific sub-carrier spacing for an SS/PBCH block unless a radio network has configured a UE to assume a different sub-carrier spacing.

In an example, downlink CSI-RS 522 may be employed for a UE to acquire channel state information. A radio network may support periodic, aperiodic, and/or semi-persistent transmission of downlink CSI-RS 522. For example, a base station may semi-statically configure and/or reconfigure a UE with periodic transmission of downlink CSI-RS 522. A configured CSI-RS resources may be activated and/or deactivated. For semi-persistent transmission, an activation and/or deactivation of CSI-RS resource may be triggered dynamically. In an example, CSI-RS configuration may comprise one or more parameters indicating at least a number of antenna ports. For example, a base station may configure a UE with 32 ports. A base station may semi-statically configure a UE with one or more CSI-RS resource sets. One or more CSI-RS resources may be allocated from one or more CSI-RS resource sets to one or more UEs. For example, a base station may semi-statically configure one or more parameters indicating CSI RS resource mapping, for example, time-domain location of one or more CSI-RS resources, a bandwidth of a CSI-RS resource, and/or a periodicity. In an example, a UE may be configured to employ a same OFDM symbols for downlink CSI-RS 522 and control resource set (coreset) when the downlink CSI-RS 522 and coreset are spatially quasi co-located and resource elements associated with the downlink CSI-RS 522 are the outside of PRBs configured for coreset. In an example, a UE may be configured to employ a same OFDM symbols for downlink CSI-RS 522 and SSB/PBCH when the downlink CSI-RS 522 and SSB/PBCH are spatially quasi co-located and resource elements associated with the downlink CSI-RS 522 are the outside of PRBs configured for SSB/PBCH.

In an example, a UE may transmit one or more downlink DM-RSs 523 to a base station for channel estimation, for example, for coherent demodulation of one or more downlink physical channels (e.g., PDSCH 514). For example, a radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statically configure a UE with a maximum number of front-loaded DM-RS symbols for PDSCH 514. For example, a DM-RS configuration may support one or more DM-RS ports. For example, for single user-MIMO, a DM-RS configuration may support at least 8 orthogonal downlink DM-RS ports. For example, for multiuser-MIMO, a DM-RS configuration may support 12 orthogonal downlink DM-RS ports. A radio network may support, e.g., at least for CP-OFDM, a common DM-RS structure for DL and UL, wherein a DM-RS location, DM-RS pattern, and/or scrambling sequence may be same or different.

In an example, whether downlink PT-RS 524 is present or not may depend on an RRC configuration. For example, a presence of downlink PT-RS 524 may be UE-specifically configured. For example, a presence and/or a pattern of downlink PT-RS 524 in a scheduled resource may be UE-specifically configured by a combination of RRC signaling and/or association with one or more parameters employed for other purposes (e.g., MCS) which may be indicated by DCI. When configured, a dynamic presence of downlink PT-RS 524 may be associated with one or more DCI parameters comprising at least MCS. A radio network may support plurality of PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, downlink PT-RS 524 may be confined in the scheduled time/frequency duration for a UE.

Figure 6:
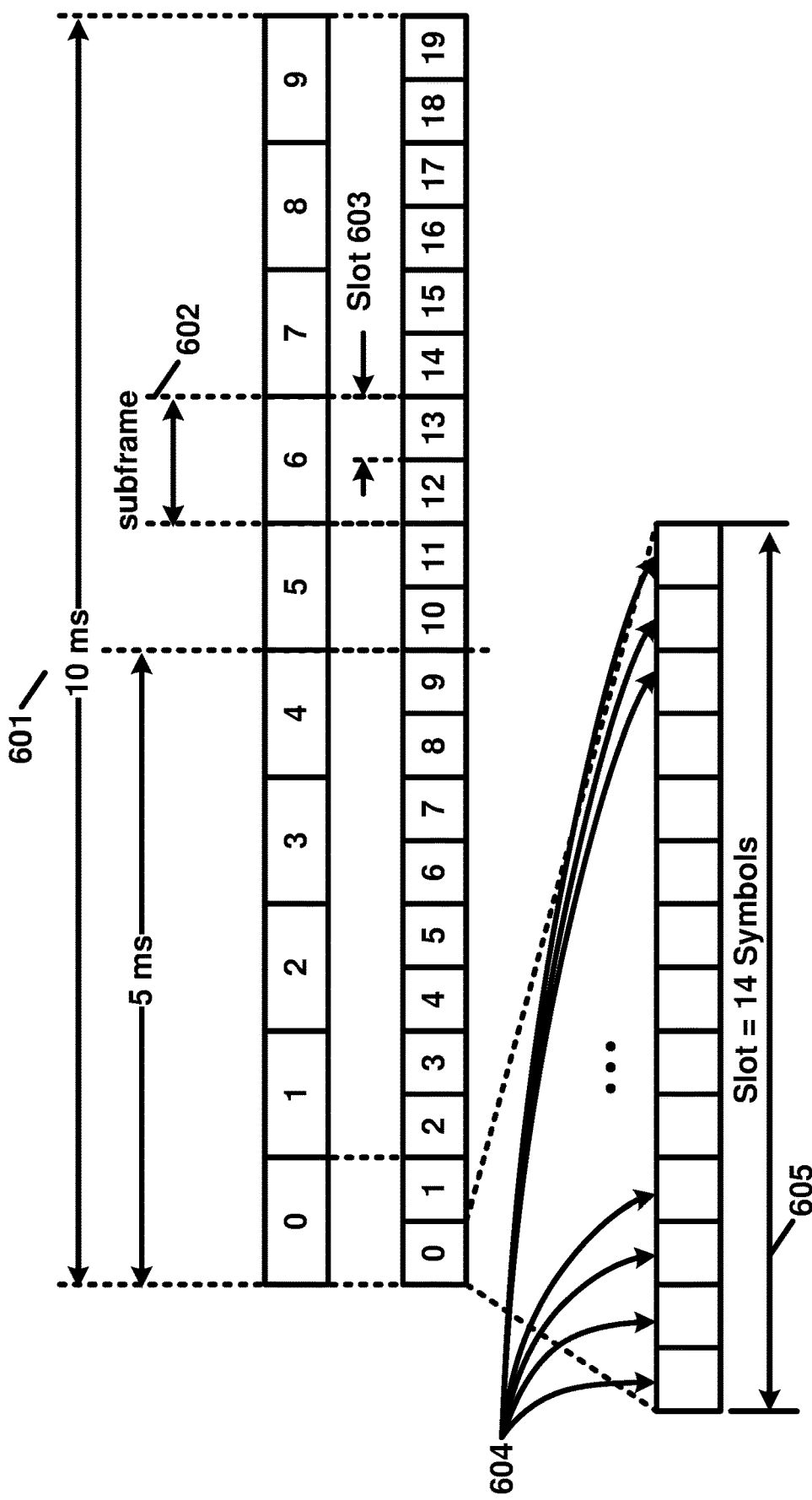
FIG. 6 is a diagram depicting an example frame structure as per an aspect of an embodiment of the present disclosure.

FIG. 6 is a diagram depicting an example frame structure for a carrier as per an aspect of an embodiment of the present disclosure. A multicarrier OFDM communication system may comprise one or more carriers, for example, ranging from 1 to 32 carriers, in case of carrier aggregation, or ranging from 1 to 64 carriers, in case of dual connectivity. Different radio frame structures may be supported (e.g., for FDD and for TDD duplex mechanisms). FIG. 6 shows an example frame structure. Downlink and uplink transmissions may be organized into radio frames 601. In this example, radio frame duration is 10 ms. In this example, a 10 ms radio frame 601 may be divided into ten equally sized subframes 602 with 1 ms duration. Subframe(s) may comprise one or more slots (e.g. slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Uplink and downlink transmissions may be separated in the frequency domain. Slot(s) may comprise a plurality of OFDM symbols 604. The number of OFDM symbols 604 in a slot 605 may depend on the cyclic prefix length. For example, a slot may be 14 OFDM symbols for the same subcarrier spacing of up to 480 kHz with normal CP. A slot may be 12 OFDM symbols for the same subcarrier spacing of 60 kHz with extended CP. A slot may contain downlink, uplink, or a downlink part and an uplink part and/or alike.

Figure 7A:
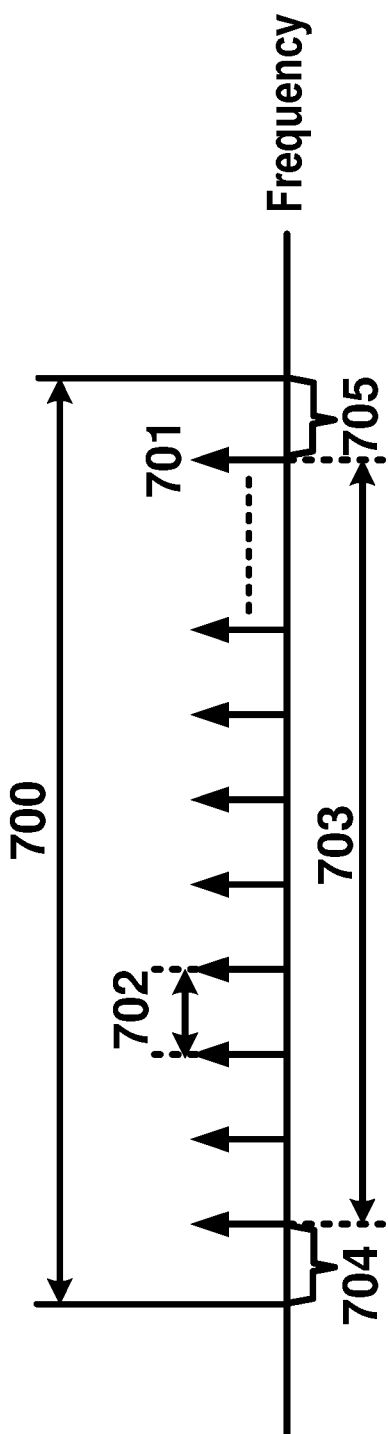
FIG. 7A and FIG. 7B are diagrams depicting example sets of OFDM subcarriers as per an aspect of an embodiment of the present disclosure.

FIG. 7A is a diagram depicting example sets of OFDM subcarriers as per an aspect of an embodiment of the present disclosure. In the example, a gNB may communicate with a wireless device with a carrier with an example channel bandwidth 700. Arrow(s) in the diagram may depict a subcarrier in a multicarrier OFDM system. The OFDM system may use technology such as OFDM technology, SC-FDMA technology, and/or the like. In an example, an arrow 701 shows a subcarrier transmitting information symbols. In an example, a subcarrier spacing 702, between two contiguous subcarriers in a carrier, may be any one of 15 KHz, 30 KHz, 60 KHz, 120 KHz, 240 KHz etc. In an example, different subcarrier spacing may correspond to different transmission numerologies. In an example, a transmission numerology may comprise at least: a numerology index; a value of subcarrier spacing; a type of cyclic prefix (CP). In an example, a gNB may transmit to/receive from a UE on a number of subcarriers 703 in a carrier. In an example, a bandwidth occupied by a number of subcarriers 703 (transmission bandwidth) may be smaller than the channel bandwidth 700 of a carrier, due to guard band 704 and 705. In an example, a guard band 704 and 705 may be used to reduce interference to and from one or more neighbor carriers. A number of subcarriers (transmission bandwidth) in a carrier may depend on the channel bandwidth of the carrier and the subcarrier spacing. For example, a transmission bandwidth, for a carrier with 20 MHz channel bandwidth and 15 KHz subcarrier spacing, may be in number of 1024 subcarriers.

Figure 7B:
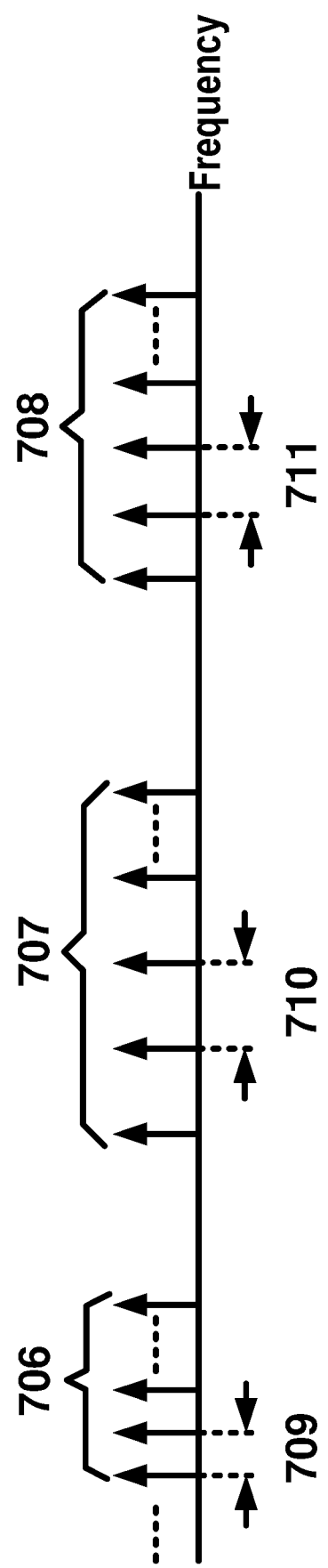

In an example, a gNB and a wireless device may communicate with multiple CCs when configured with CA. In an example, different component carriers may have different bandwidth and/or subcarrier spacing, if CA is supported. In an example, a gNB may transmit a first type of service to a UE on a first component carrier. The base station may transmit a second type of service to the UE on a second component carrier. Different type of services may have different service requirement (e.g., data rate, latency, reliability), which may be suitable for transmission via different component carrier having different subcarrier spacing and/or bandwidth. FIG. 7B shows an example embodiment. A first component carrier may comprise a first number of subcarriers 706 with a first subcarrier spacing 709. A second component carrier may comprise a second number of subcarriers 707 with a second subcarrier spacing 710. A third component carrier may comprise a third number of subcarriers 708 with a third subcarrier spacing 711. Carriers in a multicarrier OFDM communication system may be contiguous carriers, non-contiguous carriers, or a combination of both contiguous and non-contiguous carriers.

Figure 8:
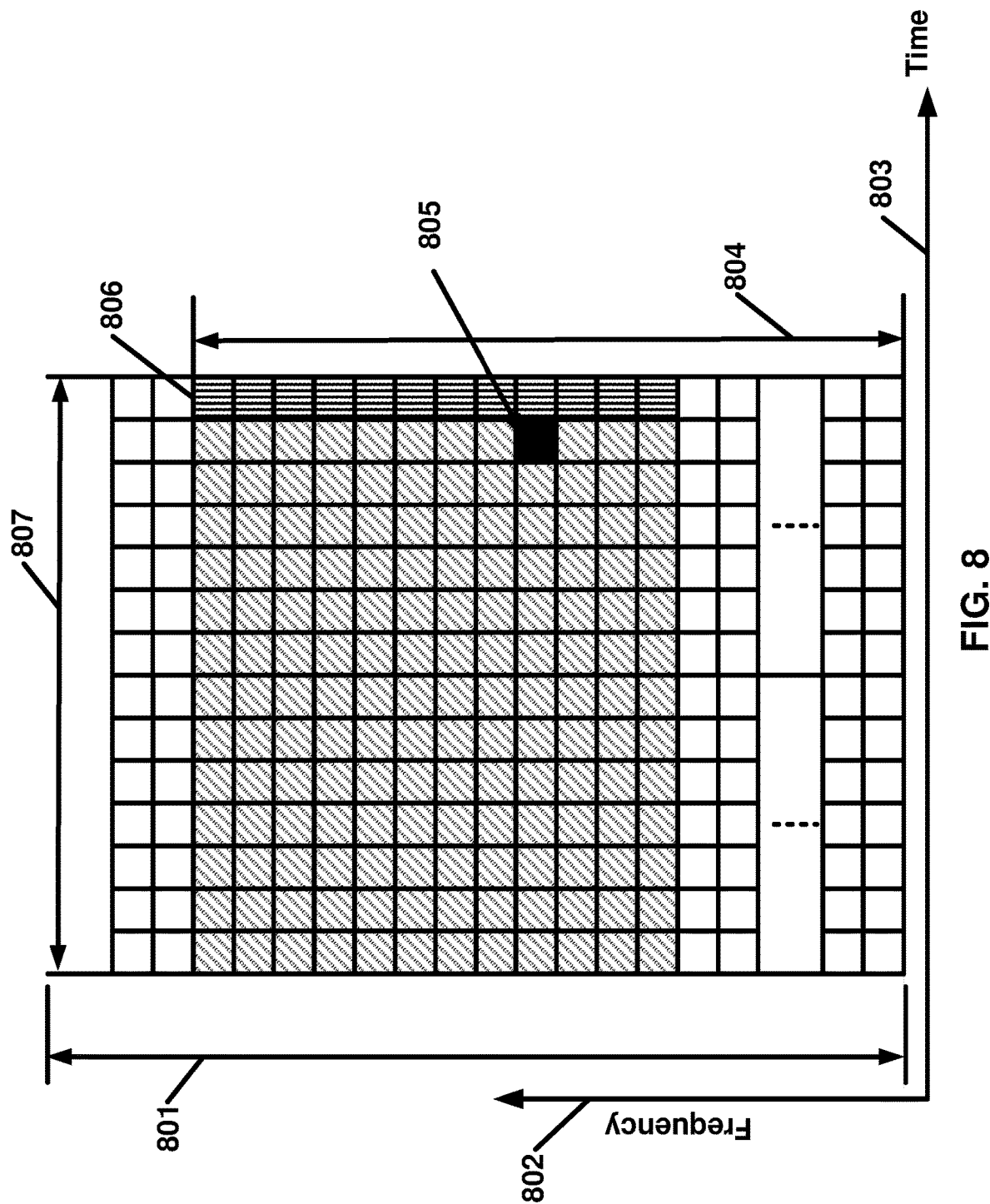
FIG. 8 is a diagram depicting example OFDM radio resources as per an aspect of an embodiment of the present disclosure.

FIG. 8 is a diagram depicting OFDM radio resources as per an aspect of an embodiment of the present disclosure. In an example, a carrier may have a transmission bandwidth 801. In an example, a resource grid may be in a structure of frequency domain 802 and time domain 803. In an example, a resource grid may comprise a first number of OFDM symbols in a subframe and a second number of resource blocks, starting from a common resource block indicated by higher-layer signaling (e.g. RRC signaling), for a transmission numerology and a carrier. In an example, in a resource grid, a resource unit identified by a subcarrier index and a symbol index may be a resource element 805. In an example, a subframe may comprise a first number of OFDM symbols 807 depending on a numerology associated with a carrier. For example, when a subcarrier spacing of a numerology of a carrier is 15 KHz, a subframe may have 14 OFDM symbols for a carrier. When a subcarrier spacing of a numerology is 30 KHz, a subframe may have 28 OFDM symbols. When a subcarrier spacing of a numerology is 60 Khz, a subframe may have 56 OFDM symbols, etc. In an example, a second number of resource blocks comprised in a resource grid of a carrier may depend on a bandwidth and a numerology of the carrier.

As shown in FIG. 8, a resource block 806 may comprise 12 subcarriers. In an example, multiple resource blocks may be grouped into a Resource Block Group (RBG) 804. In an example, a size of an RBG may depend on at least one of: a RRC message indicating a RBG size configuration; a size of a carrier bandwidth; or a size of a bandwidth part of a carrier. In an example, a carrier may comprise multiple bandwidth parts. A first bandwidth part of a carrier may have different frequency location and/or bandwidth from a second bandwidth part of the carrier.

In an example, a gNB may transmit a downlink control information comprising a downlink or uplink resource block assignment to a wireless device. A base station may transmit to or receive from, a wireless device, data packets (e.g. transport blocks) scheduled and transmitted via one or more resource blocks and one or more slots according to parameters in a downlink control information and/or RRC message(s). In an example, a starting symbol relative to a first slot of the one or more slots may be indicated to the wireless device. In an example, a gNB may transmit to or receive from, a wireless device, data packets scheduled on one or more RBGs and one or more slots.

In an example, a gNB may transmit a downlink control information comprising a downlink assignment to a wireless device via one or more PDCCHs. The downlink assignment may comprise parameters indicating at least modulation and coding format; resource allocation; and/or HARQ information related to DL-SCH. In an example, a resource allocation may comprise parameters of resource block allocation; and/or slot allocation. In an example, a gNB may dynamically allocate resources to a wireless device via a Cell-Radio Network Temporary Identifier (C-RNTI) on one or more PDCCHs. The wireless device may monitor the one or more PDCCHs in order to find possible allocation when its downlink reception is enabled. The wireless device may receive one or more downlink data package on one or more PDSCH scheduled by the one or more PDCCHs, when successfully detecting the one or more PDCCHs.

In an example, a gNB may allocate Configured Scheduling (CS) resources for down link transmission to a wireless device. The base station may transmit one or more RRC messages indicating a periodicity of the CS grant. The base station may transmit a DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages, until deactivated.

In an example, a gNB may transmit a downlink control information comprising an uplink grant to a wireless device via one or more PDCCHs. The uplink grant may comprise parameters indicating at least modulation and coding format; resource allocation; and/or HARQ information related to UL-SCH. In an example, a resource allocation may comprise parameters of resource block allocation; and/or slot allocation. In an example, a gNB may dynamically allocate resources to a wireless device via a C-RNTI on one or more PDCCHs. The wireless device may monitor the one or more PDCCHs in order to find possible resource allocation. The wireless device may transmit one or more uplink data package via one or more PUSCH scheduled by the one or more PDCCHs, when successfully detecting the one or more PDCCHs.

In an example, a gNB may allocate CS resources for uplink data transmission to a wireless device. The base station may transmit one or more RRC messages indicating a periodicity of the CS grant. The base station may transmit a DCI via a PDCCH addressed to a CS-RNTI activating the CS resources. The DCI may comprise parameters indicating that the uplink grant is a CS grant. The CS grant may be implicitly reused according to the periodicity defined by the one or more RRC message, until deactivated.

In an example, a base station may transmit DCI/control signaling via PDCCH. The DCI may take a format in a plurality of formats. A DCI may comprise downlink and/or uplink scheduling information (e.g., resource allocation information, HARQ related parameters, MCS), request for CSI (e.g., aperiodic CQI reports), request for SRS, uplink power control commands for one or more cells, one or more timing information (e.g., TB transmission/reception timing, HARQ feedback timing, etc.), etc. In an example, a DCI may indicate an uplink grant comprising transmission parameters for one or more transport blocks. In an example, a DCI may indicate downlink assignment indicating parameters for receiving one or more transport blocks. In an example, a DCI may be used by base station to initiate a contention-free random access at the wireless device. In an example, the base station may transmit a DCI comprising slot format indicator (SFI) notifying a slot format. In an example, the base station may transmit a DCI comprising pre-emption indication notifying the PRB(s) and/or OFDM symbol(s) where a UE may assume no transmission is intended for the UE. In an example, the base station may transmit a DCI for group power control of PUCCH or PUSCH or SRS. In an example, a DCI may correspond to an RNTI. In an example, the wireless device may obtain an RNTI in response to completing the initial access (e.g., C-RNTI). In an example, the base station may configure an RNTI for the wireless (e.g., CS-RNTI, TPC-CS-RNTI, TPC-PUCCH-RNTI, TPC-PUSCH-RNTI, TPC-SRS-RNTI). In an example, the wireless device may compute an RNTI (e.g., the wireless device may compute RA-RNTI based on resources used for transmission of a preamble). In an example, an RNTI may have a pre-configured value (e.g., P-RNTI or SI-RNTI). In an example, a wireless device may monitor a group common search space which may be used by base station for transmitting DCIs that are intended for a group of UEs. In an example, a group common DCI may correspond to an RNTI which is commonly configured for a group of UEs. In an example, a wireless device may monitor a UE-specific search space. In an example, a UE specific DCI may correspond to an RNTI configured for the wireless device.

A NR system may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources, associated with a CSI-RS resource index (CRI), or one or more DM-RSs of PBCH, may be used as RS for measuring quality of a beam pair link. Quality of a beam pair link may be defined as a reference signal received power (RSRP) value, or a reference signal received quality (RSRQ) value, and/or a CSI value measured on RS resources. The base station may indicate whether an RS resource, used for measuring a beam pair link quality, is quasi-co-located (QCLed) with DM-RSs of a control channel. A RS resource and DM-RSs of a control channel may be called QCLed when a channel characteristics from a transmission on an RS to a wireless device, and that from a transmission on a control channel to a wireless device, are similar or same under a configured criterion. In a multi-beam operation, a wireless device may perform an uplink beam sweeping to access a cell.

In an example, a wireless device may be configured to monitor PDCCH on one or more beam pair links simultaneously depending on a capability of a wireless device. This may increase robustness against beam pair link blocking. A base station may transmit one or more messages to configure a wireless device to monitor PDCCH on one or more beam pair links in different PDCCH OFDM symbols. For example, a base station may transmit higher layer signaling (e.g. RRC signaling) or MAC CE comprising parameters related to the Rx beam setting of a wireless device for monitoring PDCCH on one or more beam pair links. A base station may transmit indication of spatial QCL assumption between an DL RS antenna port(s) (for example, cell-specific CSI-RS, or wireless device-specific CSI-RS, or SS block, or PBCH with or without DM-RSs of PBCH), and DL RS antenna port(s) for demodulation of DL control channel. Signaling for beam indication for a PDCCH may be MAC CE signaling, or RRC signaling, or DCI signaling, or specification-transparent and/or implicit method, and combination of these signaling methods.

For reception of unicast DL data channel, a base station may indicate spatial QCL parameters between DL RS antenna port(s) and DM-RS antenna port(s) of DL data channel. The base station may transmit DCI (e.g. downlink grants) comprising information indicating the RS antenna port(s). The information may indicate RS antenna port(s) which may be QCL-ed with the DM-RS antenna port(s). Different set of DM-RS antenna port(s) for a DL data channel may be indicated as QCL with different set of the RS antenna port(s).

Figure 9A:
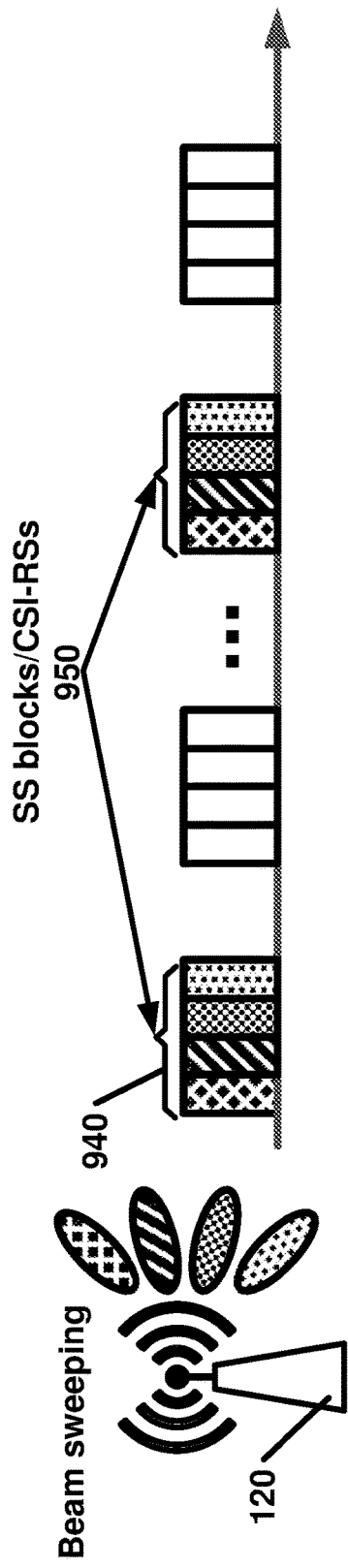
FIG. 9A is a diagram depicting an example CSI-RS and/or SS block transmission in a multi-beam system.

FIG. 9A is an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. For example, in a multi-beam operation, a base station 120 may transmit SS blocks in multiple beams, together forming a SS burst 940. One or more SS blocks may be transmitted on one beam. If multiple SS bursts 940 are transmitted with multiple beams, SS bursts together may form SS burst set 950.

A wireless device may further use CSI-RS in the multi-beam operation for estimating a beam quality of a links between a wireless device and a base station. A beam may be associated with a CSI-RS. For example, a wireless device may, based on a RSRP measurement on CSI-RS, report a beam index, as indicated in a CRI for downlink beam selection, and associated with a RSRP value of a beam. A CSI-RS may be transmitted on a CSI-RS resource including at least one of one or more antenna ports, one or more time or frequency radio resources. A CSI-RS resource may be configured in a cell-specific way by common RRC signaling, or in a wireless device-specific way by dedicated RRC signaling, and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be transmitted periodically, or using aperiodic transmission, or using a multi-shot or semi-persistent transmission. For example, in a periodic transmission in FIG. 9A, a base station 120 may transmit configured CSI-RS resources 940 periodically using a configured periodicity in a time domain. In an aperiodic transmission, a configured CSI-RS resource may be transmitted in a dedicated time slot. In a multi-shot or semi-persistent transmission, a configured CSI-RS resource may be transmitted within a configured period. Beams used for CSI-RS transmission may have different beam width than beams used for SS-blocks transmission.

Figure 9B:
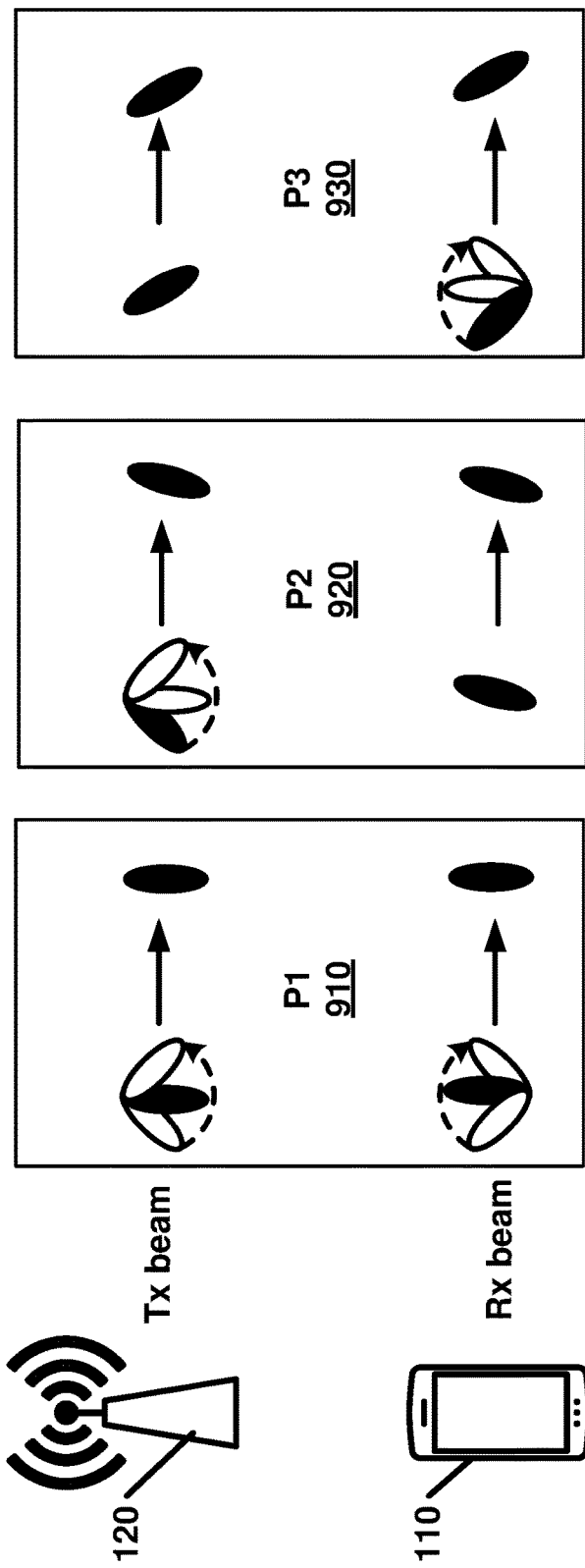
FIG. 9B is a diagram depicting an example downlink beam management procedure as per an aspect of an embodiment of the present disclosure.

FIG. 9B is an example of a beam management procedure in an example new radio network. A base station 120 and/or a wireless device 110 may perform a downlink L1/L2 beam management procedure. One or more of the following downlink L1/L2 beam management procedures may be performed within one or more wireless devices 110 and one or more base stations 120. In an example, a P-1 procedure 910 may be used to enable the wireless device 110 to measure one or more Transmission (Tx) beams associated with the base station 120 to support a selection of a first set of Tx beams associated with the base station 120 and a first set of Rx beam(s) associated with a wireless device 110. For beamforming at a base station 120, a base station 120 may sweep a set of different TX beams. For beamforming at a wireless device 110, a wireless device 110 may sweep a set of different Rx beams. In an example, a P-2 procedure 920 may be used to enable a wireless device 110 to measure one or more Tx beams associated with a base station 120 to possibly change a first set of Tx beams associated with a base station 120. A P-2 procedure 920 may be performed on a possibly smaller set of beams for beam refinement than in the P-1 procedure 910. A P-2 procedure 920 may be a special case of a P-1 procedure 910. In an example, a P-3 procedure 930 may be used to enable a wireless device 110 to measure at least one Tx beam associated with a base station 120 to change a first set of Rx beams associated with a wireless device 110.

A wireless device 110 may transmit one or more beam management reports to a base station 120. In one or more beam management reports, a wireless device 110 may indicate some beam pair quality parameters, comprising at least, one or more beam identifications; RSRP; Precoding Matrix Indicator (PMI)/Channel Quality Indicator (CQI)/Rank Indicator (RI) of a subset of configured beams. Based on one or more beam management reports, a base station 120 may transmit to a wireless device 110 a signal indicating that one or more beam pair links are one or more serving beams. A base station 120 may transmit PDCCH and PDSCH for a wireless device 110 using one or more serving beams.

In an example embodiment, new radio network may support a Bandwidth Adaptation (BA). In an example, receive and/or transmit bandwidths configured by a UE employing a BA may not be large. For example, a receive and/or transmit bandwidths may not be as large as a bandwidth of a cell. Receive and/or transmit bandwidths may be adjustable. For example, a UE may change receive and/or transmit bandwidths, e.g., to shrink during period of low activity to save power. For example, a UE may change a location of receive and/or transmit bandwidths in a frequency domain, e.g. to increase scheduling flexibility. For example, a UE may change a subcarrier spacing, e.g. to allow different services.

In an example embodiment, a subset of a total cell bandwidth of a cell may be referred to as a Bandwidth Part (BWP). A base station may configure a UE with one or more BWPs to achieve a BA. For example, a base station may indicate, to a UE, which of the one or more (configured) BWPs is an active BWP.

Figure 10:
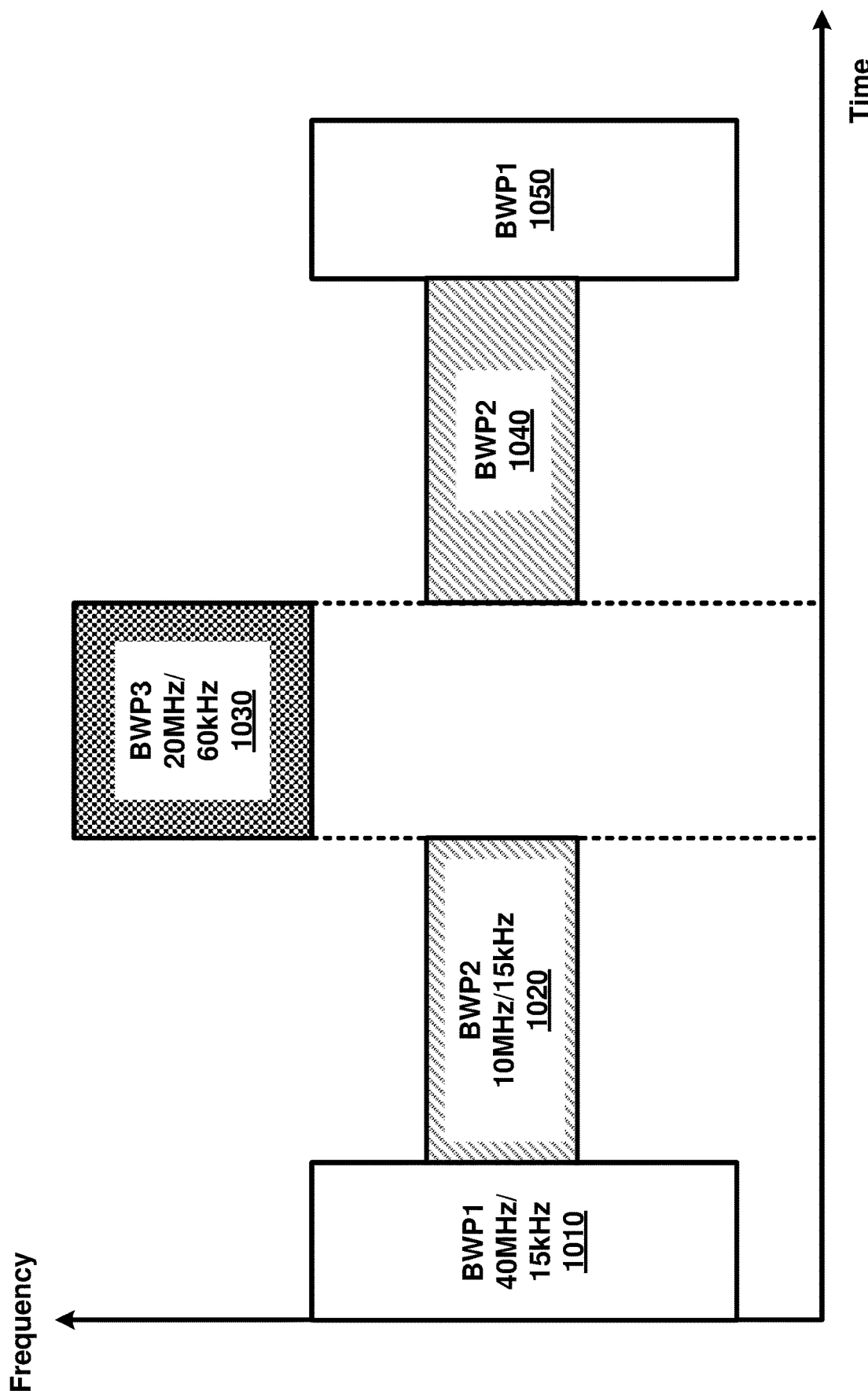
FIG. 10 is an example diagram of configured BWPs as per an aspect of an embodiment of the present disclosure.

FIG. 10 is an example diagram of 3 BWPs configured: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz.

In an example, a UE, configured for operation in one or more BWPs of a cell, may be configured by one or more higher layers (e.g. RRC layer) for a cell a set of one or more BWPs (e.g., at most four BWPs) for receptions by the UE (DL BWP set) in a DL bandwidth by at least one parameter DL-BWP and a set of one or more BWPs (e.g., at most four BWPs) for transmissions by a UE (UL BWP set) in an UL bandwidth by at least one parameter UL-BWP for a cell.

To enable BA on the PCell, a base station may configure a UE with one or more UL and DL BWP pairs. To enable BA on SCells (e.g., in case of CA), a base station may configure a UE at least with one or more DL BWPs (e.g., there may be none in an UL).

In an example, an initial active DL BWP may be defined by at least one of a location and number of contiguous PRBs, a subcarrier spacing, or a cyclic prefix, for a control resource set for at least one common search space. For operation on the PCell, one or more higher layer parameters may indicate at least one initial UL BWP for a random access procedure. If a UE is configured with a secondary carrier on a primary cell, the UE may be configured with an initial BWP for random access procedure on a secondary carrier.

In an example, for unpaired spectrum operation, a UE may expect that a center frequency for a DL BWP may be same as a center frequency for a UL BWP.

For example, for a DL BWP or an UL BWP in a set of one or more DL BWPs or one or more UL BWPs, respectively, a base statin may semi-statically configure a UE for a cell with one or more parameters indicating at least one of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; an offset of a first PRB of a DL bandwidth or an UL bandwidth, respectively, relative to a first PRB of a bandwidth.

In an example, for a DL BWP in a set of one or more DL BWPs on a PCell, a base station may configure a UE with one or more control resource sets for at least one type of common search space and/or one UE-specific search space. For example, a base station may not configure a UE without a common search space on a PCell, or on a PSCell, in an active DL BWP.

For an UL BWP in a set of one or more UL BWPs, a base station may configure a UE with one or more resource sets for one or more PUCCH transmissions.

In an example, if a DCI comprises a BWP indicator field, a BWP indicator field value may indicate an active DL BWP, from a configured DL BWP set, for one or more DL receptions. If a DCI comprises a BWP indicator field, a BWP indicator field value may indicate an active UL BWP, from a configured UL BWP set, for one or more UL transmissions.

In an example, for a PCell, a base station may semi-statically configure a UE with a default DL BWP among configured DL BWPs. If a UE is not provided a default DL BWP, a default BWP may be an initial active DL BWP.

In an example, a base station may configure a UE with a timer value for a PCell. For example, a UE may start a timer, referred to as BWP inactivity timer, when a UE detects a DCI indicating an active DL BWP, other than a default DL BWP, for a paired spectrum operation or when a UE detects a DCI indicating an active DL BWP or UL BWP, other than a default DL BWP or UL BWP, for an unpaired spectrum operation. The UE may increment the timer by an interval of a first value (e.g., the first value may be 1 millisecond or 0.5 milliseconds) if the UE does not detect a DCI during the interval for a paired spectrum operation or for an unpaired spectrum operation. In an example, the timer may expire when the timer is equal to the timer value. A UE may switch to the default DL BWP from an active DL BWP when the timer expires.

In an example, a base station may semi-statically configure a UE with one or more BWPs. A UE may switch an active BWP from a first BWP to a second BWP in response to receiving a DCI indicating the second BWP as an active BWP and/or in response to an expiry of BWP inactivity timer (for example, the second BWP may be a default BWP). For example, FIG. 10 is an example diagram of 3 BWPs configured, BWP1 (1010 and 1050), BWP2 (1020 and 1040), and BWP3 (1030). BWP2 (1020 and 1040) may be a default BWP. BWP1 (1010) may be an initial active BWP. In an example, a UE may switch an active BWP from BWP1 1010 to BWP2 1020 in response to an expiry of BWP inactivity timer. For example, a UE may switch an active BWP from BWP2 1020 to BWP3 1030 in response to receiving a DCI indicating BWP3 1030 as an active BWP. Switching an active BWP from BWP3 1030 to BWP2 1040 and/or from BWP2 1040 to BWP1 1050 may be in response to receiving a DCI indicating an active BWP and/or in response to an expiry of BWP inactivity timer.

In an example, if a UE is configured for a secondary cell with a default DL BWP among configured DL BWPs and a timer value, UE procedures on a secondary cell may be same as on a primary cell using the timer value for the secondary cell and the default DL BWP for the secondary cell.

In an example, if a base station configures a UE with a first active DL BWP and a first active UL BWP on a secondary cell or carrier, a UE may employ an indicated DL BWP and an indicated UL BWP on a secondary cell as a respective first active DL BWP and first active UL BWP on a secondary cell or carrier.

Figure 11A:
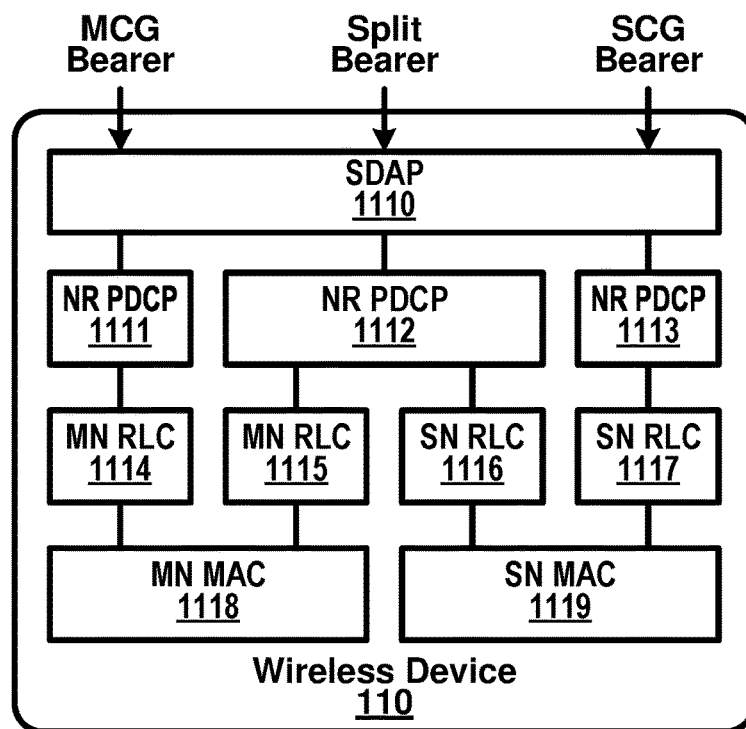
FIG. 11A, and FIG. 11B are diagrams of an example multi connectivity as per an aspect of an embodiment of the present disclosure.
Figure 11B:
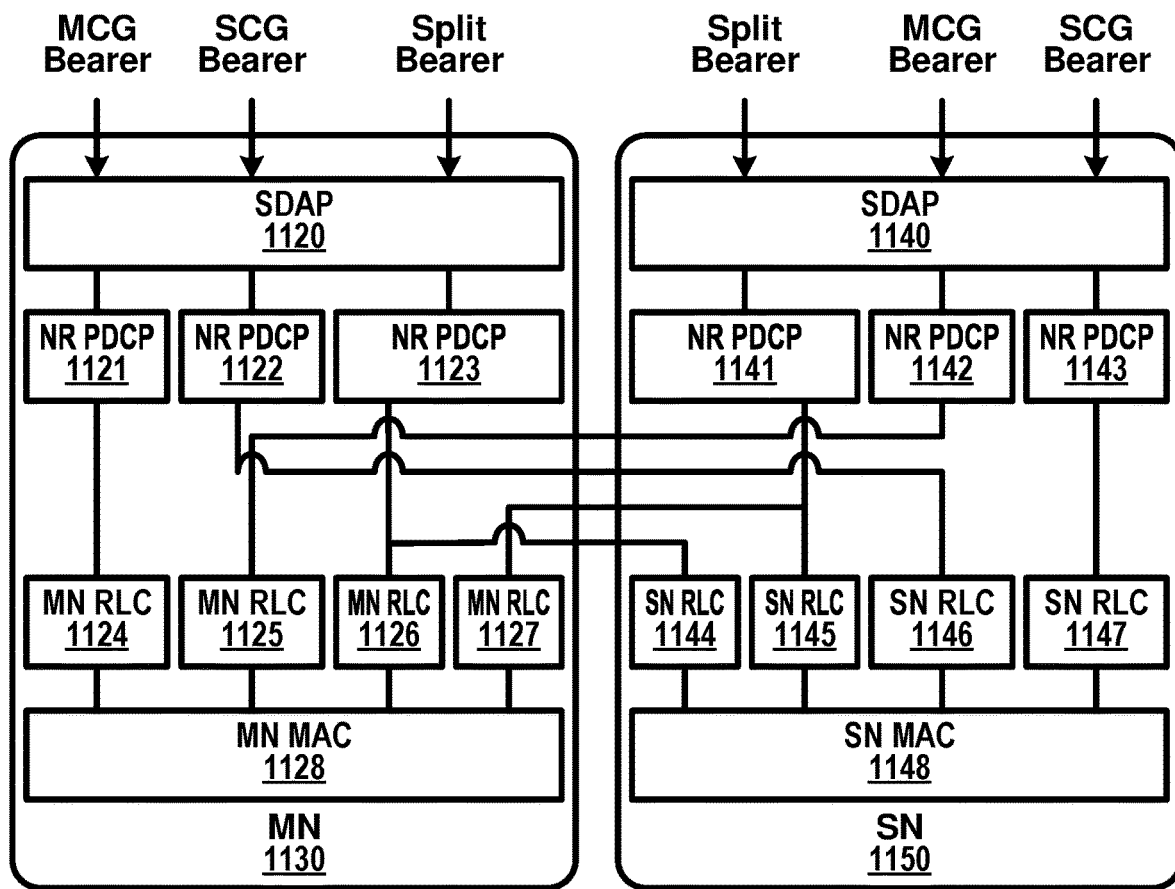

FIG. 11A and FIG. 11B show packet flows employing a multi connectivity (e.g. dual connectivity, multi connectivity, tight interworking, and/or the like). FIG. 11A is an example diagram of a protocol structure of a wireless device 110 (e.g. UE) with CA and/or multi connectivity as per an aspect of an embodiment. FIG. 11B is an example diagram of a protocol structure of multiple base stations with CA and/or multi connectivity as per an aspect of an embodiment. The multiple base stations may comprise a master node, MN 1130 (e.g. a master node, a master base station, a master gNB, a master eNB, and/or the like) and a secondary node, SN 1150 (e.g. a secondary node, a secondary base station, a secondary gNB, a secondary eNB, and/or the like). A master node 1130 and a secondary node 1150 may co-work to communicate with a wireless device 110.

When multi connectivity is configured for a wireless device 110, the wireless device 110, which may support multiple reception/transmission functions in an RRC connected state, may be configured to utilize radio resources provided by multiple schedulers of a multiple base stations. Multiple base stations may be inter-connected via a non-ideal or ideal backhaul (e.g. Xn interface, X2 interface, and/or the like). A base station involved in multi connectivity for a certain wireless device may perform at least one of two different roles: a base station may either act as a master base station or as a secondary base station. In multi connectivity, a wireless device may be connected to one master base station and one or more secondary base stations. In an example, a master base station (e.g. the MN 1130) may provide a master cell group (MCG) comprising a primary cell and/or one or more secondary cells for a wireless device (e.g. the wireless device 110). A secondary base station (e.g. the SN 1150) may provide a secondary cell group (SCG) comprising a primary secondary cell (PSCell) and/or one or more secondary cells for a wireless device (e.g. the wireless device 110).

In multi connectivity, a radio protocol architecture that a bearer employs may depend on how a bearer is setup. In an example, three different type of bearer setup options may be supported: an MCG bearer, an SCG bearer, and/or a split bearer. A wireless device may receive/transmit packets of an MCG bearer via one or more cells of the MCG, and/or may receive/transmits packets of an SCG bearer via one or more cells of an SCG. Multi-connectivity may also be described as having at least one bearer configured to use radio resources provided by the secondary base station. Multi-connectivity may or may not be configured/implemented in some of the example embodiments.

In an example, a wireless device (e.g. Wireless Device 110) may transmit and/or receive: packets of an MCG bearer via an SDAP layer (e.g. SDAP 1110), a PDCP layer (e.g. NR PDCP 1111), an RLC layer (e.g. MN RLC 1114), and a MAC layer (e.g. MN MAC 1118); packets of a split bearer via an SDAP layer (e.g. SDAP 1110), a PDCP layer (e.g. NR PDCP 1112), one of a master or secondary RLC layer (e.g. MN RLC 1115, SN RLC 1116), and one of a master or secondary MAC layer (e.g. MN MAC 1118, SN MAC 1119); and/or packets of an SCG bearer via an SDAP layer (e.g. SDAP 1110), a PDCP layer (e.g. NR PDCP 1113), an RLC layer (e.g. SN RLC 1117), and a MAC layer (e.g. MN MAC 1119).

In an example, a master base station (e.g. MN 1130) and/or a secondary base station (e.g. SN 1150) may transmit/receive: packets of an MCG bearer via a master or secondary node SDAP layer (e.g. SDAP 1120, SDAP 1140), a master or secondary node PDCP layer (e.g. NR PDCP 1121, NR PDCP 1142), a master node RLC layer (e.g. MN RLC 1124, MN RLC 1125), and a master node MAC layer (e.g. MN MAC 1128); packets of an SCG bearer via a master or secondary node SDAP layer (e.g. SDAP 1120, SDAP 1140), a master or secondary node PDCP layer (e.g. NR PDCP 1122, NR PDCP 1143), a secondary node RLC layer (e.g. SN RLC 1146, SN RLC 1147), and a secondary node MAC layer (e.g. SN MAC 1148); packets of a split bearer via a master or secondary node SDAP layer (e.g. SDAP 1120, SDAP 1140), a master or secondary node PDCP layer (e.g. NR PDCP 1123, NR PDCP 1141), a master or secondary node RLC layer (e.g. MN RLC 1126, SN RLC 1144, SN RLC 1145, MN RLC 1127), and a master or secondary node MAC layer (e.g. MN MAC 1128, SN MAC 1148).

In multi connectivity, a wireless device may configure multiple MAC entities: one MAC entity (e.g. MN MAC 1118) for a master base station, and other MAC entities (e.g. SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be applied: at least one cell of an SCG has a configured UL CC and at least one cell of a SCG, named as primary secondary cell (PSCell, PCell of SCG, or sometimes called PCell), is configured with PUCCH resources; when an SCG is configured, there may be at least one SCG bearer or one Split bearer; upon detection of a physical layer problem or a random access problem on a PSCell, or a number of NR RLC retransmissions has been reached associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a wireless device of a SCG failure type, for split bearer, a DL data transfer over a master base station may be maintained; an NR RLC acknowledged mode (AM) bearer may be configured for a split bearer; PCell and/or PSCell may not be de-activated; PSCell may be changed with a SCG change procedure (e.g. with security key change and a RACH procedure); and/or a bearer type change between a split bearer and a SCG bearer or simultaneous configuration of a SCG and a split bearer may or may not supported.

With respect to interaction between a master base station and a secondary base stations for multi-connectivity, one or more of the following may be applied: a master base station and/or a secondary base station may maintain RRM measurement configurations of a wireless device; a master base station may (e.g. based on received measurement reports, traffic conditions, and/or bearer types) may decide to request a secondary base station to provide additional resources (e.g. serving cells) for a wireless device; upon receiving a request from a master base station, a secondary base station may create/modify a container that may result in configuration of additional serving cells for a wireless device (or decide that the secondary base station has no resource available to do so); for a UE capability coordination, a master base station may provide (a part of) an AS configuration and UE capabilities to a secondary base station; a master base station and a secondary base station may exchange information about a UE configuration by employing of RRC containers (inter-node messages) carried via Xn messages; a secondary base station may initiate a reconfiguration of the secondary base station existing serving cells (e.g. PUCCH towards the secondary base station); a secondary base station may decide which cell is a PSCell within a SCG; a master base station may or may not change content of RRC configurations provided by a secondary base station; in case of a SCG addition and/or a SCG SCell addition, a master base station may provide recent (or the latest) measurement results for SCG cell(s); a master base station and secondary base stations may receive information of SFN and/or subframe offset of each other from OAM and/or via an Xn interface, (e.g. for a purpose of DRX alignment and/or identification of a measurement gap). In an example, when adding a new SCG SCell, dedicated RRC signaling may be used for sending required system information of a cell as for CA, except for an SFN acquired from a MIB of a PSCell of a SCG.

Figure 12:
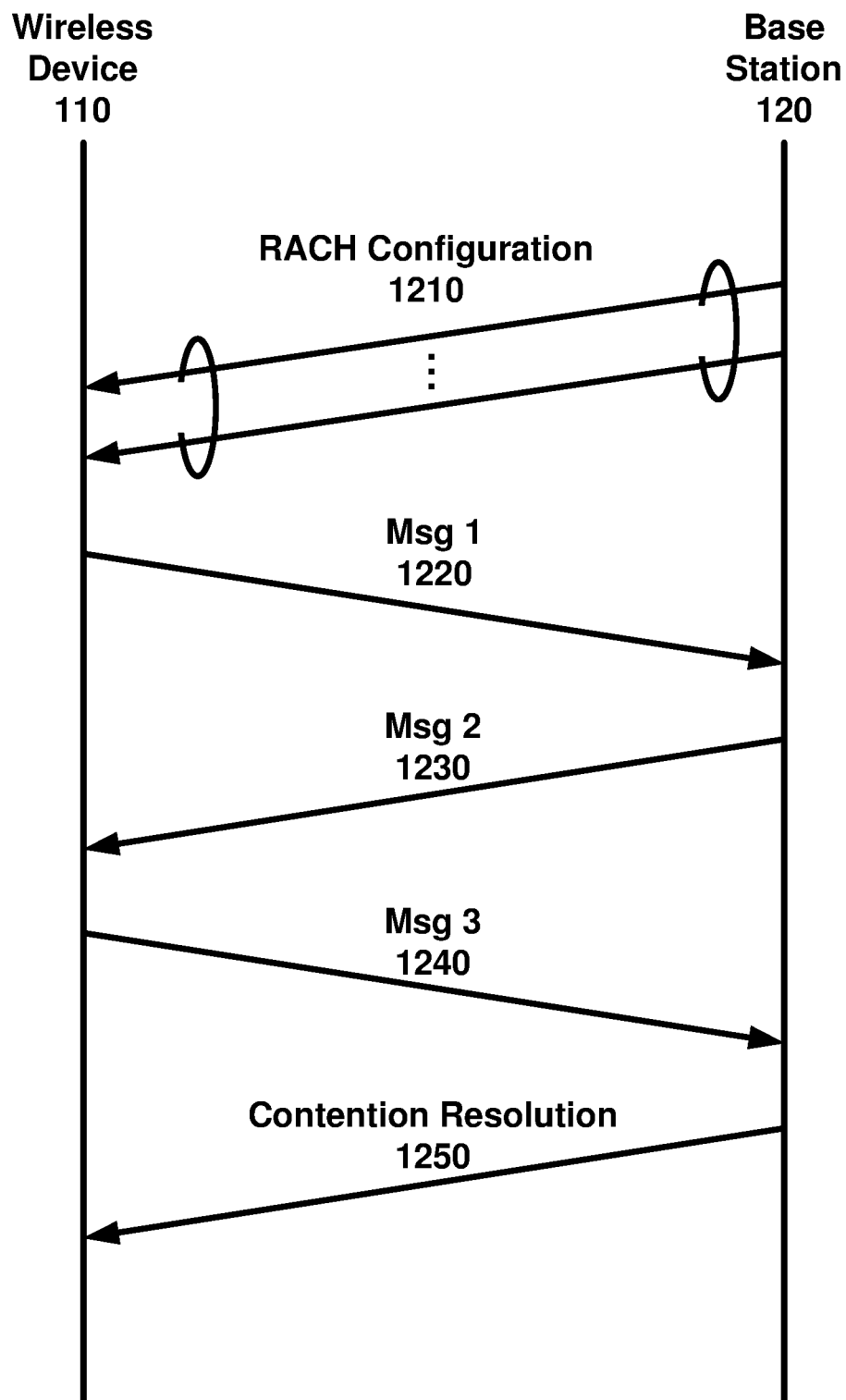
FIG. 12 is a diagram of an example random access procedure as per an aspect of an embodiment of the present disclosure.

FIG. 12 is an example diagram of a random access procedure. One or more events may trigger a random access procedure. For example, one or more events may be at least one of following: initial access from RRC_IDLE, RRC connection re-establishment procedure, handover, DL or UL data arrival during RRC_CONNECTED when UL synchronization status is non-synchronized, transition from RRC_Inactive, and/or request for other system information. For example, a PDCCH order, a MAC entity, and/or a beam failure indication may initiate a random access procedure.

In an example embodiment, a random access procedure may be at least one of a contention based random access procedure and a contention free random access procedure. For example, a contention based random access procedure may comprise, one or more Msg 1 1220 transmissions, one or more Msg 2 1230 transmissions, one or more Msg 3 1240 transmissions, and contention resolution 1250. For example, a contention free random access procedure may comprise one or more Msg 1 1220 transmissions and one or more Msg 2 1230 transmissions.

In an example, a base station may transmit (e.g., unicast, multicast, or broadcast), to a UE, a RACH configuration 1210 via one or more beams. The RACH configuration 1210 may comprise one or more parameters indicating at least one of following: available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), random access preamble index, a maximum number of preamble transmission, preamble group A and group B, a threshold (e.g., message size) to determine the groups of random access preambles, a set of one or more random access preambles for system information request and corresponding PRACH resource(s), if any, a set of one or more random access preambles for beam failure recovery request and corresponding PRACH resource(s), if any, a time window to monitor random access response(s) (RARs), a time window to monitor response(s) on beam failure recovery request, and/or a contention resolution timer.

In an example, the Msg 1 1220 may be one or more transmissions of a random access preamble. For a contention based random access procedure, a UE may select a SS block with a RSRP above the RSRP threshold. If random access preambles group B exists, a UE may select one or more random access preambles from a group A or a group B depending on a potential Msg 3 1240 size. If a random access preambles group B does not exist, a UE may select the one or more random access preambles from a group A. A UE may select a random access preamble index randomly (e.g. with equal probability or a normal distribution) from one or more random access preambles associated with a selected group. If a base station semi-statically configures a UE with an association between random access preambles and SS blocks, the UE may select a random access preamble index randomly with equal probability from one or more random access preambles associated with a selected SS block and a selected group.

For example, a UE may initiate a contention free random access procedure based on a beam failure indication from a lower layer. For example, a base station may semi-statically configure a UE with one or more contention free PRACH resources for beam failure recovery request associated with at least one of SS blocks and/or CSI-RSs. If at least one of SS blocks with a RSRP above a first RSRP threshold amongst associated SS blocks or at least one of CSI-RSs with a RSRP above a second RSRP threshold amongst associated CSI-RSs is available, a UE may select a random access preamble index corresponding to a selected SS block or CSI-RS from a set of one or more random access preambles for beam failure recovery request.

For example, a UE may receive, from a base station, a random access preamble index via PDCCH or RRC for a contention free random access procedure. If a base station does not configure a UE with at least one contention free PRACH resource associated with SS blocks or CSI-RS, the UE may select a random access preamble index. If a base station configures a UE with one or more contention free PRACH resources associated with SS blocks and at least one SS block with a RSRP above a first RSRP threshold amongst associated SS blocks is available, the UE may select the at least one SS block and select a random access preamble corresponding to the at least one SS block. If a base station configures a UE with one or more contention free PRACH resources associated with CSI-RS s and at least one CSI-RS with a RSRP above a second RSPR threshold amongst the associated CSI-RSs is available, the UE may select the at least one CSI-RS and select a random access preamble corresponding to the at least one CSI-RS.

A UE may perform one or more Msg 1 1220 transmissions by transmitting the selected random access preamble. For example, if a UE selects an SS block and is configured with an association between one or more PRACH occasions and one or more SS blocks, the UE may determine an PRACH occasion from one or more PRACH occasions corresponding to a selected SS block. For example, if a UE selects a CSI-RS and is configured with an association between one or more PRACH occasions and one or more CSI-RSs, the UE may determine a PRACH occasion from one or more PRACH occasions corresponding to a selected CSI-RS. A UE may transmit, to a base station, a selected random access preamble via a selected PRACH occasions. A UE may determine a transmit power for a transmission of a selected random access preamble at least based on an initial preamble power and a power-ramping factor. A UE may determine a RA-RNTI associated with a selected PRACH occasions in which a selected random access preamble is transmitted. For example, a UE may not determine a RA-RNTI for a beam failure recovery request. A UE may determine an RA-RNTI at least based on an index of a first OFDM symbol and an index of a first slot of a selected PRACH occasions, and/or an uplink carrier index for a transmission of Msg 1 1220.

In an example, a UE may receive, from a base station, a random access response, Msg 2 1230. A UE may start a time window (e.g., ra-ResponseWindow) to monitor a random access response. For beam failure recovery request, a base station may configure a UE with a different time window (e.g., bfr-ResponseWindow) to monitor response on beam failure recovery request. For example, a UE may start a time window (e.g., ra-ResponseWindow or bfr-ResponseWindow) at a start of a first PDCCH occasion after a fixed duration of one or more symbols from an end of a preamble transmission. If a UE transmits multiple preambles, the UE may start a time window at a start of a first PDCCH occasion after a fixed duration of one or more symbols from an end of a first preamble transmission. A UE may monitor a PDCCH of a cell for at least one random access response identified by a RA-RNTI or for at least one response to beam failure recovery request identified by a C-RNTI while a timer for a time window is running.

In an example, a UE may consider a reception of random access response successful if at least one random access response comprises a random access preamble identifier corresponding to a random access preamble transmitted by the UE. A UE may consider the contention free random access procedure successfully completed if a reception of random access response is successful. If a contention free random access procedure is triggered for a beam failure recovery request, a UE may consider a contention free random access procedure successfully complete if a PDCCH transmission is addressed to a C-RNTI. In an example, if at least one random access response comprises a random access preamble identifier, a UE may consider the random access procedure successfully completed and may indicate a reception of an acknowledgement for a system information request to upper layers. If a UE has signaled multiple preamble transmissions, the UE may stop transmitting remaining preambles (if any) in response to a successful reception of a corresponding random access response.

In an example, a UE may perform one or more Msg 3 1240 transmissions in response to a successful reception of random access response (e.g., for a contention based random access procedure). A UE may adjust an uplink transmission timing based on a timing advanced command indicated by a random access response and may transmit one or more transport blocks based on an uplink grant indicated by a random access response. Subcarrier spacing for PUSCH transmission for Msg 3 1240 may be provided by at least one higher layer (e.g. RRC) parameter. A UE may transmit a random access preamble via PRACH and Msg 3 1240 via PUSCH on a same cell. A base station may indicate an UL BWP for a PUSCH transmission of Msg 3 1240 via system information block. A UE may employ HARQ for a retransmission of Msg 3 1240.

In an example, multiple UEs may perform Msg 1 1220 by transmitting a same preamble to a base station and receive, from the base station, a same random access response comprising an identity (e.g., TC-RNTI). Contention resolution 1250 may ensure that a UE does not incorrectly use an identity of another UE. For example, contention resolution 1250 may be based on C-RNTI on PDCCH or a UE contention resolution identity on DL-SCH. For example, if a base station assigns a C-RNTI to a UE, the UE may perform contention resolution 1250 based on a reception of a PDCCH transmission that is addressed to the C-RNTI. In response to detection of a C-RNTI on a PDCCH, a UE may consider contention resolution 1250 successful and may consider a random access procedure successfully completed. If a UE has no valid C-RNTI, a contention resolution may be addressed by employing a TC-RNTI. For example, if a MAC PDU is successfully decoded and a MAC PDU comprises a UE contention resolution identity MAC CE that matches the CCCH SDU transmitted in Msg 3 1250, a UE may consider the contention resolution 1250 successful and may consider the random access procedure successfully completed.

Figure 13:
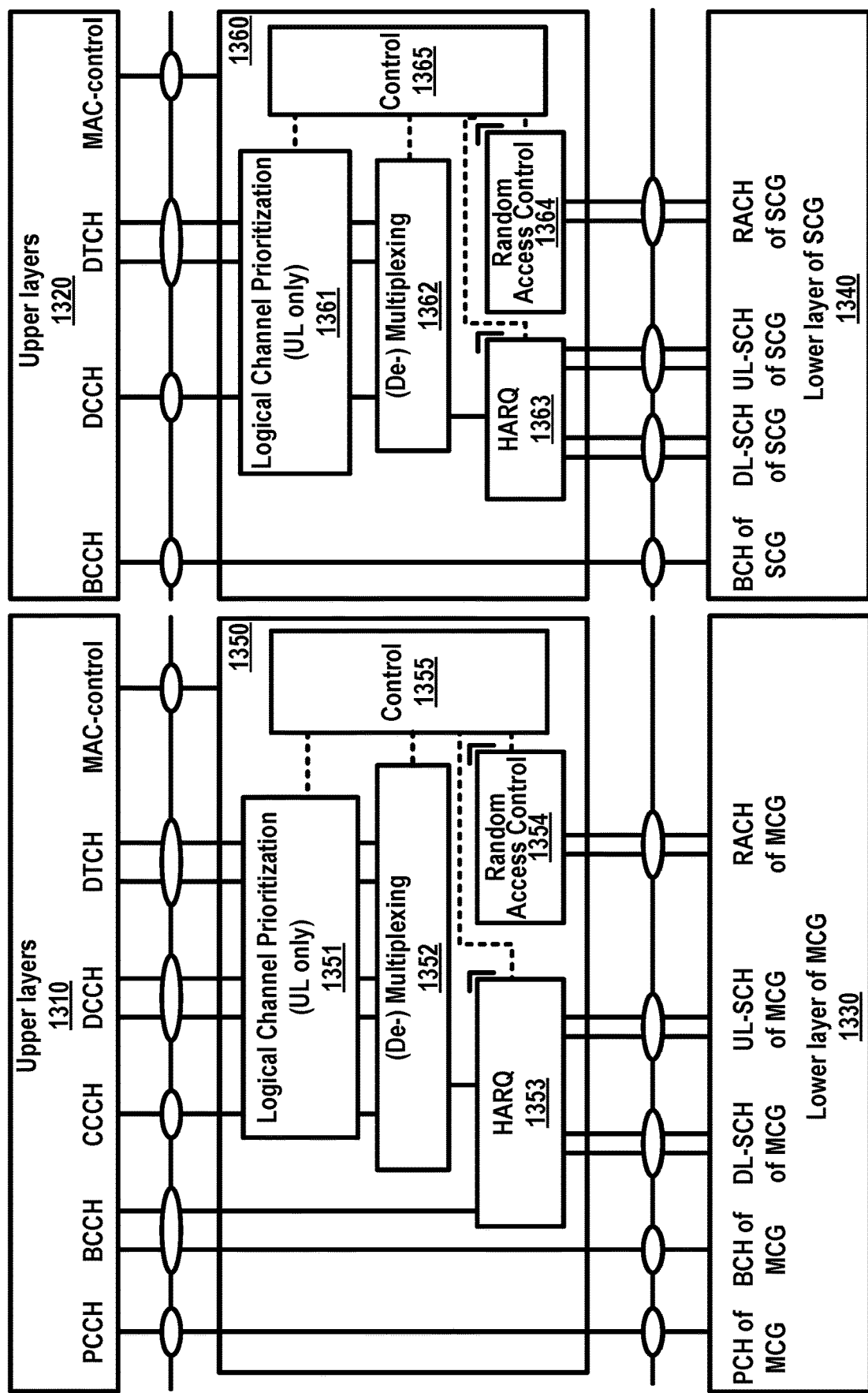
FIG. 13 is a structure of example MAC entities as per an aspect of an embodiment of the present disclosure.

FIG. 13 is an example structure for MAC entities as per an aspect of an embodiment. In an example, a wireless device may be configured to operate in a multi-connectivity mode. A wireless device in RRC_CONNECTED with multiple RX/TX may be configured to utilize radio resources provided by multiple schedulers located in a plurality of base stations. The plurality of base stations may be connected via a non-ideal or ideal backhaul over the Xn interface. In an example, a base station in a plurality of base stations may act as a master base station or as a secondary base station. A wireless device may be connected to one master base station and one or more secondary base stations. A wireless device may be configured with multiple MAC entities, e.g. one MAC entity for master base station, and one or more other MAC entities for secondary base station(s). In an example, a configured set of serving cells for a wireless device may comprise two subsets: an MCG comprising serving cells of a master base station, and one or more SCGs comprising serving cells of a secondary base station(s). FIG. 13 illustrates an example structure for MAC entities when MCG and SCG are configured for a wireless device.

In an example, at least one cell in a SCG may have a configured UL CC, wherein a cell of at least one cell may be called PSCell or PCell of SCG, or sometimes may be simply called PCell. A PSCell may be configured with PUCCH resources. In an example, when a SCG is configured, there may be at least one SCG bearer or one split bearer. In an example, upon detection of a physical layer problem or a random access problem on a PSCell, or upon reaching a number of RLC retransmissions associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a UE of a SCG failure type and DL data transfer over a master base station may be maintained.

In an example, a MAC sublayer may provide services such as data transfer and radio resource allocation to upper layers (e.g. 1310 or 1320). A MAC sublayer may comprise a plurality of MAC entities (e.g. 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. For example, BCCH, PCCH, CCCH and DCCH may be control channels and DTCH may be a traffic channel. In an example, a first MAC entity (e.g. 1310) may provide services on PCCH, BCCH, CCCH, DCCH, DTCH and MAC control elements. In an example, a second MAC entity (e.g. 1320) may provide services on BCCH, DCCH, DTCH and MAC control elements.

A MAC sublayer may expect from a physical layer (e.g. 1330 or 1340) services such as data transfer services, signaling of HARQ feedback, signaling of scheduling request or measurements (e.g. CQI). In an example, in dual connectivity, two MAC entities may be configured for a wireless device: one for MCG and one for SCG. A MAC entity of wireless device may handle a plurality of transport channels. In an example, a first MAC entity may handle first transport channels comprising a PCCH of MCG, a first BCH of MCG, one or more first DL-SCHs of MCG, one or more first UL-SCHs of MCG and one or more first RACHs of MCG. In an example, a second MAC entity may handle second transport channels comprising a second BCH of SCG, one or more second DL-SCHs of SCG, one or more second UL-SCHs of SCG and one or more second RACHs of SCG.

In an example, if a MAC entity is configured with one or more SCells, there may be multiple DL-SCHs and there may be multiple UL-SCHs as well as multiple RACHs per MAC entity. In an example, there may be one DL-SCH and UL-SCH on a SpCell. In an example, there may be one DL-SCH, zero or one UL-SCH and zero or one RACH for an SCell. A DL-SCH may support receptions using different numerologies and/or TTI duration within a MAC entity. A UL-SCH may also support transmissions using different numerologies and/or TTI duration within the MAC entity.

In an example, a MAC sublayer may support different functions and may control these functions with a control (e.g. 1355 or 1365) element. Functions performed by a MAC entity may comprise mapping between logical channels and transport channels (e.g., in uplink or downlink), multiplexing (e.g. 1352 or 1362) of MAC SDUs from one or different logical channels onto transport blocks (TB) to be delivered to the physical layer on transport channels (e.g., in uplink), demultiplexing (e.g. 1352 or 1362) of MAC SDUs to one or different logical channels from transport blocks (TB) delivered from the physical layer on transport channels (e.g., in downlink), scheduling information reporting (e.g., in uplink), error correction through HARQ in uplink or downlink (e.g. 1363), and logical channel prioritization in uplink (e.g. 1351 or 1361). A MAC entity may handle a random access process (e.g. 1354 or 1364).

Figure 14:
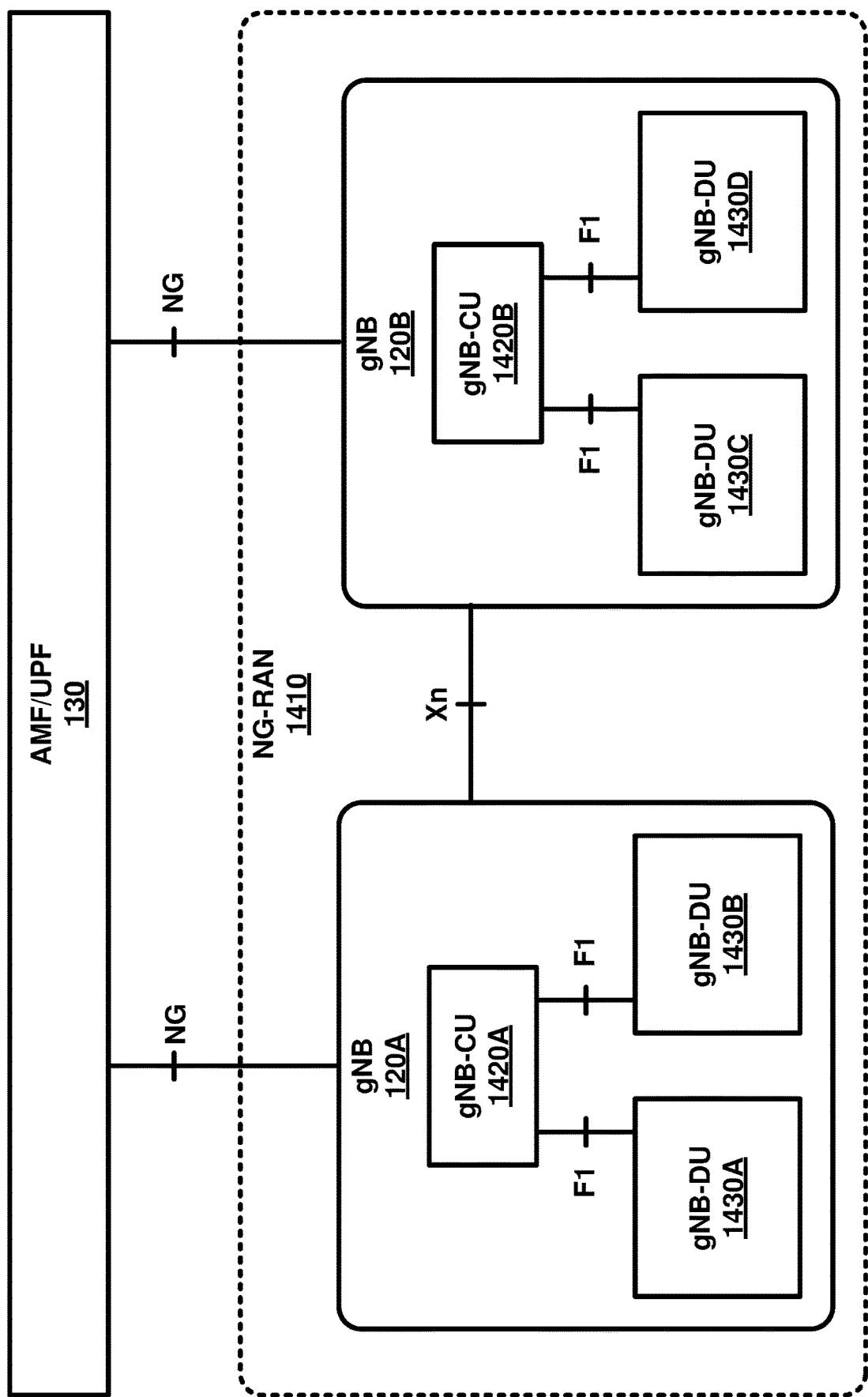
FIG. 14 is a diagram of an example RAN architecture as per an aspect of an embodiment of the present disclosure.

FIG. 14 is an example diagram of a RAN architecture comprising one or more base stations. In an example, a protocol stack (e.g. RRC, SDAP, PDCP, RLC, MAC, and PHY) may be supported at a node. A base station (e.g. 120A or 120B) may comprise a base station central unit (CU) (e.g. gNB-CU 1420A or 1420B) and at least one base station distributed unit (DU) (e.g. gNB-DU 1430A, 1430B, 1430C, or 1430D) if a functional split is configured. Upper protocol layers of a base station may be located in a base station CU, and lower layers of the base station may be located in the base station DUs. An F1 interface (e.g. CU-DU interface) connecting a base station CU and base station DUs may be an ideal or non-ideal backhaul. F1-C may provide a control plane connection over an F1 interface, and F1-U may provide a user plane connection over the F1 interface. In an example, an Xn interface may be configured between base station CUs.

In an example, a base station CU may comprise an RRC function, an SDAP layer, and a PDCP layer, and base station DUs may comprise an RLC layer, a MAC layer, and a PHY layer. In an example, various functional split options between a base station CU and base station DUs may be possible by locating different combinations of upper protocol layers (RAN functions) in a base station CU and different combinations of lower protocol layers (RAN functions) in base station DUs. A functional split may support flexibility to move protocol layers between a base station CU and base station DUs depending on service requirements and/or network environments.

In an example, functional split options may be configured per base station, per base station CU, per base station DU, per UE, per bearer, per slice, or with other granularities. In per base station CU split, a base station CU may have a fixed split option, and base station DUs may be configured to match a split option of a base station CU. In per base station DU split, a base station DU may be configured with a different split option, and a base station CU may provide different split options for different base station DUs. In per UE split, a base station (base station CU and at least one base station DUs) may provide different split options for different wireless devices. In per bearer split, different split options may be utilized for different bearers. In per slice splice, different split options may be applied for different slices.

Figure 15:
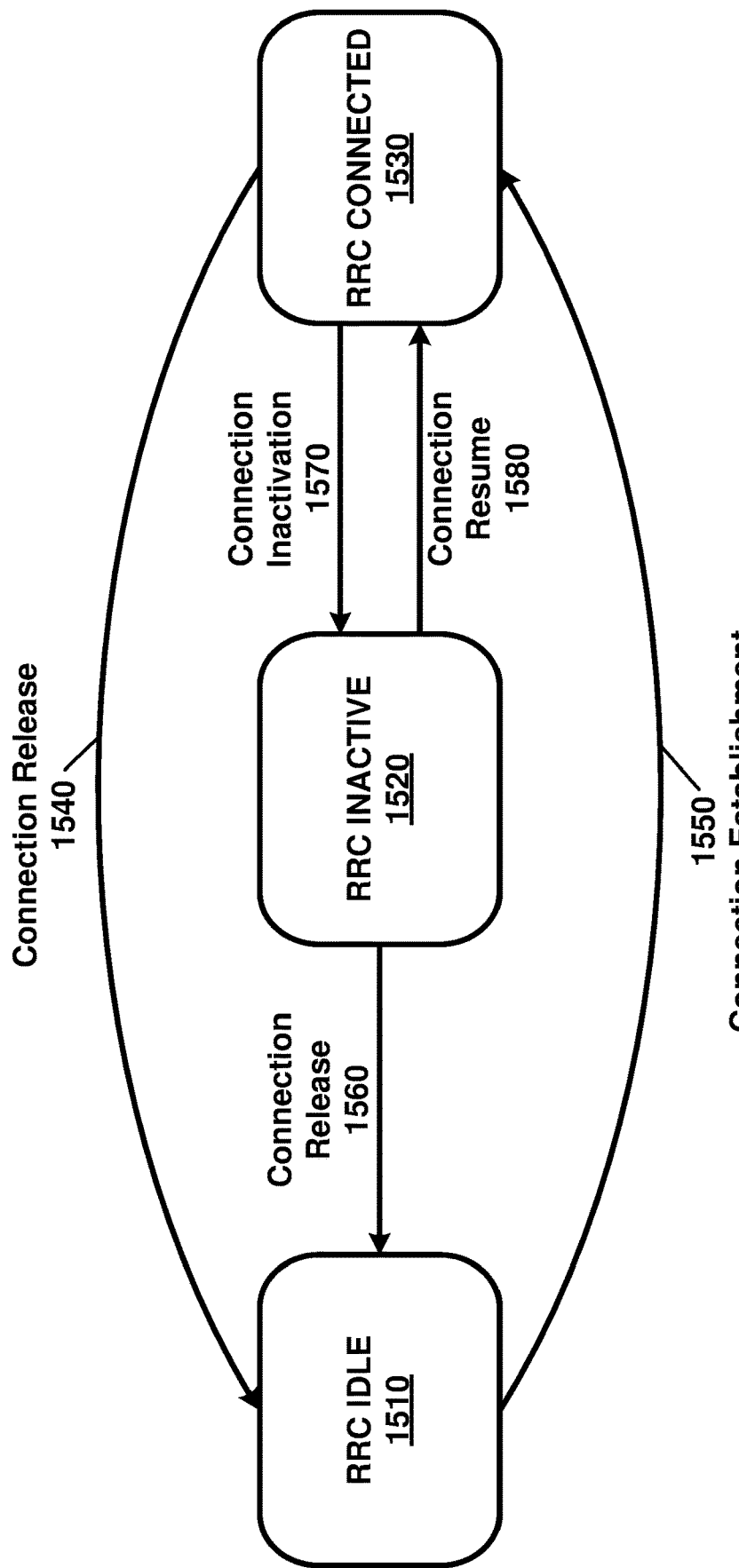
FIG. 15 is a diagram of example RRC states as per an aspect of an embodiment of the present disclosure.

FIG. 15 is an example diagram showing RRC state transitions of a wireless device. In an example, a wireless device may be in at least one RRC state among an RRC connected state (e.g. RRC Connected 1530, RRC_Connected), an RRC idle state (e.g. RRC Idle 1510, RRC_Idle), and/or an RRC inactive state (e.g. RRC Inactive 1520, RRC_Inactive). In an example, in an RRC connected state, a wireless device may have at least one RRC connection with at least one base station (e.g. gNB and/or eNB), which may have a UE context of the wireless device. A UE context (e.g. a wireless device context) may comprise at least one of an access stratum context, one or more radio link configuration parameters, bearer (e.g. data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an example, in an RRC idle state, a wireless device may not have an RRC connection with a base station, and a UE context of a wireless device may not be stored in a base station. In an example, in an RRC inactive state, a wireless device may not have an RRC connection with a base station. A UE context of a wireless device may be stored in a base station, which may be called as an anchor base station (e.g. last serving base station).

In an example, a wireless device may transition a UE RRC state between an RRC idle state and an RRC connected state in both ways (e.g. connection release 1540 or connection establishment 1550; or connection reestablishment) and/or between an RRC inactive state and an RRC connected state in both ways (e.g. connection inactivation 1570 or connection resume 1580). In an example, a wireless device may transition its RRC state from an RRC inactive state to an RRC idle state (e.g. connection release 1560).

In an example, an anchor base station may be a base station that may keep a UE context (a wireless device context) of a wireless device at least during a time period that a wireless device stays in a RAN notification area (RNA) of an anchor base station, and/or that a wireless device stays in an RRC inactive state. In an example, an anchor base station may be a base station that a wireless device in an RRC inactive state was lastly connected to in a latest RRC connected state or that a wireless device lastly performed an RNA update procedure in. In an example, an RNA may comprise one or more cells operated by one or more base stations. In an example, a base station may belong to one or more RNAs. In an example, a cell may belong to one or more RNAs.

In an example, a wireless device may transition a UE RRC state from an RRC connected state to an RRC inactive state in a base station. A wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

In an example, an anchor base station may broadcast a message (e.g. RAN paging message) to base stations of an RNA to reach to a wireless device in an RRC inactive state, and/or the base stations receiving the message from the anchor base station may broadcast and/or multicast another message (e.g. paging message) to wireless devices in their coverage area, cell coverage area, and/or beam coverage area associated with the RNA through an air interface.

In an example, when a wireless device in an RRC inactive state moves into a new RNA, the wireless device may perform an RNA update (RNAU) procedure, which may comprise a random access procedure by the wireless device and/or a UE context retrieve procedure. A UE context retrieve may comprise: receiving, by a base station from a wireless device, a random access preamble; and fetching, by a base station, a UE context of the wireless device from an old anchor base station. Fetching may comprise: sending a retrieve UE context request message comprising a resume identifier to the old anchor base station and receiving a retrieve UE context response message comprising the UE context of the wireless device from the old anchor base station.

In an example embodiment, a wireless device in an RRC inactive state may select a cell to camp on based on at least a on measurement results for one or more cells, a cell where a wireless device may monitor an RNA paging message and/or a core network paging message from a base station. In an example, a wireless device in an RRC inactive state may select a cell to perform a random access procedure to resume an RRC connection and/or to transmit one or more packets to a base station (e.g. to a network). In an example, if a cell selected belongs to a different RNA from an RNA for a wireless device in an RRC inactive state, the wireless device may initiate a random access procedure to perform an RNA update procedure. In an example, if a wireless device in an RRC inactive state has one or more packets, in a buffer, to transmit to a network, the wireless device may initiate a random access procedure to transmit one or more packets to a base station of a cell that the wireless device selects. A random access procedure may be performed with two messages (e.g. 2 stage random access) and/or four messages (e.g. 4 stage random access) between the wireless device and the base station.

In an example embodiment, a base station receiving one or more uplink packets from a wireless device in an RRC inactive state may fetch a UE context of a wireless device by transmitting a retrieve UE context request message for the wireless device to an anchor base station of the wireless device based on at least one of an AS context identifier, an RNA identifier, a base station identifier, a resume identifier, and/or a cell identifier received from the wireless device. In response to fetching a UE context, a base station may transmit a path switch request for a wireless device to a core network entity (e.g. AMF, MME, and/or the like). A core network entity may update a downlink tunnel endpoint identifier for one or more bearers established for the wireless device between a user plane core network entity (e.g. UPF, S-GW, and/or the like) and a RAN node (e.g. the base station), e.g. changing a downlink tunnel endpoint identifier from an address of the anchor base station to an address of the base station.

In an example, a base station may configure a wireless device with a serving cell comprising one or more BWPs. In an example, upon/in response to initiation of the Random Access procedure on a Serving Cell, if PRACH occasions are not configured for the active UL BWP, the MAC entity may switch the active UL BWP to BWP indicated by initialUplinkBWP and if the Serving Cell is a SpCell, the MAC entity may switch the active DL BWP to BWP indicated by initialDownlinkBWP. The MAC entity may perform the Random Access procedure on the active DL BWP of SpCell and active UL BWP of this Serving Cell.

In an example, upon/in response to initiation of the Random Access procedure on a Serving Cell, if PRACH occasions are configured for the active UL BWP, if the Serving Cell is a SpCell and if the active DL BWP does not have the same bwp-Id as the active UL BWP, the MAC entity may switch the active DL BWP to the DL BWP with the same bwp-Id as the active UL BWP. The MAC entity may perform the Random Access procedure on the active DL BWP of SpCell and active UL BWP of this Serving Cell.

An initial active DL BWP may be defined by a location and number of contiguous PRBs, a subcarrier spacing, and a cyclic prefix, for the control resource set for Type0-PDCCH common search space. For operation on the primary cell or on a secondary cell, a wireless device may be provided an initial active UL BWP by higher layer parameter initialuplinkBWP. The wireless device may be provided an initial UL BWP on the supplementary carrier by higher layer parameter (e.g., initialUplinkBWP) in supplementaryUplink, e.g., if the wireless device is configured with a supplementary carrier.

A wireless device may receive, from a base station, message(s) that configures the wireless device with one or more UL carriers associated with one DL carrier of a cell. A first UL carrier of the one or more UL carriers may be referred to as a normal UL (NUL) carrier. A second carrier of the one or more UL carriers configured may be referred to as a supplementary uplink (SUL) carrier. In an example, a base station enhances a UL coverage and/or a capacity by configuring NUL and SUL carriers in a cell. For example, NUL and SUL carriers are configured in different frequency bands (e.g., NUL carrier in a high frequency band and SUL carrier in a low frequency band or vice versa). A base station may configure a BWP configuration per an uplink (e.g., per uplink carrier) in a cell. A base station may configure one or more first BWPs on an SUL separately from one or more second BWPs on a NUL. A base station may control a first active BWP of an SUL independently of a second active BWP of an NUL in a cell. For example, a base station may control two uplink transmissions on two ULs (e.g., NUL and SUL carriers) to avoid overlapping PUSCH transmissions in time in a cell. An SUL carrier and/or an NUL carrier may be configured in unlicensed band(s). A base station may configure a wireless device with one or more following operations in a cell: an SUL carrier in a licensed band and a NUL carrier in a licensed band, an SUL carrier in a licensed band and an NUL carrier in an unlicensed band, an SUL carrier in an unlicensed band and an NUL carrier in a licensed band, and/or an SUL carrier in an unlicensed band and an NUL carrier in an unlicensed band A base station may avoid configuring parallel uplink transmissions via SUL and NUL carriers of a cell, wherein the parallel uplink transmissions may be PUCCH (and/or PUSCH and/or SRS) via an SUL carrier and PUCCH (and/or PUSCH and/or SRS) via an NUL carrier. In an example, a base station may transmit, to a wireless device, one or more RRC message (e.g., wireless device specific RRC signaling)

to (re-) configure a location of a PUCCH on an SUL carrier and/or on an NUL carrier. A base station may transmit, to a wireless device, one or more RRC messages comprising configuration parameters of a carrier (e.g., an SUL or NUL carrier), wherein the configuration parameters may indicate at least one of random access procedure configuration, BWP configurations (e.g., number of DL/UL BWPs, bandwidth and/or index of configured DL/UL BWP, and/or initial, default, and/or active DL/UL BWP), PUSCH configurations, PUCCH configurations, SRS configurations, and/or an uplink (and/or downlink) power control parameters.

A wireless device may perform a random access procedure (e.g., initial access) via an SUL carrier and/or an NUL carrier. For example, to perform a random access to a cell configured with an SUL carrier, a wireless device receives, from a base station, a first RACH configuration 1210 of an SUL carrier, e.g., the first RACH configuration that may be independently configured with a second RACH configuration of an NUL carrier. For example, one or more parameters associated with Msg 1 1220, Msg 2 1230, Msg 3 1240, and/or contention resolution 1250 via an SUL carrier are configured independent of one or more parameters associated with Msg 1 1220, Msg 2 1230, Msg 3 1240, and/or contention resolution 1250 via an NUL carrier. For example, one or more parameters associated with PRACH transmissions in Msg 1 1220 via an SUL carrier may be independent of one or more parameters associated with PRACH transmission via an NUL carrier.

A wireless device may determine which carrier (e.g., between NUL and SUL) to use based on a measurement (e.g., RSRP, RSRQ, and/or SNR) of one or more DL pathloss references. For example, a wireless device select a first carrier (e.g., an SUL or NUL carrier) if a measured quality (e.g., in terms of RSRP, RSRQ, and/or SNR) of DL pathloss reference(s) is lower than a value configured/broadcast by a base station (e.g., an RRC parameter, rsrp-ThresholdSSB-SUL in RACH-ConfigCommon). A wireless device may perform one or more uplink transmissions associated during a random access procedure on a same UL carrier, e.g., if the wireless device selects a UL carrier between an SUL carrier and an NUL carrier for the random access procedure. For example, a wireless device selects an UL carrier for a random access procedure and perform Msg 1 and Msg 3 transmissions on the UL carrier during the random access procedure.

In an example, a base station may configure an NUL carrier and an SUL carrier with a same TAG. For example, for an uplink transmission of a first carrier (e.g., SUL) of a cell, a wireless device may employ a TA value received during a random access procedure via a second carrier (e.g., NUL) of the cell. An NUL carrier and an SUL carrier may be in different TAGs. For example, one or more first UL transmissions scheduled/performed via an NUL carrier is associated with a first TRP (transmission and reception point) and one or more second UL transmissions scheduled/performed via an SUL carrier is associated with a second TRP (transmission and reception point). The one or more first UL transmissions and one or more second UL transmissions may have different TA values, e.g., if a base station experiences different propagation delays from a wireless device to the first TRP and the second TRP.

Figure 16:
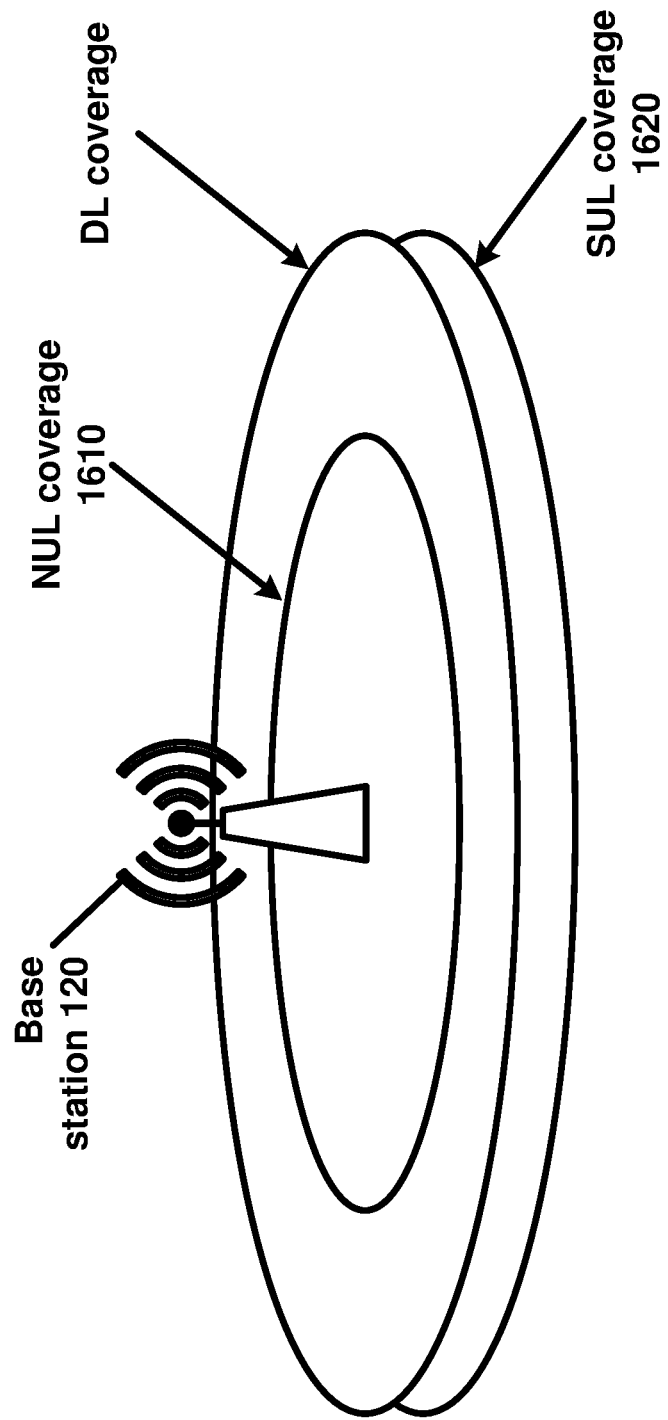
FIG. 16 is an example of a coverage of a cell configured with a DL and two ULs as per an aspect of an embodiment of the present disclosure.

FIG. 16 is an example of a coverage of a cell configured with a DL carrier and two UL carriers. For example, a base station may configure an NUL carrier and a DL carrier over a first frequency (e.g., high frequency). An SUL carrier may be configured over a second frequency (e.g., low frequency) to enhance uplink transmission (e.g., in terms of coverage and/or capacity) of a cell. In an example, a base station determine a broadcast/configured value (e.g., an RRC parameter, rsrp-ThresholdSSB-SUL) such that the wireless device located outside an NUL coverage 1610 but inside an SUL coverage 1620 may perform a random access procedure via an SUL carrier. A wireless device located inside a NUL coverage 1610 may perform a random access procedure via an NUL carrier.

A wireless device may perform a random access procedure on an UL selected based on a value broadcast/configured (e.g., rsrp-ThresholdSSB-SUL). For example, this is a case when a base station does not indicate via which carrier a wireless device performs a random access procedure. In an example, a base station may indicate via which carrier a wireless device performs a random access procedure by transmitting a RACH configuration with a UL carrier indicator (e.g., 0 may indicates an NUL carrier, 1 may indicate an SUL carrier or vice versa). In an example, a base station may indicate (e.g., explicitly) to a wireless device which UL carrier to be employed for a contention free or contention based random access procedure. In an example, a handover command (e.g., RACH-ConfigDedicated) and/or a PDCCH order comprise an UL carrier indicator (e.g., UL/SUL indicator). A wireless device may ignore (does not use or determine as a reserved field) the UL carrier indicator depending on one or more other fields. For example, the wireless device ignores (e.g., does not use or determine as a reserved field) the UL carrier indicator, e.g., if there is no configured SUL carrier (e.g., no supplementaryUplink in ServingCellConfig) and/or there is no dedicated random access preamble (e.g., a value of the random access preamble index is set to a predefined value, e.g., all zeros).

A wireless device may initiate a random access (RA) procedure on a cell to establish communications to a base station. A four-step RA procedure in FIG. 12 may have an associated latency, e.g., which may be a minimum of fourteen transmission time intervals (TTI). As an example, the four-step RA procedure may have a latency of at least fourteen TTIs comprising, e.g., 3 TTIs after a message from step 1 (e.g., Msg 1 1220) of a four-step RA procedure, 1 TTI for a message from step 2 (e.g., Msg 2 1230) of a four-step RA procedure, 5 TTIs after the message from step 2, 1 TTI for a message from step 3 (e.g., Msg 3 1240) of a four-step RA procedure, 3 TTIs after the message from step 3, and 1 TTI for a message from step 4 (e.g., contention Resolution 1250) of a four-step procedure (e.g., 3+1+5+1+3+1=14). Reducing the number of steps in an RA procedure may reduce latency. A two-step RA procedure may reduce RA latency compared with a four-step RA procedure, e.g., by integrating a random access preamble transmission (e.g., a process to obtain a timing advance value) with one or more transport block transmissions. A two-step RA procedure may have an associated latency, e.g., which may be a latency of at least four TTIs and which may be less than an associated latency for a four-step RA procedure. As an example, the two-step RA procedure may have a latency of at least four TTIs comprising, e.g., 3 TTIs after a message from step 1 of a two-step RA procedure and 1 TTI for a message from step 2 of a two-step RA procedure.

Figure 17:
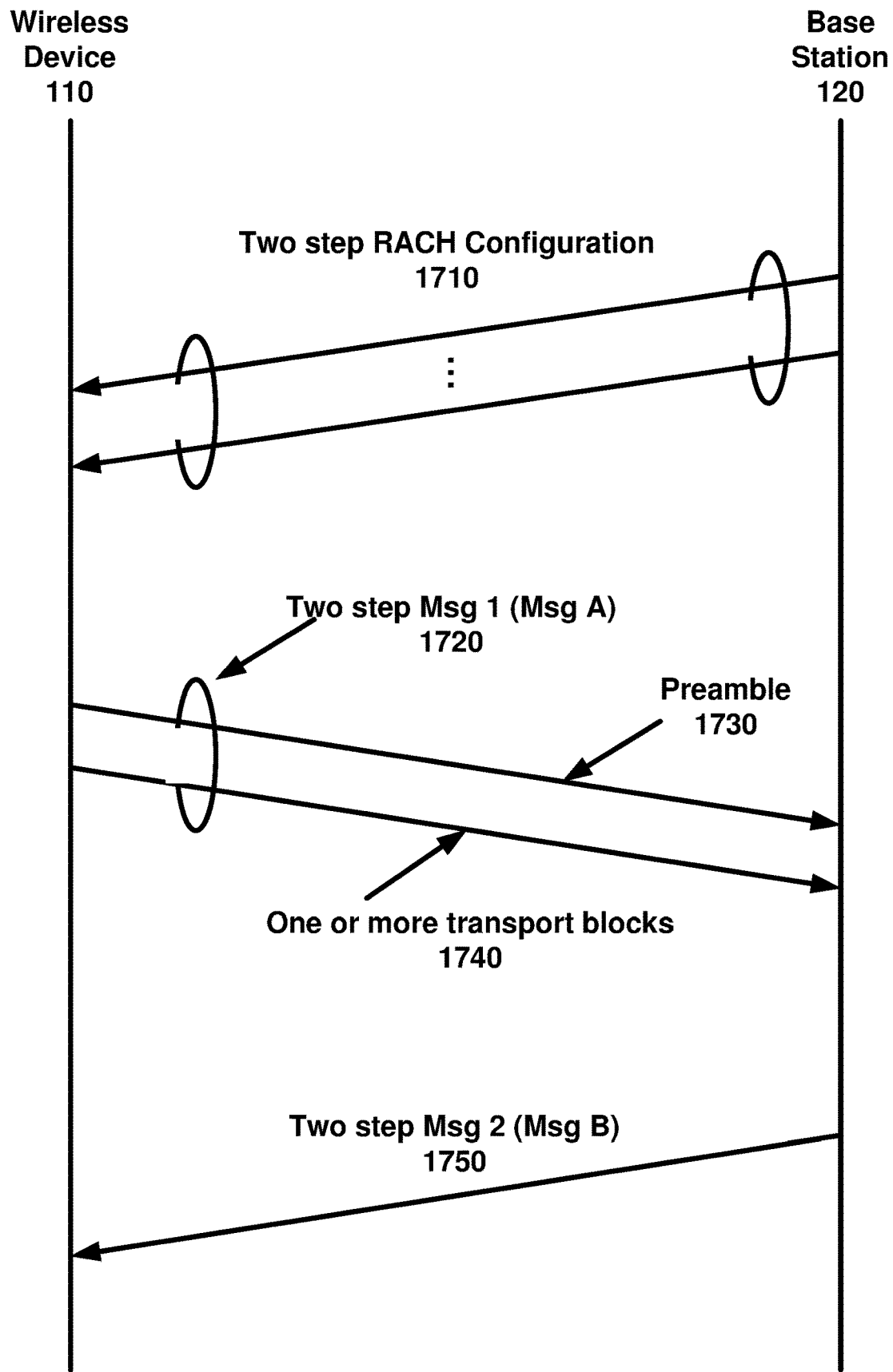
FIG. 17 is an example two-step RA procedure as per an aspect of an embodiment of the present disclosure.

FIG. 17 is an example of a two-step RA procedure that may comprise an uplink (UL) transmission of a two-step Msg 1 1720 that may comprise a random access preamble (RAP) transmission 1730 and a transmission of one or more transport blocks 1740, followed by a downlink (DL) transmission of a two-step Msg 2 1750 that may comprise a response, e.g., random access response (RAR), corresponding to the uplink transmission. The response may comprise contention resolution information. The two-step Msg 1 1720 may be also referred to as a message A (MsgA). The two-step Msg 2 1750 may be also referred to as a message B (MsgB).

For a two-step RA procedure, a wireless device may receive, from a base station, one or more RRC messages comprising two-step RACH configuration parameters 1710. The one or more RRC messages may broadcast, multicast, and/or unicast to a wireless device. The one or more RRC messages may be wireless device-specific messages, e.g., a dedicated RRC message transmitted to a wireless device with RRC INACTIVE 1520 or RRC CONNECTED 1530. The one or more RRC messages may comprise parameters required for transmitting a two-step Msg 1 (Msg A) 1720. For example, the parameter may indicate at least one of following: PRACH resource allocation, preamble format, SSB information (e.g., total number of SSBs, downlink resource allocation of SSB transmission, transmission power of SSB transmission, uplink radio resources (time-frequency radio resource, DMRS, MCS, etc.) for one or more transport block transmissions, and/or association between PRACH resource allocation and the uplink radio resources (or associations between the uplink radio resources and downlink reference signals).

In the UL transmission (e.g., two step Msg 1 (Msg A) 1720) of a two-step RA procedure, a wireless device may transmit, via a cell and to a base station, at least one RAP and/or one or more transport blocks. For example, the one or more transport blocks may comprise one of data, security information, device information such as IMSI/TMSI, and/or other information. For example, the one or more transport blocks may comprise a wireless device identifier (ID) that may be used for a contention resolution. In the DL transmission of the two-step RA procedure, a base station may transmit a two-step Msg 2 (Msg B) 1750 (e.g., an RAR) that may comprise at least one of following: a timing advance command indicating the TA value, a power control command, an UL grant (e.g., radio resource assignment, and/or MCS), the identifier for contention resolution, an RNTI (e.g., C-RNTI or TC-RNTI), and/or other information. The two-step Msg 2 (Msg B) 1750 (e.g., an RAR) may comprise a preamble identifier corresponding to the preamble 1730, a positive or negative acknowledgement of a reception of the one or more transport blocks 1740, and/or an implicit and/or explicit indication of a successful decoding of the one or more transport blocks 1740.

For example, a wireless device initiating two step RA procedure may transmit Msg A comprising at least one preamble and at least one transport block. The at least one transport block may comprise an identifier that the wireless device uses for a contention resolution. For example, the identifier is a C-RNTI (e.g., for a wireless device with RRC Connected). For example, the identifier is a sequence and/or number(s) that the wireless device generates (e.g., for a wireless device not assigned with C-RNTI). For example, the identifier is generated randomly and/or is generated based on a subscriber and/or device information of the wireless device (e.g., IMSI/TMSI). For example, the identifier may be an extended and/or truncated subscriber and/or device information of the wireless device (e.g., IMSI/TMSI). The wireless device may start to monitor a downlink control channel (e.g. a control resource set and/or a search space for monitoring the downlink control channel may be indicated and/or configured by message(s), e.g., broadcast RRC message and/or wireless device specific RRC message, transmitted by a base station.) for Msg B, (e.g., an RAR) corresponding to the Msg A, e.g., after or in response to transmitting the Msg A. The Msg B may be scrambled by an RNTI calculated based on at least one of following: a time resource index (e.g., an index of a first OFDM symbol of and/or an index of a first slot) of PRACH occasion that the at least one preamble is transmitted, a frequency resource index of PRACH occasion that the at least one preamble is transmitted, a time resource index (e.g., an index of a first OFDM symbol of and/or an index of a first slot) PUSCH occasion that the at least one transport block is transmitted, a frequency resource index of PUSCH occasion that the at least one transport block is transmitted, an indicator (e.g., 0 or 1) of an uplink carrier where the Msg A is transmitted. The wireless device may consider (or determine) that the two step RA procedure is successfully completed based on one or more conditions, e.g., when the wireless device receives the Msg B. At least one of the one or more conditions may be that the Msg B comprising a preamble index matched to the at least one preamble that the wireless device transmits to the base station. At least one of the one or more conditions may be that the Msg B comprising and/or indicating a contention resolution identifier matched to the identifier that the wireless device transmits, for the contention resolution, to the base station. In an example, the wireless device may receive the Msg B indicating a retransmission of the at least one transport block. For example, the Msg B indicating a retransmission of the at least one transport block comprises an UL grant indicating uplink resource(s) used for the retransmission.

In the UL transmission of a two-step RA procedure, a wireless device may transmit, via a cell and to a base station, at least one RAP and one or more TB s. The wireless device may receive message(s) one or more configuration parameters for the UL transmission of the two-step RA procedure, e.g., at step 1710 in FIG. 17. For example, the one or more configuration parameters may indicate at least one of: PRACH occasion(s), preamble format, a number of transmitting SSBs, downlink resources of transmissions of SSB(s), transmission power of SSB transmission(s), association between each of PRACH occasion(s) and each of SSB(s), PUSCH resource(s) (in terms of time, frequency, code/sequence/signature) for one or more TB transmissions, association between each of PRACH occasion(s) and each of PUSCH resource(s), and/or power control parameters of one or more TB transmissions (e.g., cell and/or UE specific power adjustments used for calculating received target power, inter-cell interference control parameter that may be used as a scaling factor of pathloss measurement, reference signal power to calculate for pathloss measurement, a power offset with respect to a power of preamble transmission, and/or one or more margins). For example, the wireless device may measure received signal powers and/or quality of one or more SSBs that a base station transmits. The wireless device may select at least one SSB based on the measurement and determine at least one PRACH occasion associated with the at least one SSB and/or at least one PUSCH resource associated with the at least one PRACH occasion and/or associated with the at least one SSB (this association may be configured explicitly by the message(s) and/or implicitly through a first association between the at least one SSB and the at least one PRACH occasion and a second association between the at least one PRACH occasion and the at least one PUSCH resource). The wireless device may transmit at least one RAP via the at least one PRACH occasion and/or transmit at least one TB via the at least one PUSCH resource. The wireless device may determine transmit powers of the at least one RAP and/or the at least one TB based on the configuration parameters (e.g., uplink transmit power control parameters such as received target power, one or more power offsets, pathloss measurement(s), pathloss reference signal reference power, etc.) indicated by the message(s). At least one uplink transmit power control parameters may be shared between an uplink transmit power for the at least one RAP and an uplink transmit power for the at least one TB. None of uplink transmit power control parameters may be shared between an uplink transmit power for the at least one RAP and an uplink transmit power for the at least one TB. For example, a message structure of the message(s) may be flexible such that a base station determines whether at least one uplink transmit power control parameters may be shared between an uplink transmit power for the at least one RAP and an uplink transmit power for the at least one TB.

There may be one or more ways for a wireless device to generate an RAP. For example, a two-step RACH configuration may comprise an RAP generating parameters (e.g., a root sequence) that may be employed by the wireless device to generate an RAP. The wireless device may employ the RAP generating parameters to generate one or more candidate preambles and may randomly select one of the candidate preambles as the RAP. The RAP generating parameters may be SSB specific and/or cell-specific. For example, a RAP generating parameters for a first SSB may be different from or the same to a RAP generating parameters for a second SSB. For example, a base station may transmit a control message (e.g., RRC message for a handover, and/or a PDCCH order for a secondary cell addition) that comprise a preamble index of an RAP dedicated to a wireless device to initiate a two-step RA procedure. The one or more candidate preambles may be grouped into one or more groups, e.g., each group is associated with a specific amount of data for transmission. In an example, the amount of data may indicate one or more transport blocks that a wireless device to transmit (and/or that remain in the buffer). Each of the groups may be associated with a range of data size. For example, a first group of the groups may comprise RAPs indicated for small data transmissions of a transport block, and a second group may comprise RAPs indicated for larger data transmissions of a transport block, and so on. A base station may transmit an RRC message comprising one or more thresholds with which a wireless device may determine a group of RAPs by comparing the one or more thresholds and the amount of data. By transmitting an RAP from a specific group of RAPs, the wireless device may be able to indicate a size of data it may have for transmission.

In a two-step RA procedure, a wireless device may transmit the RAP via a PRACH occasion indicated by a two-step RACH configuration. The wireless device may transmit one or more TBs via an UL radio resource (e.g., PUSCH) indicated by a two-step RACH configuration. A first transmission of the RAP and a second transmission of the one or more TBs may be scheduled in a TDM (time-division multiplexing), a FDM (frequency-division multiplexing), and/or a CDM (code-division multiplexing) manner(s). The first transmission of the RAP may be overlapped in time (partially or entirely) with the second transmission of the one or more TBs. The two-step RACH configuration may indicate a portion (e.g., in frequency domain and/or in time domain) of overlapping of radio resources between the RAP and one or more TB transmissions. The two-step RACH configuration may indicate one or more UL radio resources associated with one or more RAPs (or RAP groups) and/or the PRACH occasion. For example, one or more downlink reference signals (SSBs or CSI-RSs) are associated with one or more PRACH occasions and/or one or more RAPs. A wireless device may determine at least one PRACH occasion among the one or more PRACH occasions and/or at least one RAP among the one or more RAPs. For example, based on a selection of the at least one RAP and/or the at least one PRACH occasion, the wireless device may determine at least one UL radio resource (e.g., PUSCH occasions) where the wireless device transmits one or more TBs as a part of a two-step RACH procedure. The one or more UL radio resources may be indicated based on a frame structure in FIG. 6, and/or OFDM radio structure in FIG. 8. For example, time domain resource(s) of the one or more UL radio resources is indicated with respect to a particular SFN (SFN=0), slot number, an OFDM symbol number, and/or a combination thereof. For example, time domain resource(s) of the one or more UL radio resources is indicated with respect to a subcarrier number, a number of resource elements, a number of resource blocks, RBG number, frequency index for a frequency domain radio resource, and/or a combination thereof. For example, the one or more UL radio resources may be indicated based on a time offset and/or a frequency offset with respect to one or more PRACH occasions of a selected RAP. The UL transmissions may occur, e.g., in the same slot (or subframe) and/or in a different slot, e.g., in consecutive slots (or subframes). For example, the one or more UL radio resources (e.g., PUSCH occasions) may be configured periodically, e.g., a periodic resources of configured grant Type 1 or Type 2.

A PUSCH occasion for two-step RA procedure may be a time-frequency resource for a payload transmission associated with a PRACH preamble in MsgA of two-step RA procedure. One or more examples of a resource allocation of a PUSCH occasion may be (but not limited to) that PUSCH occasions are separately configured from PRACH occasions. For example, for a PUSCH occasion may be determined based on a periodic resource indicated by a configured grant (e.g., configured grant Type 1/Type 2 and/or SPS). A wireless device may determine the PUSCH occasion further based on an association between the PRACH and PUSCH for msgA transmission.

One or more examples of a resource allocation of a PUSCH occasion may be (but not limited to) that a base station configure a relative location (e.g., in time and/or frequency) of the PUSCH occasion with respect to a PRACH occasion. For example, time and/or frequency relation between PRACH preambles in a PRACH occasion and PUSCH occasions may be a single specification fixed value. For example, a time and/or frequency relation between each PRACH preamble in a PRACH occasion to the PUSCH occasion is a single specification fixed value. For example, different preambles in different PRACH occasions have different values. For example, a time and/or frequency relation between PRACH preambles in a PRACH occasion and PUSCH occasions are single semi-statically configured value. For example, a time and/or frequency relation between each PRACH preamble in a PRACH occasion to the PUSCH occasion is semi-statically configured value. For example, different preambles in different PRACH occasions have different values. For example, any combination of above example may be implemented/configured, and the time and frequency relation need not be the same alternative.

For a two-step RA procedure, a resource allocation for a payload transmission in a PUSCH occasion may be predefined and/or configured. For example, a size of a resource in a PUSCH occasion may be predefined and/or configured. The resource may be continuous or non-continuous (e.g., a base station may flexibly configure the resource). The resource may be partitioned into a plurality of resource groups. For example, a size of each of resource groups within a PUSCH occasion may be the same or different (e.g., depending on the configuration of the two-step RA procedure). Each resource group index may be mapped to one or more preamble index.

For example, a base station may configure a wireless device with one or more parameters indicating a starting point of time and/re frequency for a PUSCH occasion, a number of resource groups, and a size of each of the resource groups. An index of each of the resource groups may be mapped to a preamble index (e.g., a particular preamble) and/or a particular PPRACH occasion. The wireless device may determine a location of each of resource groups at least based on a preamble index (e.g., in case RO and PUSCH occasion are 1-to-1 mapping) and/or based on an RO index and a preamble index (e.g., in the case of multiple ROs are associated with one PUSCH occasion).

Define the starting point of time/frequency for the PUSCH occasion, and define a set of continuous basic unit of PUSCH resources. The size of resource unit is identical, and the total available number of basic unit is pre-configured. A UE may use one or multiple resource unit for the msgA transmission, depending on the payload size. The starting resource unit index should be mapped to preamble index, and the length of occupied PUSCH resource (as the number of resource unit) can be either mapped to preamble index or explicitly indicated (e.g. in UCI). [6]

A number of resource groups and/or the detailed mapping among preamble(s), resource group(s), and DMRS port(s) may be pre-defined and/or semi-statically configured (and/or indicated by DCI dynamically), e.g., to avoid a blind detection from a base station when multiple preambles are mapped to the same resource group.

For a payload transmission via a PUSCHC occasion in a two-step RA procedure, a base station may configurable one or more MCSs and one or more resource sizes for a transmission of payload. The MCS and resource size may be related to a size of the payload. For example, a base station may configured one or more combinations (and/or associations) of a size of the payload, MCS, and resource size. For example, one or more particular modulation types (e.g., pi/2-BPSK, BPSK, QPSK) may be associated with a small size of payload. For example, a one or more particular modulation types (e.g., QPSK) may be used for a wireless device with a particular RRC state (e.g., RRC IDLE and/or RRC INACTIVE). For example, a number of PRBs used for payload transmission may be configured over an entire UL BWP and/or over a part of UL BWP (e.g., this may be predefined and/or semi-statically configured by RRC). For example, one or more repetitions of payload may be supported (e.g., a number of repetitions is predefined, semi-statically configured, and/or triggered based on one or more conditions (e.g., RSRP of downlink reference signals, and/or a particular RRC state, and/or a type of a wireless device, e.g., stationary, IoT, etc.) for the coverage enhancement of a transmission of payload.

A base station may configured one or more two-step RA configurations for a payload transmission, and the one or more two-step RA configuration may indicate one or more combinations of payload size, MCS, and/or resource size. The number of the one or more two-step RA configurations and one or more parameter values (e.g., payload size, MCS, and/or resource size) for each of the one or more two-step RA configurations may depend on the content of MsgA and/or an RRC state of a wireless device.

Based on configured two-step RA configuration parameters, a wireless device may transmit MsgA, e.g., comprising at least one preamble via a PRACH occasion and/or a payload via a PUSCH occasion, to a base station. MsgA may comprise an identifier for contention resolution. For example, a wireless device may construct a MAC header as the msgA payload with a plurality of bits (e.g., 56 and/or 72 bits). For example, MsgA may comprise BSR, PHR, RRC messages, connection request, etc. For example, MsgA may comprise UCI. The UCI in MsgA may comprise at least one of following: an MCS indication, HARQ-ACK/NACT and/or CSI report. HARQ for MsgA may combine between an initial transmission of Msg.A and one or more retransmissions of Msg.A PUSCH. For example, Msg A may indicate a transmission time of MsgA in the PUSCH of MsgA. A size of msgA may depend on use case.

There may be a case that different (or independent) PRACH occasions are configured between two-step RA and four-step RA. The different (or independent) PRACH occasions may reduce receiver uncertainty and/or reduce the access delay. The different (or independent) PRACH resources may be configured for two-step RA such that a base station identifies whether a received preamble is for two-step RA or four-step RA. A base station may flexibility determine whether to share RACH occasion(s) between two-step RA and four-step RA and configured shared PRACH occasions and/or different PRACH occasions by RRC messages (or by DCI dynamically). For example, one or more RACH occasions may be shared between two-step RA and four-step RA. For example, PRACH occasion(s) of two-step RA may be separate from PRACH occasion(s) of four-step RA. There may be a case station a base station configure one or more PRACH occasions shared between two-step RA and four-step RA and preambles partitioned for the two-step RA and the four-step RA.

Figure 18:
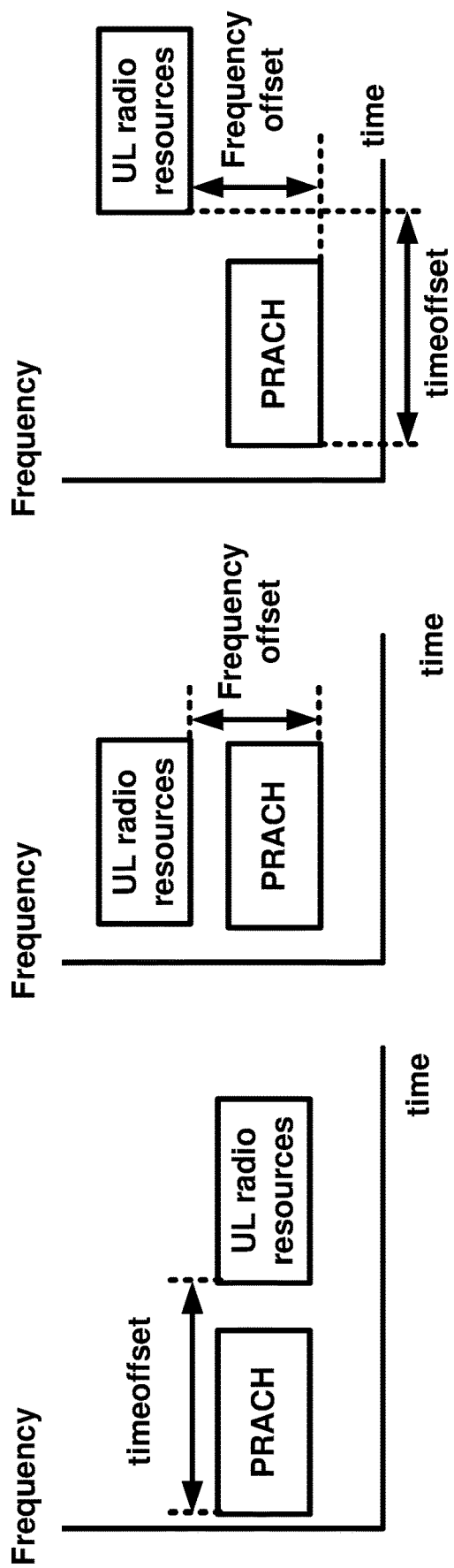
FIG. 18A, FIG. 18B, and FIG. 18C are example radio resource allocations as per an aspect of an embodiment of the present disclosure.

FIG. 18A, FIG. 18B, and FIG. 18C are examples of radio resource allocations of a PRACH resource and one or more associated UL radio resources based on a time offset, a frequency offset, and a combination of a time offset and a frequency offset, respectively. For example, a PRACH occasion and one or more associated UL radio resources (e.g., PUSCH occasions) for a two-step Msg 1 may be allocated with a time offset and/or frequency offset, e.g., provided by RRC messages (as a part of RACH config.) and/or predefined (e.g., as a mapping table). FIG. 18A is an example of a PRACH occasion TDMed with a UL radio resources (e.g., PUSCH occasion). FIG. 18B is an example of a PRACH occasion FDMed with a UL radio resources (e.g., PUSCH occasion). FIG. 18C is an example of a PRACH occasion TDMed and FDMed with a UL radio resources (e.g., PUSCH occasion).

A wireless device may receive, from a base station, one or more downlink reference signals (e.g., SSBs or CSI-RSs), and each of the one or more downlink reference signals may be associated with one or more RACH resources (e.g., PRACH occasions) and/or one or more UL radio resources (e.g., PUSCH occasions) provided by a two-step RACH configuration. A wireless device may measure one or more downlink reference signals and, based on measured received signal strength and/or quality (or based on other selection rule), may select at least one downlink reference signals among the one or more downlink reference signals. The wireless device may respectively transmit an RAP and one or more TBs via a PRACH occasion associated with the at least one downlink reference signal, and via UL radio resources (e.g., a PUSCH occasions) associated with the PRACH occasion and/or associated with the at least one downlink reference signal.

In an example, a base station may employ an RAP to adjust UL transmission time for a cell and/or to aid in channel estimation for one or more TBs. A portion of the UL transmission for one or more TBs in a two-step RACH procedure may comprise, e.g., a wireless device ID, a C-RNTI, a service request such as buffer state reporting (e.g., a buffer status report) (BSR), one or more user data packets, and/or other information. A wireless device in an RRC CONNECTED state may use a C-RNTI as an identifier of the wireless device (e.g., a wireless device ID). A wireless device in an RRC INACTIVE state may use a C-RNTI (if available), a resume ID, or a short MAC-ID as an identifier of the wireless device. A wireless device in an RRC IDLE state may use a C-RNTI (if available), a resume ID, a short MACID, an IMSI (International Mobile Subscriber Identifier), a T-IMSI (Temporary-IMSI), and/or a random number as an identifier of the wireless device.

In a two-step RA procedure, a wireless device may receive two separate responses as a response of Msg A; a first response for RAP transmission; and a second response for a transmission of one or more TBs. A wireless device may monitor a PDCCH (e.g., common search space and/or a wireless device specific search space) to detect the first response with a random access RNTI generated based on time and/or frequency indices of PRACH resource where the wireless device transmits an RAP. A wireless device may monitor a common search space and/or a wireless device specific search space to detect the second response. To detect the second response, the wireless device may employ an RNTI (e.g., C-RNTI if configured, a random access RNTI generated based on time and/or frequency indices of PRACH occasion where the wireless device transmits an RAP, or an RNTI generated based on time and/or frequency indices (and/or DM-RS ID) of PUSCH resource(s) where the wireless device transmits the or more TBs. The wireless device specific search space may be predefined and/or configured by an RRC message.

One or more events may trigger a two-step random access procedure. For example, one or more events may be at least one of: initial access from RRC_IDLE, RRC connection re-establishment procedure, handover, DL or UL data arrival during RRC_CONNECTED when UL synchronization status is non-synchronized, transition from RRC_Inactive, beam failure recovery procedure, and/or request for other system information. For example, a PDCCH order, an MAC entity of the wireless device, and/or a beam failure indication may initiate a random access procedure.

A wireless device may initiate a two-step RA procedure in a particular condition, e.g., depending on a service of data to be transmitted (e.g., delay sensitive data such URLLC) and/or radio conditions. For example, a base station may configure one or more wireless devices with a two-step RA procedure, for example, if a cell is small (e.g., there is no need of a TA) and/or for a case of stationary wireless device (e.g., there is no need of TA update). A wireless device may acquire the configuration, via one or more RRC messages (e.g., MIB, system information blocks, multicast and/or unicast RRC signaling), and/or via L1 control signaling (e.g., PDCCH order) used to initiate a two-step RA procedure.

For example, in a macro coverage area, a wireless device may have a stored and/or persisted TA value, e.g., a stationary or near stationary wireless device such as a sensor-type wireless device. In this case a two-step RA procedure may be initiated. A base station having macro coverage may use broadcasting and/or dedicated signaling to configure a two-step RA procedure with one or more wireless devices having stored and/or persisted TA value(s) under the coverage.

A wireless device in an RRC connected state may perform a two-step RA procedure. For example, the two-step RA procedure may be initiated when a wireless device performs a handover (e.g., network-initiated handover), and/or when the wireless device requires or requests a UL grant for a transmission of delay-sensitive data and there are no physical-layer uplink control channel resources available to transmit a scheduling request. A wireless device in an RRC INACTIVE state may perform a two-step RA procedure, e.g., for a small data transmission while remaining in the RRC INACTIVE state or for resuming a connection. A wireless device may initiate a two-step RA procedure, for example, for initial access such as establishing a radio link, re-establishment of a radio link, handover, establishment of UL synchronization, and/or a scheduling request when there is no UL grant.

The following description presents one or more examples of an RA procedure. The procedures and/or parameters described in the following may not be limited to a specific type of an RA procedure. The procedures and/or parameters described in the following may be applied for a four-step RA procedure and/or a two-step RA procedure. For example, an RA procedure may refer to a four-step RA procedure and/or a two-step RA procedure in the following description.

A wireless device may perform a cell search. For example, the wireless device may acquire time and frequency synchronization with the cell and detect a first physical layer cell ID of the cell during the cell search procedure. The wireless device may perform the cell search, for example, when the wireless device has received one or more synchronization signals (SS), for example, the primary synchronization signal (PSS) and the secondary synchronization signal (SSS). The wireless device may assume that reception occasions of one or more physical broadcast channels (PBCH), PSS, and SSS are in consecutive symbols, and, for example, form a SS/PBCH block (SSB). For example, the wireless device may assume that SSS, PBCH demodulation reference signal (DM-RS), and PBCH data have the same energy per resource element (EPRE). For example, the wireless device may assume that the ratio of PSS EPRE to SSS EPRE in a SS/PBCH block is a particular value (e.g., either 0 dB or 3 dB). For example, the wireless device may determine that the ratio of PDCCH DM-RS EPRE to SSS EPRE is within a particular range (e.g., from −8 dB to 8 dB), for example, when the wireless device has not been provided dedicated higher layer parameters e.g., semi-statically configured by RRC message(s).

A wireless device may determine a first symbol index for one or more candidate SS/PBCH block. For example, for a half frame with SS/PBCH blocks, the first symbol index for one or more candidate SS/PBCH blocks may be determined according to a subcarrier spacing of the SS/PBCH blocks. For example, index 0 corresponds to the first symbol of the first slot in a half-frame. As an example, the first symbol of the one or more candidate SS/PBCH blocks may have indexes $\{2, 8\}+14 \cdot n$ for 15 kHz subcarrier spacing, where, for example, n=0, 1 for carrier frequencies smaller than or equal to 3 GHz, and for example, n=0, 1, 2, 3 for carrier frequencies larger than 3 GHz and smaller than or equal to 6 GHz. The one or more candidate SS/PBCH blocks in a half frame may be indexed in an ascending order in time, for example, from 0 to L−1. The wireless device may determine some bits (for example, the 2 least significant bits (LSB) for L=4, or the 3 LSB bits for L>4) of a SS/PBCH block index per half frame from, for example, a one-to-one mapping with one or more index of a DM-RS sequence transmitted in the PBCH.

Prior to initiation of a random access procedure, a base station may transmit one or more RRC messages to configure a wireless device with one or more parameters of RACH configuration, e.g., for a four-step RA procedure, a two-step RA procedure, and/or both of four-step and two-step RA procedures. The one or more RRC messages may broadcast or multicast to one or more wireless devices. The one or more RRC messages may be wireless device-specific messages, e.g., a dedicated RRC messages transmitted to a wireless device with RRC INACTIVE 1520 or RRC CONNECTED 1530. The one or more RRC messages may comprise one or more parameters required for transmitting at least one preamble via one or more random access resources. For example, the one or more parameters may indicate at least one of the following: PRACH resource allocation (e.g., resource allocation of one or more PRACH occasions), preamble format, SSB information (e.g., total number of SSBs, downlink resource allocation of SSB transmission, transmission power of SSB transmission, SSB index corresponding to a beam transmitting the one or more RRC messages and/or other information), and/or uplink radio resources for one or more transport block transmissions.

The base station may further transmit one or more downlink reference signals. For example, the one or more downlink reference signals may comprise one or more discovery reference signals. The wireless device may select a first downlink reference signal among the one or more downlink reference signals. For example, the first downlink reference signal may comprise one or more synchronization signals and a physical broadcast channel (SS/PBCH). For example, the wireless device may adjust a downlink synchronization based on the one or more synchronization signals. For example, the one or more downlink reference signals may comprise one or more channel state information-reference signals (CSI-RS).

The one or more RRC messages may further comprise one or more parameters indicating one or more downlink control channels, for example, PDDCH. Each of the one or more downlink control channels may be associated with at least one of the one or more downlink reference signals. For example, the first downlink reference signal may comprise one or more system information (e.g., master information block (MIB) and/or system information block (SIB)). The base station may transmit the one or more system information, for example, on the physical broadcast channel (PBCH), physical downlink control channel (PDCCH), and/or physical downlink shared channel (PDSCH).

The one or more system information may comprise at least one information element (e.g., PDCCH-Config, PDCCH-ConfigSIB1, PDCCH-ConfigCommon). The at least one information element may be used, for example, to configure a wireless device with one or more control parameters. The one or more control parameters may comprise one or more parameters of one or more control resource sets (CORESET). For example, the one or more control parameters comprises the parameters of a first common CORESET #0 (e.g., controlResourceSetZero), and/or a second common CORESET (e.g., commonControlResourceSet). The one or more control parameters may further comprise one or more search space sets. For example, the one or more control parameters comprise the parameters of a first search space for the system information block (e.g., searchSpaceSIB1), and/or a first common search space #0 (e.g., searchSpaceZero), and/or a first random access search space (e.g., ra-SearchSpace), and/or a first paging search space (e.g., pagingSearchSpace). The wireless device may use the one or more control parameters to acquire the one or more downlink control channels.

A wireless device may monitor a set of one or more candidates for the one or more downlink control channels in the one or more control resource sets. The one or more control resource sets may be on a first active downlink frequency band, e.g., an active bandwidth part (BWP), on a first activated serving cell. For example, the first activated serving cell is configured with the one or more control parameters based on the one or more search space sets. For example, the wireless device decodes each of the one or more downlink control channels in the set of candidates for the one or more downlink control channels according to a first format of a first downlink control information (DCI). The set of candidates for the one or more downlink control channels may be defined in terms of the one or more search space sets. For example, the one or more search space sets are one or more common search space sets (e.g., Type0-PDCCH, Type0A-PDCCH, Type1-PDCCH, Type2-PDCCH, and/or Type3-PDCCH), and/or one or more wireless device-specific search space sets.

For example, the wireless device may monitor the set of candidates for the one or more downlink control channels in a Type0-PDCCH common search space set. For example, the Type0-PDCCH common search space set may be configured by the at least one information element, e.g., the PDCCH-ConfigSIB1 in the MIB. For example, the Type0-PDCCH common search space set may be configured by the one or more search space sets, e.g., a searchSpaceSIB1 in the PDCCH-ConfigCommon, or the searchSpaceZero in the PDCCH-ConfigCommon. For example, the Type0-PDCCH common search space set may be configured for a first format of a first downlink control information scrambled by a first radio network temporary identifier, e.g., a system information-radio network temporary identifier (SI-RNTI).

For example, the wireless device may monitor the set of candidates for the one or more downlink control channels in a Type1-PDCCH common search space set. For example, the Type1-PDCCH common search space set may be configured by the one or more search space sets, e.g., the ra-searchSpace in the PDCCH-ConfigCommon. For example, the Type1-PDCCH common search space set may be configured for a second format of a second downlink control information scrambled by a second radio network temporary identifier, e.g., a random access-radio network temporary identifier (RA-RNTI), a temporary cell-radio network temporary identifier (TC-RNTI), C-RNTI, and/or an RNTI that generated by a wireless device, e.g., generated for a two-step RA procedure.

The wireless device may determine, for example during a cell search, that a first control resource set for a first common search space (e.g., Type0-PDCCH) is present. The first control resource set may comprise one or more resource blocks and one or more symbols. The one or more RRC messages may comprise one or more parameters indicating one or more monitoring occasions of the one or more downlink control channels. For example, the wireless device may determine a number of consecutive resource blocks and a number of consecutive symbols for the first control resource set of the first common search space. For example, one or more bits (e.g., a four most significant bits) of the at least one information element (e.g., PDCCH-ConfigSIB1) may indicate the number of consecutive resource blocks and the number of consecutive symbols. For example, the wireless device may determine the one or more monitoring occasions of the one or more downlink control channels from one or more bits (e.g., a four least significant bits) of the at least one information element (e.g., PDCCH-ConfigSIB1). For example, the one or more monitoring occasions of the one or more downlink control channels associated with a first downlink reference signal (e.g., SSB or CSI-RS) may be determined based on one or more system frame numbers and one or more slot indexes of the first control resource set. For example, the first downlink reference signal with a first index may overlap in time with the first frame number and the first slot index.

The wireless device may determine a first downlink channel among the one or more downlink control channels, based on a first downlink reference signal (e.g., SSB or CSI-RS). For example, the first downlink channel may be a first downlink control channel, or a first system information block (e.g., SIB1). The wireless device may determine that a demodulation reference signal antenna port associated with a reception of the first downlink channel is quasi co-located (QCL) with the first downlink reference signal. For example, the demodulation reference signal antenna port associated with the reception of the first downlink channel and the first downlink reference signal (e.g., the corresponding SS/PBCH block) may be quasi co-located with respect to at least one of the following: an average gain, QCL-TypeA, and/or QCL-TypeD.

A wireless device may receive, from a base station, one or more RRC messages comprising one or more random access parameters. For example, the one or more RRC messages comprise a common (or generic) random access configuration message (e.g., RACH-ConfigCommon and/or RACH-ConfigGeneric) indicating at least one of: a total number of random access preambles (e.g., totalNumberOfRA-Preambles), one or more PRACH configuration index (e.g., prach-ConfigurationIndex), a number of PRACH occasions that may be multiplexed in frequency domain (FDMed) in a time instance (e.g., msg1-FDM), an offset of a lowest PRACH occasion in frequency domain with respect to a first resource block (e.g., msg1-FrequencyStart), a power ramping step for PRACH (e.g., powerRampingStep), a target power level at the network receiver side (preambleReceivedTargetPower), a maximum number of random access preamble transmission that may be performed (e.g., preambleTransMax), a window length for a random access response (i.e., RAR, e.g., Msg 2) (e.g., ra-ResponseWindow), a number of SSBs per random access channel (RACH) occasion and a number of contention-based preambles per SSB (e.g., ssb-perRACH-OccasionAndCB-PreamblesPerSSB). For example, the total number of random access preambles may be a multiple of the number of SSBs per RACH occasion. For example, the window length for RAR may be in number of slots. For example, a dedicated random access configuration message (e.g., RACH-ConfigDedicated) may comprise one or more RACH occasions for contention-free random access (e.g., occasions), and one or more PRACH mask index for random access resource selection (e.g., ra-ssb-OccasionMaskIndex).

The one or more random access parameters (e.g., ssb-perRACH-OccasionAndCB-PreamblesPerSSB) may indicate a first number (e.g., N) of the one or more downlink reference signals (e.g., SS/PBCH blocks) that may be associated with a first PRACH occasion. The one or more random access parameters (e.g., ssb-perRACH-OccasionAndCB-PreamblesPerSSB) may indicate a second number (e.g., R) of the one or more random access preambles for the first downlink reference signal and for the first PRACH occasion. The one or more random access preambles may be contention based preambles. The first downlink reference signal may be a first SS/PBCH block. For example, the first number (e.g., if N<1) indicates that the first SS/PBCH block may be mapped to at least one (e.g., 1/N) consecutive valid PRACH occasions. For example, the second number (e.g., R) indicates that at least one preamble with consecutive indexes associated with the first SS/PBCH block may start from the first preamble index for the first valid PRACH occasion.

For example, the one or more PRACH configuration indexes (e.g., prach-ConfigurationIndex), may indicate a preamble format, a periodicity for the one or more PRACH time resources, one or more PRACH subframe numbers, a number of PRACH slots within the one or more PRACH subframes, a PRACH starting symbol number, and/or a number of time domain PRACH occasions within the first PRACH slot.

The one or more random access parameters may further comprise an association period for mapping the one or more SS/PBCH blocks to the one or more PRACH occasions. For example, the one or more SS/PBCH block indexes may be mapped to the one or more PRACH occasions based on an order. An example of the order may be as follows: In increasing order of the indexes of the at least one preamble in the first PRACH occasion; In increasing order of the indexes of the one or more frequency resources (e.g., for frequency multiplexed PRACH occasions); In increasing order of the indexes of the one or more time resources (e.g., for time multiplexed PRACH occasions) in the first PRACH slot; and/or In increasing order of the indexes for the PRACH slots.

For example, a control order initiating an RA procedure (e.g., for SCell addition and/or TA update) may comprising at least one PRACH mask index. The at least PRACH mask index may indicate particular one or more PRACH occasions associated with particular one or more reference signals (e.g., SSBs and/or CSI-RS). FIG. 19 shows an example of PRACH mask index values. For example, a wireless device may identify one or more PRACH occasion(s) of a particular reference signal (e.g., SSB and/or CSI-RS) by a PRACH mask index value in the control order (e.g., PDCCH order). The control order (e.g., PDCCH) may comprise a field indicating a particular SSB (or CSI-RS). For example, the allowed PRACH occasions in FIG. 19 may be mapped (e.g., consecutively) for an index of the particular SSB. The wireless device may select the first PRACH occasion indicated by a first PRACH mask index value for the particular SSB in the first association period. The first association period may be a first mapping cycle. The wireless device may reset the one or more indexes of the one or more PRACH occasions for the first mapping cycle.

In an example, a base station may transmit, to a wireless device, one or more messages indicating random access parameters of a four-step random access procedure in FIG. 12 and/or a two-step random access procedure in FIG. 17. For example, the one or more messages may be broadcast RRC message, wireless device specific RRC message, and/or combination thereof. For example, the one or more message may comprise at least one of random access common configuration (e.g., RACH-ConfigCommon), random access generic configuration (e.g., RACH-ConfigGeneric), and/or random access configuration dedicated to a wireless device (e.g., RACH-ConfigDedicated). For example, for a contention based (four-step and/or a two-step) random access procedure, a wireless device may receive, from a base station, at least RACH-ConfigCommon and RACH-ConfigGeneric. For example, for a contention free (four-step and/or a two-step) random access procedure, a wireless device may receive, from a base station, at least RACH-ConfigDedicated.

For example, a random access procedure may be initiated in one or more ways at least based on one of RACH-ConfigCommon, RACH-ConfigGeneric, and RACH-ConfigDedicated. For example, a random access procedure may be initiated by a PDCCH order transmitted by a base station, by the MAC entity of a wireless device, and/or by RRC. There may be one random access procedure ongoing at any point in time in a MAC entity. A random access procedure on an SCell may be initiated by a PDCCH order with ra-PreambleIndex different from a first index (that may be predefined or configured e.g., 0b000000). For example, if the MAC entity of a wireless device receives a request for a random access procedure while another is already ongoing in the MAC entity, a wireless device may continue with the ongoing procedure or start with the new procedure (e.g. for SI request).

An example random access common configuration (e.g., RACH-ConfigCommon) may be below:

```
RACH-ConfigCommon ::= SEQUENCE {
  rach-ConfigGeneric  RACH-ConfigGeneric,
  totalNumberOfRA-Preambles  INTEGER (1..63)  OPTIONAL, -- Need S
  ssb-perRACH-OccasionAndCB-PreamblesPerSSB CHOICE {
    OneEighth     ENUMERATED
{n4,n8,n12,n16,n20,n24,n28,n32,n36,n40,n44,n48,n52,n56,n60,n64},
    oneFourth     ENUMERATED
{n4,n8,n12,n16,n20,n24,n28,n32,n36,n40,n44,n48,n52,n56,n60,n64},
    oneHalf       ENUMERATED
{n4,n8,n12,n16,n20,n24,n28,n32,n36,n40,n44,n48,n52,n56,n60,n64},
    one           ENUMERATED
{n4,n8,n12,n16,n20,n24,n28,n32,n36,n40,n44,n48,n52,n56,n60,n64},
    two           ENUMERATED {n4,n8,n12,n16,n20,n24,n28,n32},
    four          INTEGER (1..16),
    eight         INTEGER (1..8),
    sixteen       INTEGER (1..4),
  } OPTIONAL, -- Need M
  groupBconfigured SEQUENCE {
    ra-Msg3SizeGroupA ENUMERATED { b56, b144, b208, b256, b282, b480, b640, b800, b1000, spare7, spare6, spare5, spare4, spare3, spare2, spare1},
    messagePowerOffsetGroupB ENUMERATED { minusinfinity, dB0, dB5, dB8, dB10, dB12, dB15, dB18},
    numberOfRA-PreamblesGroupA  INTEGER (1..64)
  } OPTIONAL,-- Need R
  ra-ContentionResolutionTime  ENUMERATED { sf8, sf16, sf24, sf32, sf40, sf48, sf56, sf64},
  rsrp-ThresholdSSB    RSRP-Range  OPTIONAL, --Need R
  rsrp-ThresholdSSB-SUL  RSRP-Range  OPTIONAL, -- Cond SUL
  prach-RootSequenceIndex  CHOICE {
    1839  INTEGER (0..837),
    1139  INTEGER (0..137)
  },
  msg1-SubcarrierSpacing  SubcarrierSpacing  OPTIONAL, --Need S
  restrictedSetConfig  ENUMERATED { unrestrictedSet, restrictedSetTypeA, restrictedSetTypeB},
  msg3-transformPrecoding  ENUMERATED { enabled }  OPTIONAL, --Need R
  ...
}
```

For example, messagePowerOffsetGroupB may indicate a threshold for preamble selection. The value of messagePowerOffsetGroupB may be in dB. For example, minusinfinity in RACH-ConfigCommon may corresponds to −infinity. The value dB0 may correspond to 0 dB, dB5 may correspond to 5 dB and so on. msg1-SubcarrierSpacing in RACH-ConfigCommon may indicate a subcarrier spacing of PRACH. One or more values, e.g., 15 or 30 kHz (<6 GHz), 60 or 120 kHz (>6 GHz) may be applicable. There may be a layer 1 parameter (e.g., 'prach-Msg 1SubcarrierSpacing) corresponding to msg1-SubcarrierSpacing. A wireless device may apply the SCS as derived from the prach-ConfigurationIndex in RACH-ConfigGeneric, for example, if this parameter is absent. A base station may employ msg3-transformPrecoding to indicate to a wireless device whether transform precoding is enabled for data transmission (e.g., Msg 3 in a four-step RA procedure and/or one or more TB transmission in a two-step RA procedure). Absence of msg3-transfromPrecoding may indicate that it is disabled. numberOfRA-PreamblesGroupA may indicate a number of contention based (CB) preambles per SSB in group A. This may determine implicitly the number of CB preambles per SSB available in group B. The setting may be consistent with the setting of ssb-perRACH-OccasionAndCB-PreamblesPerSSB. prach-RootSequenceIndex may indicate PRACH root sequence index. There may be a layer 1 parameter (e.g., 'PRACHRootSequenceIndex') corresponding to ssb-perRACH-OccasionAndCB-PreamblePerSSB. The value range may depend on a size of preamble, e.g., whether a preamble length (L) is L=839 or L=139. ra-ContentionResolutionTimer may indicate an initial value for the contention resolution timer. For example, a value ms8 in RACH-ConfigCommon may indicate 8 ms, value ms16 may indicate 16 ms, and so on. ra-Msg 3SizeGroupA may indicate a transport blocks size threshold in bit. For example, a wireless device may employ a contention based RA preamble of group A, for example, when the transport block size is below ra-Msg 3SizeGroupA. rach-ConfigGeneric may indicate one or more generic RACH parameters in RACH-ConfigGeneric. restrictedSetConfig may indicate a configuration of an unrestricted set or one of two types of restricted sets. rsrp-ThresholdSSB may indicate a threshold for SS block selection. For example, a wireless device may select the SS block and corresponding PRACH resource for path-loss estimation and (re)transmission based on SS blocks that satisfy the threshold. rsrp-ThresholdSSB-SUL may indicate a threshold for uplink carrier selection. For example, a wireless device may select a supplementary uplink (SUL) carrier to perform random access based on this threshold. ssb-perRACH-OccasionAndCB-PreamblesPerSSB may indicate a number of SSBs per RACH occasion and a number of contention based preambles per SSB. There may be layer 1 one or more parameters (e.g., 'SSB-per-rach-occasion' and/or 'CB-preambles-per-SSB') corresponding to ssb-perRACH-OccasionAndCB-PreamblesPerSSB. For example, a total number of CB preambles in a RACH occasion may be given by CB-preambles-per-SSB*max(1, SSB-per-rach-occasion). totalNumberOfRA-Preambles may indicate a total number of preambles employed for contention based and contention free random access. For example, totalNumberOfRA-Preambles may not comprise one or more preambles employed for other purposes (e.g. for SI request). A wireless device may use one or more of 64 preambles for RA, for example, if the field is absent.

An example random access common configuration of RACH-ConfigGeneric may be below:

```
RACH-ConfigGeneric ::= SEQUENCE {
  prach-ConfigurationIndex    INTEGER (0..255),
  msg1-FDM                    ENUMERATED {one, two, four, eight},
  msg1-FrequencyStart         INTEGER (0..maxNrofPhyscialResourceBlocks-1),
```

```
    zeroCorrelationZoneConfig    INTEGER(0..15),
    preambleReceivedTargetPower  INTEGER (−202..−60),
    preambleTransMax             ENUMERATED {n3, n4, n5, n6, n7,n8, n10, n20, n50, n100,
n200},
    powerRampingStep             ENUMERATED {dB0, dB2, dB4, dB6),
    ra-ResponseWindow            ENUMERATED {sl1, sl2, sl4, sl8, sl10, sl20, sl40,
sl80},
    ...
}
```

For example, msg1-FDM may indicate a number of PRACH transmission occasions FDMed in one time instance. There may be a layer 1 parameter (e.g., 'prach-FDM') corresponding to msg1-FDM. msg1-FrequencyStart may indicate an offset of PRACH transmission occasion (e.g., lowest PRACH transmission occasion) in frequency domain with respective to a particular PRB (e.g., PRB 0). A base station may configure a value of msg1-FrequencyStart such that the corresponding RACH resource is within the bandwidth of the UL BWP. There may be a layer 1 parameter (e.g., 'prach-frequency-start') corresponding to msg1-FreqencyStart. powerRampingStep may indicate power ramping steps for PRACH. prach-ConfigurationIndex may indicate a PRACH configuration index. For example, a radio access technology (e.g., LTE, and/or NR) may predefine one or more PRACH configurations, and prach-Configuration-Index may indicate one of the one or more PRACH configurations. There may be a layer 1 parameter (e.g., 'PRACHConfigurationIndex') corresponding to prach-ConfigurationIndex. preambleReceivedTargetPower may indicate a target power level at the network receiver side. For example, multiples of a particular value (e.g., in dBm) may be chosen. RACH-ConfigGeneric above shows an example when multiples of 2 dBm are chosen (e.g. −202, −200, −198, . . . ). preambleTransMax may indicate a number of RA preamble transmissions performed before declaring a failure. For example, preambleTransMax may indicate a maximum number of RA preamble transmissions performed before declaring a failure. ra-ResponseWindow may indicate an RAR window length in number of slots (or subframes, mini-slots, and/or symbols). a base station may configure a value lower than or equal to a particular value (e.g., 10 ms). The value may be larger than a particular value (e.g., 10 ms). zeroCorrelationZoneConfig may indicate an index of preamble sequence generation configuration (e.g., N-CS configuration). A radio access technology (e.g., LTE and/or NR) may predefine one or more preamble sequence generation configurations, and zeroCorrelationZoneConfig may indicate one of the one or more preamble sequence generation configurations. For example, a wireless device may determine a cyclic shift of preamble sequence based on zeroCorrelationZoneConfig. zeroCorrelationZoneConfig may determine a property of random access preambles (e.g., a zero correlation zone)

An example random access dedicated configuration (e.g., RACH-ConfigDedicated) may be below:

```
RACH-ConfigDedicated ::= SEQUENCE {
    cfra    CFRA  OPTIONAL,  -- Need N
    ra-Prioritization  RA-Prioritization  OPTIONAL, --Need N
    ...
}
```

```
CFRA ::= SEQUENCE {
    occasions  SEQUENCE {
        rach-ConfigGeneric   RACH-ConfigGeneric,
        ssb-perRACH-Occasion  ENUMERATED {oneEigth, oneFourth,
oneHalf, one, two, four, eight, sixteen}  OPTIONAL --Cond SSB-CFRA
    } OPTIONAL,-- Need S
    resources  CHOICE {
        ssb  SEQUENCE {
            ssb-ResourceList SEQUENCE (SIZE
            (1..maxRA-SSB-Resources)) OF
CFRA-SSB-Resource,
            ra-ssb-OccasionMaskIndex  INTEGER (0.15)
        },
        csirs  SEQUENCE {
            csirs-ResourceList SEQUENCE (SIZE(1..maxRA-
CSIRS-Resources)) OF CFRA-CSIRS-Resource
            rsrp-ThresholdCSI-RS  RSRP-Range
        }
    },
    ...
}
CFRA-SSB-Resource ::= SEQUENCE {
    ssb  SSB-Index,
    ra-PreambleIndex  INTEGER (0..63),
    ...
}
CFRA-CSIRS-Resource ::= SEQUENCE {
    csi-RS  CSI-RS-Index,
    ra-OccasionList  SEQUENCE (SIZE
    (1..maxRA-OccasionPerCSIRS)) OF
INTEGER (0..maxRA-Occasions-1),
    ra-PreambleIndex  INTEGER (0..63),
    ...
}
```

For example, a CSI-RS may be indicated by an identifier (e.g., ID) of a CSI-RS resource defined in the measurement object associated with this serving cell. ra-OccasionList may indicate one or more RA occasions. A wireless device may employ the one or more RA occasions, for example, when the wireless device performs a contention-free random access (CFRA) procedure upon selecting the candidate beam identified by the CSI-RS. ra-PreambleIndex may indicate an RA preamble index to use in the RA occasions associated with this CSI-RS. ra-ssb-OccasionMaskIndex may indicate a PRACH Mask Index for RA Resource selection. The mask may be valid for one or more SSB resources signaled in ssb-ResourceList. rach-ConfigGeneric may indicate a configuration of contention free random access occasions for the CFRA procedure. ssb-perRACH-Occasion may indicate a number of SSBs per RACH occasion. ra-PreambleIndex may indicate a preamble index that a wireless device may employ when performing CFRA upon selecting the candidate beams identified by this SSB. ssb in RACH-ConfigDedicated may indicate an identifier (e.g., ID) of an SSB transmitted by this serving cell. cfra in RACH-ConfigDedicated may indicate one or more parameters for contention free random access to a given target cell. A wireless device may perform contention based random access, for example, if the field (e.g., cfra) is absent. ra-prioritization may indicate one or more parameters which apply for prioritized random access procedure to a given target cell. A field, SSB-CFRA, in RACH-ConfigDedicated may be present, for example, if the field resources in CFRA is set to ssb; otherwise it may be not present.

In an example, a base station may transmit, to a wireless device, one or more RRC message indicating at least one of: an available set of PRACH occasions for the transmission of the Random Access Preamble (e.g., prach-ConfigIndex), an initial Random Access Preamble power (e.g., preambleReceivedTargetPower), an RSRP threshold for the selection of the SSB and corresponding Random Access Preamble and/ or PRACH occasion (e.g., rsrp-ThresholdSSB, rsrp-ThresholdSSB may be configured in a beam failure recovery configuration, e.g., BeamFailureRecoveryConfig IE, for example, if the Random Access procedure is initiated for beam failure recovery), an RSRP threshold for the selection of CSI-RS and corresponding Random Access Preamble and/or PRACH occasion (e.g., rsrp-ThresholdCSI-RS, rsrp-ThresholdCSI-RS may be set to a value calculated based on rsrp-ThresholdSSB and an offset value, e.g., by multiplying rsrp-ThresholdSSB by powerControlOffset), an RSRP threshold for the selection between the NUL carrier and the SUL carrier (e.g., rsrp-ThresholdSSB-SUL), a power offset between rsrp-ThresholdSSB and rsrp-ThresholdCSI-RS to be employed when the Random Access procedure is initiated for beam failure recovery (e.g., powerControlOffset),
a power-ramping factor (e.g., powerRampingStep), a power-ramping factor in case of differentiated Random Access procedure (e.g., powerRampingStepHighPriority), an index of Random Access Preamble (e.g., ra-PreambleIndex), an index (e.g., ra-ssb-OccasionMaskIndex) indicating PRACH occasion(s) associated with an SSB in which the MAC entity may transmit a Random Access Preamble (e.g., FIG. 19 shows an example of ra-ssb-OccasionMaskIndex values), PRACH occasion(s) associated with a CSI-RS in which the MAC entity may transmit a Random Access Preamble (e.g., ra-OccasionList), a maximum number of Random Access Preamble transmission (e.g., preambleTransMax), a number of SSBs mapped to each PRACH occasion and a number of Random Access Preambles mapped to each SSB (e.g., ssb-perRACH-OccasionAndCB-PreamblesPerSSB, the time window (duration, and/or interval) to monitor RA response(s) (e.g., ra-ResponseWindow) and/or a Contention Resolution Timer (e.g., ra-ContentionResolutionTimer).

In an example, an RA procedure may be initiated for beam failure detection and recovery. For example, a wireless device may be configured by RRC with a beam failure recovery procedure which may be employed for indicating to the serving base station of a SSB or CSI-RS when beam failure is detected on the serving SSB(s)/CSI-RS(s). Beam failure may be detected by counting one or more beam failure instance indication from the lower layers to the MAC entity. For example, a base station may configure a wireless device by transmitting an RRC message (e.g., comprising a beam failure recovery configuration, e.g., BeamFailureRecoveryConfig) indicating at least one of following:
beamFailureInstanceMaxCount for the beam failure detection. beamFailureDetectionTimer for the beam failure detection, beamFailureRecoveryTimer for the beam failure recovery procedure, rsrp-ThresholdSSB for an RSRP threshold for the beam failure recovery, powerRampingStep for the beam failure recovery, preambleReceivedTargetPower, preambleReceivedTargetPower for the beam failure recovery, preambleTransMax for the beam failure recovery, the time window (e.g., ra-ResponseWindow) to monitor response(s) for the beam failure recovery using contention-free Random Access Preamble, prach-ConfigIndex for the beam failure recovery, ra-ssb-OccasionMaskIndex for the beam failure recovery, ra-OccasionList for the beam failure recovery.

In an example, a wireless device may employ one or more parameters for a random access procedure. For example, a wireless device may employ at least one of PREAMBLE_INDEX; PREAMBLE_TRANSMISSION_COUNTER; PREAMBLE_POWER_RAMPING_COUNTER; PREAMBLE_POWER_RAMPING_STEP; PREAMBLE_RECEIVED_TARGET_POWER; PREAMBLE_BACKOFF; PCMAX; SCALING_FACTOR_BI; and TEMPORARY_C-RNTI.

In an example, a wireless device may perform random access resource selection for selecting one or more preambles and one or more PRACH occasion (or resources comprising time, frequency, and/or code). For example, there may be one or more cases that a random access procedure may be initiated for beam failure recovery; and/or the beamFailureRecoveryTimer is either running or not configured; and/or the contention-free Random Access Resources for beam failure recovery request associated with any of the SSBs and/or CSI-RSs have been explicitly provided by RRC; and/or at least one of the SSBs with SS-RSRP above rsrp-ThresholdSSB amongst the SSBs in candidateBeamRSList or the CSI-RSs with CSI-RSRP above rsrp-ThresholdCSI-RS amongst the CSI-RSs in candidateBeamRSList is available. In this case, a wireless device may select one or more SSBs with corresponding one or more SS-RSRP values above rsrp-ThresholdSSB amongst the SSBs in candidateBeamRSList or one or more CSI-RSs with corresponding one or more CSI-RSRP values above rsrp-ThresholdCSI-RS amongst the CSI-RSs in candidateBeamRSList. For example, a wireless device may select at least one CSI-RS and set the PREAMBLE_INDEX to a ra-PreambleIndex corresponding to the SSB in candidateBeamRSList which is quasi-collocated with the at least one CSI-RS selected by the wireless device, for example, if there is no ra-PreambleIndex associated with the at least one CSI-RS, otherwise the wireless device may set the PREAMBLE_INDEX to a ra-PreambleIndex corresponding to the selected SSB or CSI-RS from the set of Random Access Preambles for beam failure recovery request.

For example, a wireless device may be under one of following cases: a random access procedure may be initiated, a ra-PreambleIndex has been provided by either PDCCH or RRC, the ra-PreambleIndex is not a first preamble index (that may be predefined or configured e.g., 0b000000), contention-free Random Access Resource associated with SSBs or CSI-RSs have not been provided by RRC. In this case, the wireless device may set the PREAMBLE_INDEX to the signaled ra-PreambleIndex.

For example, there may be one or more cases that a random access procedure may be initiated and/or the contention-free Random Access Resources associated with SSBs have been explicitly provided by RRC and at least one SSB with SS-RSRP above rsrp-ThresholdSSB amongst the associated SSBs is available. In this case, a wireless device may select an SSB with SS-RSRP above rsrp-ThresholdSSB amongst the associated SSBs. For example, the wireless device may set the PREAMBLE_INDEX to a ra-PreambleIndex corresponding to the selected SSB.

For example, there may be one or more cases that a random access procedure may be initiated, and the contention-free random access resources associated with CSI-RSs have been explicitly provided by RRC and at least one CSI-RS with CSI-RSRP above rsrp-ThresholdCSI-RS amongst the associated CSI-RSs is available. In this case, a wireless device may select a CSI-RS with CSI-RSRP above rsrp-ThresholdCSI-RS amongst the associated CSI-RSs. for example, the wireless device may set the PREAMBLE_IN-DEX to a ra-PreambleIndex corresponding to the selected CSI-RS.

For example, there may be one or more cases that a random access procedure may be initiated and at least one of the SSBs with SS-RSRP above rsrp-ThresholdSSB is available. In this case, for example, a wireless device may select an SSB with SS-RSRP above rsrp-ThresholdSSB, otherwise may select any SSB. For example, a random access resource selection is performed when Msg 3 1240, two-step Msg 1 1720, and/or one or more TBs 1740 is being retransmitted, a wireless device may select the same group of Random Access Preambles as was employed for the Random Access Preamble transmission attempt corresponding to the first transmission of Msg 3, two-step Msg 1 1720, and/or one or more TBs 1740. For example, if the association between random access preambles and SSBs is configured, a wireless device may select a ra-PreambleIndex randomly with equal probability from the Random Access Preambles associated with the selected SSB and the selected Random Access Preambles group. For example, if the association between random access preambles and SSBs is not configured, a wireless device may select a ra-PreambleIndex randomly with equal probability from the Random Access Preambles within the selected Random Access Preambles group. For example, a wireless device may set the PREAMBLE_IN-DEX to the selected ra-PreambleIndex.

In an example, if an SSB is selected above and an association between PRACH occasions and SSBs is configured, a wireless device determines the next available PRACH occasion from the PRACH occasions corresponding to the selected SSB permitted by the restrictions given by the ra-ssb-OccasionMaskIndex if configured (e.g., the MAC entity of the wireless device may select a PRACH occasion (e.g., randomly with equal probability) amongst the PRACH occasions occurring simultaneously but on different subcarriers, corresponding to the selected SSB; the MAC entity may take into account the possible occurrence of measurement gaps when determining the next available PRACH occasion corresponding to the selected SSB).

In an example, if a CSI-RS is selected above and an association between PRACH occasions and CSI-RSs is configured. a wireless device determines the next available PRACH occasion from the PRACH occasions in ra-OccasionList corresponding to the selected CSI-RS (e.g. the MAC entity of the wireless device may select a PRACH occasion randomly with equal probability amongst the PRACH occasions occurring simultaneously but on different subcarriers, corresponding to the selected CSI-RS; the MAC entity may take into account the possible occurrence of measurement gaps when determining the next available PRACH occasion corresponding to the selected CSI-RS).

In an example, if a CSI-RS is selected above and there is no contention-free Random Access Resource associated with the selected CSI-RS, a wireless device may determine the next available PRACH occasion from the PRACH occasions, permitted by the restrictions given by the ra-ssb-OccasionMaskIndex if configured, corresponding to the SSB in candidateBeamRSList which is quasi-collocated with the selected CSI-RS (e.g., the MAC entity of the wireless device may take into account the possible occurrence of measurement gaps when determining the next available PRACH occasion corresponding to the SSB which is quasi-collocated with the selected CSI-RS).

A wireless device may determine the next available PRACH occasion (e.g., the MAC entity of the wireless device may select a PRACH occasion (e.g., randomly with equal probability) amongst the PRACH occasions occurring simultaneously but on different subcarriers; the MAC entity may take into account the possible occurrence of measurement gaps when determining the next available PRACH occasion).

A wireless device may perform the random access preamble transmission based on a selected PREABLE INDEX and PRACH occasion. For example, if the notification of suspending power ramping counter has not been received from lower layers; and/or if an SSB and/or a CSI-RS selected is not changed (i.e. same as the previous Random Access Preamble transmission), a wireless device may increment PREAMBLE_POWER_RAMPING_COUNTER by one. The wireless device may select a value of DELTA_PREAMBLE that may be predefined and/or semi-statically configured by a base station and set PREAMBLE_RECEIVED_TARGET_POWER to preambleReceivedTargetPower+DELTA_PREAMBLE+(PREAMBLE_POWER_RAMPING_COUNTER−1)×PREAMBLE_POWER_RAMPING_STEP.

A MAC entity of the wireless device may instruct the physical layer to transmit the Random Access Preamble using the selected PRACH, corresponding RA-RNTI (e.g., if available), PREAMBLE_INDEX and PREAMBLE_RECEIVED_TARGET_POWER. For example, the wireless device determines an RA-RNTI associated with the PRACH occasion in which the Random Access Preamble is transmitted, e.g., In an example, the RA-RNTI associated with the PRACH in which the Random Access Preamble is transmitted, may be determined in terms of index of the first OFDM symbol of the specified PRACH, an index of the first slot of the specified PRACH in a system frame, an index of the specified PRACH in the frequency domain, and/or uplink carrier indicator. An example RA-RNTI may be determined as:

RA-RNTI=1+s_id+14×t_id+14×80×f_id+14×80×8×ul_carrier_id where s_id may be the index of the first OFDM symbol of the specified PRACH (0≤s_id<14), t_id may be the index of the first slot of the specified PRACH in a system frame (0≤t_id<80), f_id may be the index of the specified PRACH in the frequency domain (0≤f_id<8), and ul_carrier_id (0 for NUL carrier, and 1 for SUL carrier or vice versa) may be the UL carrier used for Msg 1 1220 transmission or two-step Msg 1 1720. In an unlicensed band, RA-RNTI may be determined further based on a SFN and/or RAR window size. For example, the RA-RNTI may be determined further based on a remainder after division of the SFN by the RAR window size (e.g., the SFN modulo the RAR window size), e.g., RA-RNTI=1+s_id+14×t_id+14×80×f_id+14×80×8×ul_carrier_id×14×80×8×2×(SFN modulo RAR window size), where the SFN is a system frame number of the first slot and RAR window size is configured by a higher layer parameter, e.g., ra-ResponseWindow in RACH-ConfigGeneric. For example, depending on implementation, (SFN modulo RAR window size) may be located before any of components, s_id, 14×t_id, 14×80×f_id, and/or 14×80×8×ul_carrier_id in the RA-RNTI calculation formula.

For example, a wireless device, that transmitted a random access preamble, may start to monitor a downlink control channel for a random access response corresponding to the random access preamble. For a two-step RA procedure, the wireless device may start to monitor the downlink control channel after or in response to transmitting an RAP via PRACH or transmitting one or more TBs via PUSCH. The possible occurrence of a measurement gap may not determine when a wireless device starts to monitor a downlink control channel.

If a wireless device performs a contention-free random access procedure for a beam failure recovery request, the wireless device may start a random access window (e.g., ra-ResponseWindow) configured in a beam management configuration parameters (e.g., BeamFailureRecoveryConfig) at a first downlink control channel (e.g., PDCCH) occasion from the end of the Random Access Preamble transmission. The wireless device may monitor the first downlink control channel of the SpCell for a response to beam failure recovery request identified by the C-RNTI while the random access window is running.

If a wireless device down not performs a contention-free random access procedure for beam a failure recovery request, the wireless device may start a random access window (e.g., ra-ResponseWindow) configured in a random access configuration parameter (e.g., RACH-ConfigCommon) at a first downlink control channel occasion from an end of a random access preamble transmission. The wireless device may monitor the first downlink control channel occasion of the SpCell for random access response(s) identified by the RA-RNTI while a random access response window (e.g., ra-ResponseWindow) is running.

In an example, a downlink assignment may be received by a wireless device, on the PDCCH for the RA-RNTI and the received TB (e.g., MAC PDU comprising one or more random access responses is successfully decoded. For example, the MAC PDU may comprise a MAC subPDU with Random Access Preamble identifier corresponding to a preamble that a wireless device transmits to a base station. In this case, the wireless device may determine that this random access response reception may be successful. For example, the MAC subPDU may comprise a preamble index (e.g., RAPID) only, e.g., for a random access procedure initiated for a system information request.

In a RA procedure, a wireless device may receive from a base station at least one RAR as a response of Msg 1 1220 or two-step Msg 1 1720. The wireless device may monitor a search space set (e.g., the Type1-PDCCH common search space) for a first downlink control information (e.g., DCI format 1_0). The first downlink control information may be scrambled by a particular radio network temporary identifier (e.g., RA-RNTI). The first downlink control information may comprise a downlink assignment indicating scheduling of PDSCH comprising the at least one RAR. The wireless device may use the downlink assignment to identify parameters required for decoding/detecting the PDSCH such as time and frequency resource allocation of the PDSCH, a size of the PDSCH, MCS, etc. The wireless device may receive the PDSCH using the parameters and identify the at least one RAR.

A wireless device may monitor for the first downlink control information (e.g., DCI format 1_0) during a time window. The time window may be indicated by the one or more RRC messages. The time window may start at a first symbol of a first control resource set. The wireless device may be configured by the one or more parameters in the one or more RRC messages to receive the first downlink control information on the first control resource set. The wireless device may determine a length of the time window based on the one or more parameters in the one or more RRC messages (e.g., ra-ResponseWindow). The length of the time window may be in number of slots (or OFDM symbols, and/or absolute time duration, e.g., millisecond(s)).

The wireless device may stop the time window after or in response to a reception of the one or more random access responses being determined as successful. A reception of the one or more random access responses may be determined as successful, for example, when the one or more random access responses comprise a preamble index (e.g., a random access preamble identity: RAPID) corresponding to a preamble that the wireless device transmits to a base station. For example, the RAPID may be associated with the PRACH transmission. The one or more random access responses may comprise an uplink grant indicating one or more uplink resources granted for the wireless device. The wireless device may transmit one or more transport blocks (e.g., Msg 3) via the one or more uplink resources.

Figure 20A:
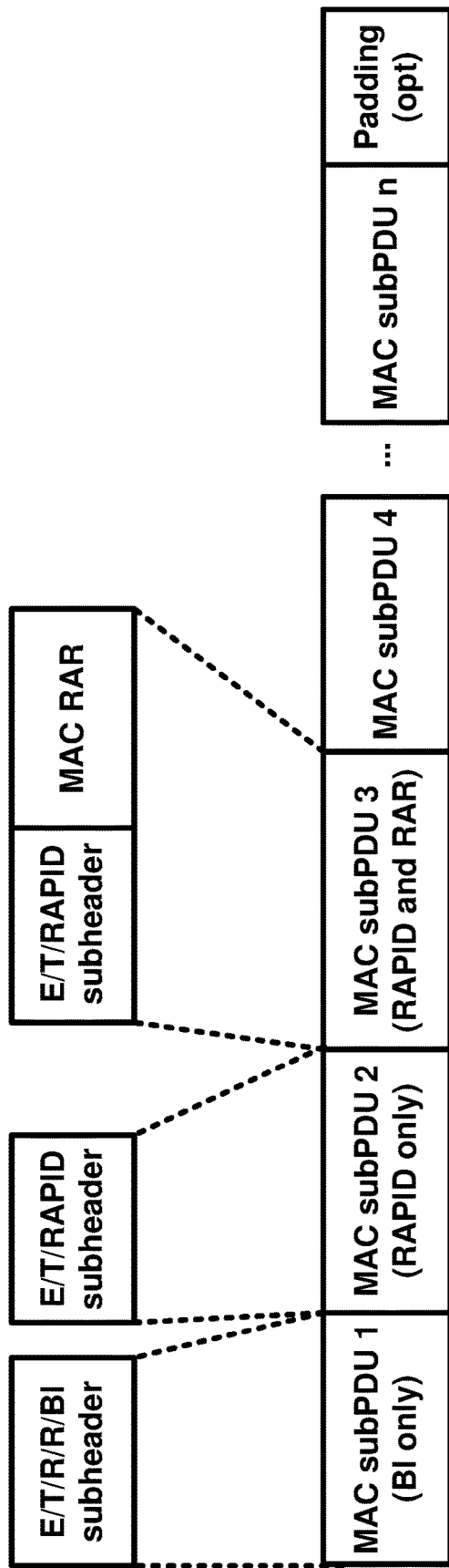
FIG. 20A is an example RAR format as per an aspect of an embodiment of the present disclosure.
Figure 20B:
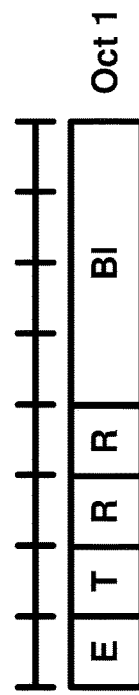
FIG. 20B is an example MAC subheader with backoff indicator as per an aspect of an embodiment of the present disclosure.
Figure 20C:
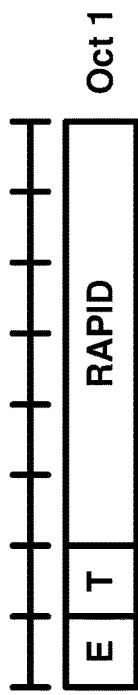
FIG. 20C is an example MAC subheader as per an aspect of an embodiment of the present disclosure.

An RAR may be in a form of MAC PDU comprising one or more MAC subPDUs and/or optionally padding. FIG. 20A is an example of an RAR. A MAC subheader may be octet aligned. Each MAC subPDU may comprise at least one of following: a MAC subheader with Backoff Indicator only; a MAC subheader with RAPID only (i.e. acknowledgment for SI request); a MAC subheader with RAPID and MAC RAR. FIG. 20B is an example of a MAC subheader with backoff indicator. For example, a MAC subheader with backoff indicator comprise one or more header fields, e.g., E/T/R/R/BI as described in FIG. 20B. A MAC subPDU with backoff indicator may be placed at the beginning of the MAC PDU, for example, if the MAC subPDU comprises the backoff indicator. MAC subPDU(s) with RAPID only and MAC subPDU(s) with RAPID and MAC RAR may be placed anywhere after MAC subPDU with Backoff Indicator and, if exist before padding as described in FIG. 20A. A MAC subheader with RAPID may comprise one or more header fields, e.g., E/T/RAPID as described in FIG. 20C. Padding may be placed at the end of the MAC PDU if present. Presence and length of padding may be implicit based on TB size, size of MAC subPDU(s).

In an example one or more header fields in a MAC subheader may indicate as follow: an E field may indicate an extension field that may be a flag indicating if the MAC subPDU including this MAC subheader is the last MAC subPDU or not in the MAC PDU. The E field may be set to "1" to indicate at least another MAC subPDU follows. The E field may be set to "0" to indicate that the MAC subPDU including this MAC subheader is the last MAC subPDU in the MAC PDU; a T filed may be a flag indicating whether the MAC subheader contains a Random Access Preamble ID or a Backoff Indicator (one or more backoff values may predefined and BI may indicate one of backoff value). The T field may be set to "0" to indicate the presence of a Backoff Indicator field in the subheader (BI). The T field may be set to "1" to indicate the presence of a Random Access Preamble ID field in the subheader (RAPID); an R filed may indicate a reserved bit that may be set to "0"; a BI field may be a backoff indicator field that identifies the overload condition in the cell. The size of the BI field may be 4 bits; an RAPID field may be a Random Access Preamble IDentifier field that may identify the transmitted Random Access Preamble. The MAC subPDU may not comprise a MAC RAR, for example, if the RAPID in the MAC subheader of a MAC subPDU corresponds to one of the Random Access Preambles configured for SI request.

Figure 22:
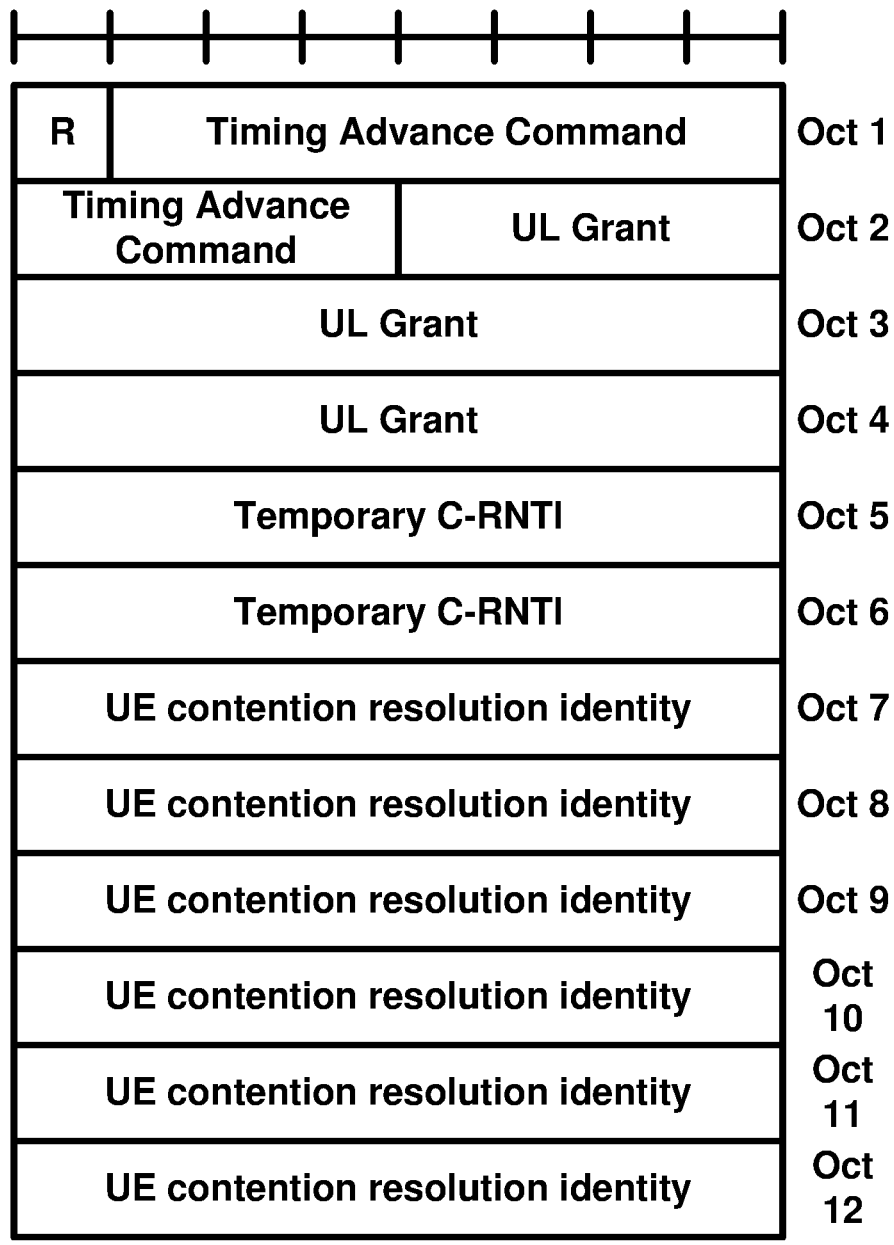
FIG. 22 is an example MAC RAR format as per an aspect of an embodiment of the present disclosure.

There may be one or more MAC RAR format. At least one of following MAC RAR format may be employed in a four-step or a two-step RA procedure. For example, FIG. 22 is an example of one of MAC RAR formats. The MAC RAR may be fixed size as depicted in FIG. 22 and may comprise at least one of the following fields: an R field that may indicate a Reserved bit, set to "0"; a Timing Advance Command field that may indicate the index value TA employed to control the amount of timing adjustment; a UL Grant field that indicate the resources to be employed on the uplink; and a RNTI field (e.g., Temporary C-RNTI and/or C-RNTI) that may indicate an identity that is employed during Random Access. For example, for a two-step RA procedure, an RAR may comprise at least one of following: a UE contention resolution identity, an RV ID for retransmission of one or more TBs, decoding success or failure indicator of one or more TB transmission, and one or more fields shown in FIG. 22.

There may be a case that a base station may multiplex, in a MAC PDU, RARs for two-step and four-step RA procedures. If RARs for two-step and four-step RA procedure have the same size, a wireless device may not require an RAR length indicator field and/or the wireless device may determine the boundary of each RAR in the MAC PDU based on pre-determined RAR size information. For example, FIG. 22 is an example RAR format that may be employed in a MAC PDU multiplexing RARs for two-step and four-step RA procedures. The RAR shown in FIG. 22 may be a fixed size using the same format for two-step and four-step RA procedures.

In an example, an RAR for a two-step RA procedure may have a different format, size, and/or fields, from an RAR for a four-step RA procedure. For example, FIG. 23A, and FIG. 23B are example RAR formats that may be employed for a two-step RA procedure. If RARs for two-step and four-step RA procedures are multiplexed into a MAC PDU, and the RARs have different format between two-step and four-step RA procedure, an RAR may have a field to indicate a type of RAR (e.g., a reserved "R" field as shown in FIG. 22, FIG. 23A, and FIG. 23B may be employed to indicate a type of RAR). A field for indicating an RAR type may be in a subheader (such as a MAC subheader) or in an RAR. An RAR may comprise different types of fields that may correspond with an indicator in a subheader or in an RAR. A wireless device may determine the boundary of one or more RARs in a MAC PDU based on one or more indicators.

There may be a random access response window where a wireless device may monitor a downlink control channel for a random access response transmitted from a base station as a response to a preamble transmitted by the wireless device. For example, a base station may transmit a message comprising a value of an RAR window. For example, a message comprising a random access configuration parameters (e.g., RACH-ConfigGeneric) may indicates a value of an RAR window (e.g., ra-ResponseWindow in RACH-ConfigGeneric). For example, the value of an RAR window may be fixed, for example, to 10 ms or other time value. For example, the value of an RAR window may be defined in terms of a number of slots as shown in RACH-ConfigGeneric. A wireless device may identify (or determine) a size (e.g., duration, and/or length) of an RAR window based on a numerology configured for a random access procedure. For example, a numerology defines one or more system parameters such as subcarrier spacing, slot duration, cyclic prefix size, number of OFDM symbol per slot, number of slots per frame, number of slots per subframe, minimum number of physical resource blocks, and/or maximum number of physical resource blocks. For example, the one or more system parameters associated with a numerology may be predefined with different subcarrier spacing, slot duration, and/or cyclic prefix size. For example, a wireless device may identify a subcarrier spacing 15 kHz, normal cyclic prefix, 14 symbols per slot, 10 slots per frame, and/or 1 slot per subframe for the numerologies $\mu=0$. For example, a wireless device may identify a subcarrier spacing 30 kHz, normal cyclic prefix, 14 symbols per slot, 20 slots per frame, and/or 2 slot per subframe for the numerologies $\mu=1$. For example, a wireless device may identify a subcarrier spacing 60 kHz, 14 symbols per slot, 40 slots per frame, and/or 4 slot per subframe for the numerologies $\mu=2$ with normal cyclic prefix. For example, a wireless device may identify a subcarrier spacing 60 kHz, 12 symbols per slot, 40 slots per frame, and/or 4 slot per subframe for the numerologies $\mu=2$ with extended cyclic prefix. For example, a wireless device may identify a subcarrier spacing 120 kHz, normal cyclic prefix, 14 symbols per slot, 80 slots per frame, and/or 8 slot per subframe for the numerologies $\mu=3$. For example, a wireless device may identify a subcarrier spacing 240 kHz, normal cyclic prefix, 14 symbols per slot, 160 slots per frame, and/or 16 slot per subframe for the numerologies $\mu=4$.

A wireless device may determine (or identify) a size (e.g., duration or length) of the RAR window based on a configured RAR window value and a numerology. For example, the RAR window has a duration of 20 ms, e.g., if the configured RAR window value is s120 (e.g., 20 slots) and the numerology is $\mu=0$ (e.g., slot duration for $\mu=0$ is 1 ms). In an example, a particular RAR window value (e.g., ra-ResponseWindow in RACH-ConfigGeneric) configured by an RRC message (e.g., broadcast and/or wireless specific unicast) may be associated with a particular numerology. For example, in RACH-ConfigGeneric, s110, s120, s140, and s180 may be values of ra-ResponseWindow for numerologies $\mu=0$, $\mu=1$, $\mu=2$, and $\mu=3$, respectively. In an example, a base station configures a wireless device a particular RAR window value independent of a numerology. In an licensed band, a size (e.g., duration or length) of an RAR window may not be longer than 10 ms (and/or a periodicity of PRACH occasion). In an licensed band, a duration (e.g., size or length) of an RAR window may be longer than 10 ms (and/or a periodicity of PRACH occasion).

A wireless device may perform one or more retransmission of one or more preambles during a random access procedure (e.g., two-step RA procedure and/or four-step RA procedure). There may be one or more conditions at least based on which the wireless device determines the one or more retransmission of one or more preambles. The wireless device may determine the one or more retransmission of one or more preambles, e.g., when the wireless device determines that a random access response reception is not successful. The wireless device may determine that a random access response reception is not successful, e.g., if at least one random access response comprising one or more random access preamble identifiers that matches the transmitted PREAMBLE_INDEX has not been received until an RAR window (e.g., ra-ResponseWindow configured by RRC, e.g., in RACH-ConfigCommon) expires. The wireless device may determine that a random access response reception is not successful, for example, if a PDCCH addressed to the C-RNTI has not been received on the Serving Cell where the preamble was transmitted until a RAR window for a beam failure recovery procedure (e.g., ra-ResponseWindow configured in BeamFailureRecoveryConfig) expires.

A wireless device may determine the one or more retransmission of one or more preambles, e.g., when the wireless device determines that a contention resolution is not successful. For example, the wireless device may determine, based on Msg 3 for four-step RA procedure and/or MsgB for two-step RA procedure, whether the contention resolution is not successful. For example, a MAC entity of the wireless device may start a contention resolution timer (e.g., ra- ContentionResolutionTimer) and may restart the contention resolution timer (e.g., ra-ContentionResolutionTimer) at each HARQ retransmission in the first symbol after the end of a Msg 3 transmission, for example, once a wireless device transmits, to a base station, Msg 3. For example, for two-step RA procedure, the wireless device may fallback to four-step RA procedure based on an explicit and/or implicit indication of MsgB. For example, if MsgB indicates at least one of: UL grant, TC-RNTI, and/or TA, the wireless device may determine to fall back to the four-step RA procedure. The wireless device may transmit Msg 3 after or in response to determining to fall back to the four-step RA procedure via resource(s) indicated by UL grant in Msg B. In this case the wireless device may follow the four-step RA procedure, e.g., starting the contention resolution timer, and/or determining whether the contention resolution is successful or not. The wireless device may monitor a PDCCH while the contention resolution timer (e.g., ra-ContentionResolutionTimer) is running, e.g., for example, regardless of the possible occurrence of a measurement gap. A wireless device may stop the contention resolution timer and determine that a contention resolution is successful, for example, if a notification of a reception of a PDCCH transmission of a cell (e.g., SpCell) is received from lower layers, and the wireless device identifies that the PDCCH transmission is an indication of a contention resolution corresponding to a Msg 3 transmission (or MsgB transmission) that the wireless device performed.

A wireless device may determine one or more retransmission of one or more preambles, for example, if the wireless device determines that a contention resolution is not successful. A wireless device may determine that a contention resolution is not successful, for example, if the wireless device does not receive an indication of a contention resolution while a contention resolution timer (e.g., ra-ContentionResolutionTimer) is running. For example, the wireless device may determine that a contention resolution is not successful, for example, if the contention resolution timer (e.g., ra-ContentionResolutionTimer) expires. The wireless device may discard a TEMPRARY_C-RNTI indicated by an RAR (or Msg B) after or in response to an expiry of the contention resolution timer (and/or in response to the contention resolution being unsuccessful).

For a two-step RA procedure, a wireless device may determine one or more retransmission of one or more preambles, for example, if the wireless device may not receive MsgB corresponding to MsgA, for example, during a window configured to monitor MsgB in one or more DL control channels. A wireless device performing a two-step RA procedure may receive a response (e.g., MsgB) indicating a fallback to a four-step RA procedure. In this case, the wireless device may start a timer (e.g., ra-ContentionResolutionTimer) in response to transmitting one or more TBs (e.g., Msg 3) to a base station. The wireless device may determine one or more retransmission of one or more preambles, for example, if the timer (e.g., ra-ContentionResolutionTimer).

A wireless device may increment a counter counting a number of preamble transmissions (e.g., PREAMBLE_TRANSMISSION_COUNTER) by 1 in response to a random access response reception being unsuccessful and/or in response to a contention resolution being unsuccessful. The wireless device may determine that a random access procedure is unsuccessfully completed and/or a MAC entity of the wireless device may indicate a random access problem to upper layer(s), for example, if the number of preamble transmissions may reach a threshold, (e.g., if PREAMBLE_TRANSMISSION_COUNTER=preamble-TransMax+1). The wireless device may determine that a random access procedure is not completed (and/or one or more retransmission of one or more preambles), for example, if the number of preamble transmissions may not reach a threshold, (e.g., if PREAMBLE_TRANSMISSION_COUNTER<preambleTransMax+1).

A wireless device may delay a particular period of time (e.g., a backoff time) for performing a retransmission of one or more preamble. For example, the wireless device may set the backoff time to 0 ms, for example, when a random access procedure is initiated. The wireless device may set (or update) the backoff time based on the PREAMBLE_BACKOFF determined by a value in a BI field of the MAC subPDU (e.g., BI field in FIG. 20B). For example, the wireless device may set the PREAMBLE_BACKOFF to value of the BI field of the MAC subPDU using a predefined table. For example, if the wireless device receives BI indicating index 3 (or 0010 in a bit string), the wireless device may set the PREAMBLE_BACKOFF to a value of row index 3 in the predefined table. For example, in FIG. 20B, since four bits are allocated for the BI fields, there may be at most 16 values (e.g., each of 16 values is identified by a particular row index) in the predefined table. The wireless device may set the PREAMBLE_BACKOFF to value of the BI field of the MAC subPDU multiplied with SCALING_FACTOR_BI (e.g., a scaling factor) if a base station configures the wireless device with scalingFactorBI by one or more RRC messages. The wireless device may set (or update) the PREMABLE_BACKOFF based on a BI field, for example, if a downlink assignment has been received on the PDCCH for the RA-RNTI and the received TB is successfully decoded, and/or if the Random Access Response comprises a MAC subPDU with Backoff Indicator (BI in FIG. 20B). The wireless device may set the PREAMBLE_BACKOFF to 0 ms, for example, if a downlink assignment has not been received on the PDCCH for the RA-RNTI and/or the received TB is not successfully decoded, and/or if the Random Access Response does not comprise a MAC subPDU with Backoff Indicator (BI in FIG. 20B).

A wireless device may determine a backoff time based on the PREAMBLE_BACKOFF. For example, the wireless device may determine the backoff time, for example, if the wireless device determines that a random access response is not successful and/or a contention resolution is not successful. The wireless device may employ a particular selection mechanism to determine the backoff time. For example, the wireless device may determine the backoff time based on a uniform distribution between 0 and the PREAMBLE_BACKOFF. The wireless device may employ any type of distribution to select the backoff time based on the PREAMBLE_BACKOFF. The wireless device may ignore the PREAMBLE_BACKOFF (e.g., a value in BI field in FIG. 20B) and/or may not have a backoff time. For example, the wireless device may determine whether to apply the backoff time to a retransmission of at least one preamble based on an event type initiating the random access procedure (e.g., Beam Failure Recovery request, handover, etc.) and/or a type of the random access procedure (e.g., four-step or two-step RA and/or CBRA or CFRA). For example, the wireless device may apply the backoff time to the retransmission, for example, if the random access procedure is CBRA (e.g., where a preamble is selected by a MAC entity of the wireless device) and/or if the wireless device determines that a random access procedure is not completed based on a random access response reception being unsuccessful. For example, the wireless device may apply the backoff time to the retransmission, for example, if the wireless device determines that a random access procedure is not completed based on a contention resolution being unsuccessful.

A wireless device may perform a random access resource selection procedure (e.g., select at least one SSB or CSI-RS and/or select PRACH corresponding to at least one SSB or CSI-RS selected by the wireless device), for example, if the random access procedure is not completed. The wireless device may delay the subsequent random access preamble transmission (e.g., or delay to perform a random access resource selection procedure) by the backoff time.

A radio access technology may allow a wireless device to change (switch) a channel (a uplink carrier, BWP, and/or a subband) to transmit at least one preamble for a retransmission. This may increase a number of preamble transmission opportunities in an unlicensed band. For example, a base station may transmit, to a wireless device, one or more messages (broadcast messages, and/or RRC messages) indicating a configuration of the one or more channels (e.g., uplink carrier, BWPs and/or subbands) that one or more PRACH are configured. A wireless device may select one of the one or more channels (e.g., BWPs, and/or subbands) as a channel (e.g., a uplink carrier, BWP, and/or a subband) to transmit at least one first preamble. The wireless device may select the channel (e.g., uplink carrier, BWP, and/or subband) based on an LBT result. For example, the wireless device performs one or more LBTs on one or more channels, and select the channel among the channel(s) being sensed as idle. The wireless device may select the one of channels being sensed as idle based on, for example, a random selection.

A wireless device may determine the transmit power of the retransmission of at least one preamble (or MsgA) based PREAMBLE_POWER_RAMPING_COUNTER. For example, the wireless device may set PREAMBLE_POWER_RAMPING_COUNTER to 1 as an random access procedure initialization. The MAC entity of the wireless device may, e.g., for each Random Access Preamble and/or for each transmission of at least one preamble transmitted after or in response to determining a random access reception being unsuccessful and/or a contention resolution being unsuccessful, increment PREAMBLE_POWER_RAMPING_COUNTER by 1. For example, The MAC entity of the wireless device may increment PREAMBLE_POWER_RAMPING_COUNTER by 1, e.g., if PREAMBLE_TRANSMISSION_COUNTER is greater than one; if the notification of suspending power ramping counter has not been received from lower layers (e.g., the notification is received in response to a preamble transmissions being dropped due to LBT failure and/or in response to a spatial filter is changed); and/or if SSB or CSI-RS selected is not changed from the selection in the last Random Access Preamble transmission. The wireless device may determine a value of DELTA_PREAMBLE based on a preamble format and/or numerology selected for the random access procedure (e.g., one or more values of DELTA_PREAMBLE are predefined associated with one or more preamble format and/or numerology. For a given preamble format and a numerology, the wireless device may select a particular value of DELTA_PREAMBLE from the one or more values). The wireless device may determine PREAMBLE_RECEIVED_TARGET_POWER to preambleReceivedTargetPower+DELTA_PREAMBLE+(PREAMBLE_POWER_RAMPING_COUNTER−1)×PREAMBLE_POWER_RAMPING_STEP. The MAC layer of the wireless device may instruct the physical layer to transmit the Random Access Preamble based on a selected PRACH occasion, corresponding RA-RNTI (e.g., if available), PREAMBLE_INDEX and/or PREAMBLE_RECEIVED_TARGET_POWER.

Unlicensed spectrum may be an effective complement to licensed spectrum for network operators to help addressing the traffic explosion in some scenarios, such as hotspot areas. For example, in an existing system (e.g., 4G, 5G, and so on), licensed assisted access (e.g., LAA) and/or new radio on unlicensed band(s) (NR-U) may provide an alternative for network operators to make use of unlicensed spectrum while managing one radio network, thus offering new possibilities for optimizing the network's efficiency.

In an example embodiment, Listen-before-talk (LBT) may be implemented for transmission in a cell configured in unlicensed band (referred to as a LAA cell and/or a NR-U cell for the sake of convenience, for example, an LAA cell and NR-U cell may be interchangeable and may refer any cell operating in unlicensed band. The cell may be operated as non-standalone with an anchor cell in a licensed band or standalone without an anchor cell in licensed band). The LBT may comprise a clear channel assessment. For example, in an LBT procedure, equipment may apply a clear channel assessment (CCA) check before using the channel. For example, the CCA comprise at least energy detection that determines the presence (e.g., channel is occupied) or absence (e.g., channel is clear) of other signals on a channel. A regulation of a country may impact on the LBT procedure. For example, European and Japanese regulations mandate the usage of LBT in the unlicensed bands, for example in 5 GHz, 6 GHz, over 30 GHz unlicensed band(s). Apart from regulatory requirements, carrier sensing via LBT may be one way for fair sharing of the unlicensed spectrum.

Various example LBT mechanisms may be implemented. In an example, for some signals, in some implementation scenarios, in some situations, and/or in some frequencies no LBT procedure may be performed by the transmitting entity. In an example, Category 1 (CAT1, e.g., no LBT) may be implemented in one or more cases. For example, a channel in unlicensed band may be hold by a first device (e.g., a base station for DL transmission), and a second device (e.g., a wireless device) takes over the for a transmission without performing the CAT1 LBT. In an example, Category 2 (CAT2, e.g. LBT without random back-off and/or one-shot LBT) may be implemented. The duration of time determining that the channel is idle may be deterministic (e.g., by a regulation). A base station may transmit an uplink grant indicating a type of LBT (e.g., CAT2 LBT) to a wireless device. CAT1 LBT and CAT2 LBT may be employed for COT sharing. For example, a base station (a wireless device) may transmit an uplink grant (resp. uplink control information) comprising a type of LBT. For example, CAT1 LBT and/or CAT2 LBT in the uplink grant (or uplink control information) may indicate, to a receiving device (e.g., a base station, and/or a wireless device) to trigger COT sharing. In an example, Category 3 (CAT3, e.g. LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (CAT4, e.g. LBT with random back-off with a contention window of variable size) may be implemented. The transmitting entity may draw a random number N within a contention window. The size of contention window may be specified by the minimum and maximum value of N. The transmitting entity may vary the size of the contention window when drawing the random number N. The random number N may be used in the LBT procedure to determine the duration of time that the channel is sensed to be idle before the transmitting entity transmits on the channel.

In an unlicensed band, a type of LBT (CAT1, CAT2, CAT3, and/or CAT4) may be configured via control messages (RRC, MAC CE, and/or DCI) per a cell. In an example, a type of LBT (CAT1, CAT2, CAT3, and/or CAT4) may be configured via control messages (RRC, MAC CE, and/or DCI) per BWP. For example, a type of LBT (CAT1, CAT2, CAT3, and/or CAT4) may be determined at least based on a numerology configured in a BWP. In this case, BWP switching may change a type of LBT.

Channel occupancy time (COT) sharing may be employed in a radio access technology (e.g., LTE and or NR). COT sharing may be a mechanism that one or more wireless devices share a channel that is sensed as idle by at least one of the one or more wireless devices. For example, one or more first devices occupy a channel an LBT (e.g., the channel is sensed as idle based on CAT4 LBT) and one or more second devices shares it using an LBT (e.g., 25 us LBT) within a maximum COT (MCOT) limit. For example, the MOCT limit may be given per priority class, logical channel priority, and/or wireless device specific. COT sharing may allow a concession for UL in unlicensed band. For example, a base station may transmit an uplink grant to a wireless device for a UL transmission. For example, a base station may occupy a channel and transmit, to one or more wireless devices a control signal indicating that the one or more wireless devices may use the channel. For example, the control signal may comprise an uplink grant and/or a particular LBT type (e.g., CAT1 LBT and/or CAT2 LBT). The one or more wireless device may determine COT sharing based at least on the uplink grant and/or the particular LBT type. The wireless device may perform UL transmission(s) with dynamic grant and/or configured grant (e.g., Type 1, Type2, autonomous UL) with a particular LBT (e.g., CAT2 LBT such as 25 us LBT) in the configured period, for example, if a COT sharing is triggered. A COT sharing may be triggered by a wireless device. For example, a wireless device performing UL transmission(s) based on a configured grant (e.g., Type 1, Type2, autonomous UL) may transmit an uplink control information indicating the COT sharing (UL-DL switching within a (M)COT). A starting time of DL transmission(s) in the COT sharing triggered by a wireless device may be indicated by one or more ways. For example, one or more parameters in the uplink control information indicate the starting time. For example, resource configuration(s) of configured grant(s) configured/activated by a base station may indicate the starting time. For example, a base station may be allowed to perform DL transmission(s) after or in response to UL transmission(s) on the configured grant (e.g., Type 1, Type 2, and/or autonomous UL). There may be a delay (e.g., at least 4 ms) between the uplink grant and the UL transmission. The delay may be predefined, semi-statically configured (via a RRC message) by a base station, and/or dynamically indicated (e.g., via an uplink grant) by a base station. The delay may not be accounted in the COT duration.

In an example, one or more DL to UL and UL to DL switching within a shared COT may be supported. Example LBT requirements to support one or more switching points, may comprise: for gap of less than a first threshold (e.g., 16 us): no-LBT may be used; for gap of above the first threshold (e.g., 16 us) but does not exceed a second threshold (e.g., 25 us): one-shot LBT may be employed; for single switching point, for the gap from DL transmission to UL transmission exceeds the second threshold (e.g., 25 us): one-shot LBT may be employed; for multiple switching points, for the gap from DL transmission to UL transmission exceeds the second threshold (e.g., 25 us), one-shot LBT may be employed.

In an example, wideband carrier with more than one channels (e.g., subbands) is supported on in an unlicensed band. In an example, there may be one active BWP in a carrier. In an example, a BWP with one or more channels may be activated. In an example, when absence of Wi-Fi cannot be guaranteed (e.g. by regulation), LBT may be performed in units of 20 MHz. In this case, there may be multiple parallel LBT procedures for this BWP. The actual transmission bandwidth may be subject to subband with LBT success, which may result in dynamic bandwidth transmission within this active wideband BWP.

A wireless device may perform LBT for accessing a channel before transmitting at least one preamble via a PRACH occasion in an unlicensed band. The wireless device may transmit the at least one preamble, for example, if the channel is free. The wireless device may postpone a transmission of the at least one preamble, for example, if the channel is busy (e.g., detected as occupied by other device(s)). A base station may reserve a time duration for the wireless device before transmitting preamble(s) to perform LBT, e.g., an LBT gap for PRACH occasion. The base station may schedule PRACH occasions after or in response to a SS/PBCH burst transmission. Scheduling PRACH occasion(s) after or in response to the SS/PBCH burst transmission may help a wireless device to avoid LBT failure for the RACH transmission(s). The wireless device may determine no interference and/or no hidden nodes after or in response to detecting SS/PBCH block. The wireless device may skip an LBT (or with performing a particular LBT, e.g., CAT2 LBT) and transmit preamble(s) via PRACH occasion(s) in response to a reception of at least one SSB. The wireless device may transmit at least one preamble without LBT (or with performing a particular LBT, e.g., CAT2 LBT), for example, if the gap between DL/UL switching point (e.g., between a SSB reception and selected PRACH occasion) is small.

A base station may share an acquired COT with a wireless device for random access procedure. The base station may allow the wireless device to multiplex PRACH resources in UL portion of a acquired COT. For example, the base station may transmit, to one or more wireless device, downlink control information (e.g., an indication) via a downlink control channel (e.g., group-common PDCCH (GC-PDCCH)) to schedule PRACH resources within the acquired COT, e.g., for connected, inactive and/or idle mode wireless device(s). In an example, the base station may transmit downlink control information via the downlink control channel (e.g., GC-PDCCH) to schedule PRACH resources after or in response to one or more SSB transmissions by the base station. In an example, the wireless device may perform one-shot (CAT2) LBT or no LBT for random access preamble (Msg 1) and Msg 3 transmission in the COT acquired by the base station, for example, the wireless device receives the indication.

A wireless device may share a COT with a base station, for example, when the wireless device acquires the COT, for example, based on CAT4 LBT. For example, the wireless device may acquire the COT for Msg 1 and/or Msg 3 transmission(s). The base station may perform one-shot (CAT2) LBT or no LBT before Msg 2 and Msg 4 transmission in the COT. For a two-step RA procedure, a wireless device may acquire the COT for MsgA (e.g., preamble(s), and/or UL data) transmission. The base station may perform one-shot (CAT2) LBT or no LBT before MsgB (e.g., RAR(s) and/or contention resolution) transmission in the COT The base station may perform an LBT and transmit a polling indication to one or more wireless devices, for example, in response to a success of the LBT. The one or more wireless devices may transmit one or more preambles with for example, one-shot (CAT2) LBT or with a high priority CAT4 LBT performed in response to receiving the polling indication. One or more PRACH occasions may follow the polling indication in the COT that a base station acquired. The wireless device may be configured to transmit a preamble (e.g., Msg 1) with a particular LBT (e.g., one-shot LBT) after or in response to receiving the polling indication from the base station. For example, a reception of the polling indication may be a reference time of one or more preamble transmissions for the one or more wireless devices. A base station may configure one or more wireless devices to transmit at least one preamble (e.g., Msg 1) without LBT or with a particular LBT after or in response to receiving the polling indication (e.g., being polled by the base station).

Figure 24:
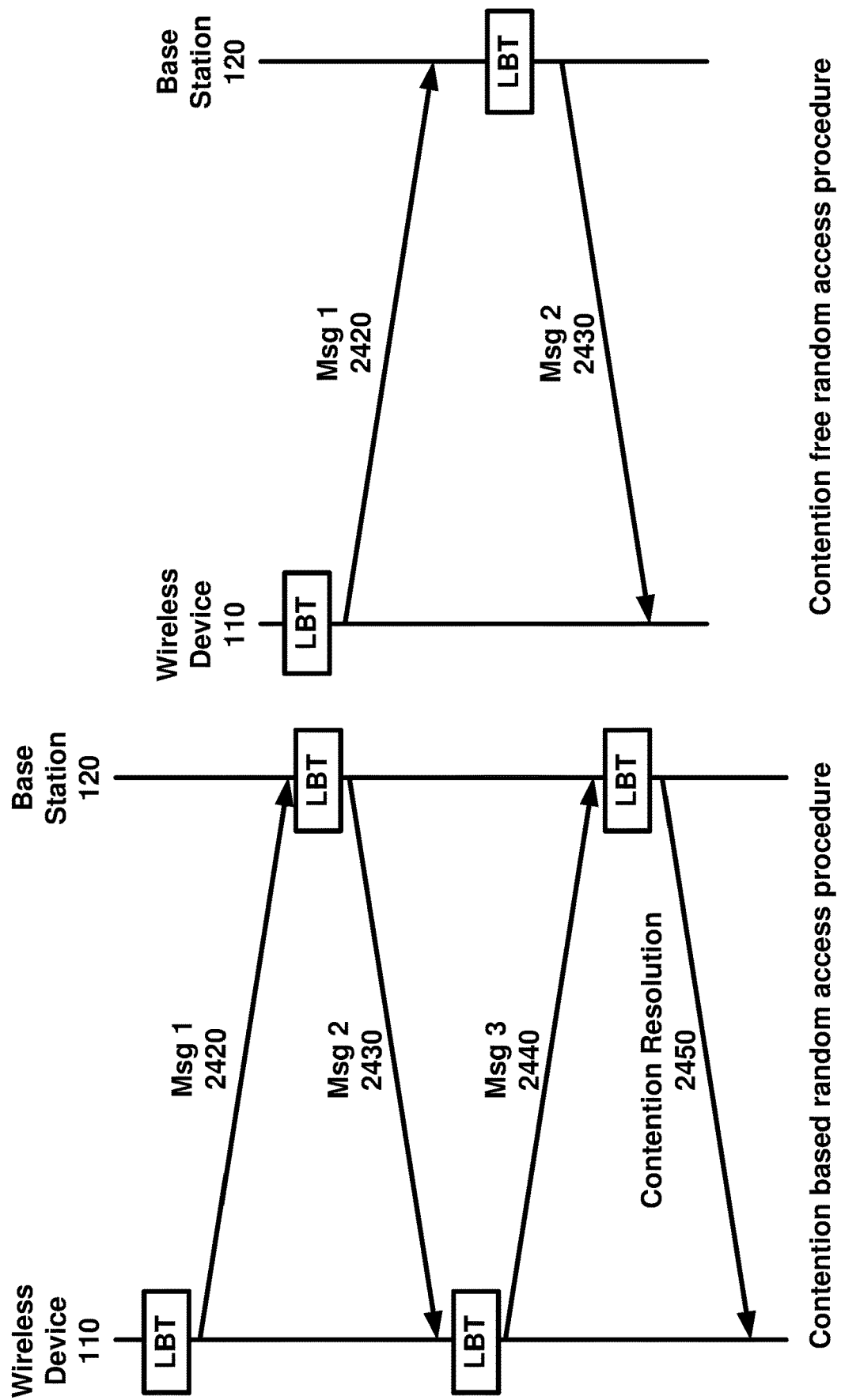
FIG. 24 is an example diagram of contention based and contention-free random access procedures with LBT as per an aspect of an embodiment of the present disclosure.

FIG. 24 is an example diagram of contention based and contention-free random access procedures with LBT. A wireless device and a base station may perform at least one LBT prior to UL and/or DL transmission and perform the UL and/or DL transmission after or in response to a UL and/or DL channel being sensed as idle. In an example, a base station does not transmit a message (e.g., Msg 2 2430 and/or contention resolution 2450) for a random access procedure, e.g., if LBT is failed prior to transmitting the message, e.g., CCA in LBT determines that a channel in unlicensed band is busy (occupied by other device). In an example, a wireless device may not transmit a message (e.g., Msg 1 2420 and/or Msg 3 2440) for a random access procedure, e.g., if LBT is failed prior to transmitting the message, e.g., CCA in LBT determines that a channel in unlicensed band is busy (occupied by other device).

Figure 25:
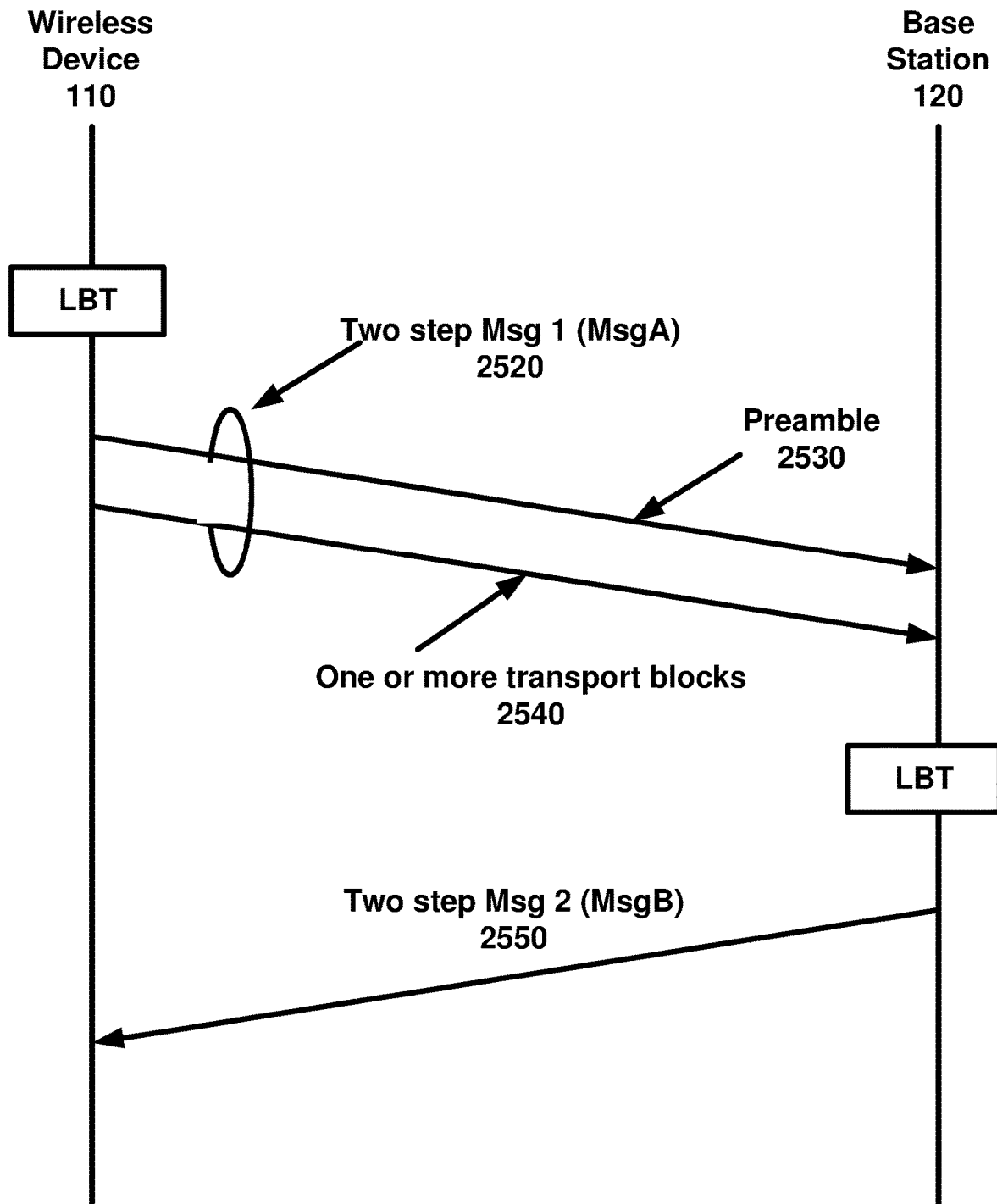
FIG. 25 is an example diagram of a two-step RA procedure with LBT as per an aspect of an embodiment of the present disclosure.

FIG. 25 is an example diagram of a two-step RA procedure with LBT. A base station and/or a wireless device may not transmit a message (e.g., two-step Msg 1 (Msg A) 2520, preamble 2530, one or more transport blocks 2540, and/or two-step Msg 2 (Msg B) 2550) for a random access procedure if LBT is failed prior to transmitting the message, e.g., CCA in LBT determines that a channel in unlicensed band is busy (occupied by other device). The transmissions of Preamble 2530 and for one or more transport blocks 2540 may have a same LBT and/or different LBTs. For example, a time gap between the transmissions of Preamble 2530 and one or more transport blocks 2540 may be small such that the wireless device may perform no LBT and/or a particular LBT (e.g., CAT 2 LBT) between the transmissions of Preamble 2530 and one or more transport blocks 2540. For example, the time gap may be predefined and/or semi-statically configured by a message transmitted by a base station.

For example, there is no time gap and/or a small time gap between a PRACH occasion and its associated PUSCH occasion. A wireless device configured with no or small time gap between the PRACH occasion and its associated PUSCH occasion may perform a first LBT before the PRACH occasion and may not perform a second LBT before the PUSCH occasion associated with the PRACH occasion. A wireless device configured with no or small time gap between the PRACH occasion and its associated PUSCH occasion may perform a first LBT (e.g., CAT 4) before the PRACH occasion and may perform a second LBT before the PUSCH occasion associated with the PRACH occasion. In this case the first LBT and the second LBT may be different. For example, the first LBT is CAT 4, and the second LBT is a short LBT (e.g., CAT 2).

Figure 26:
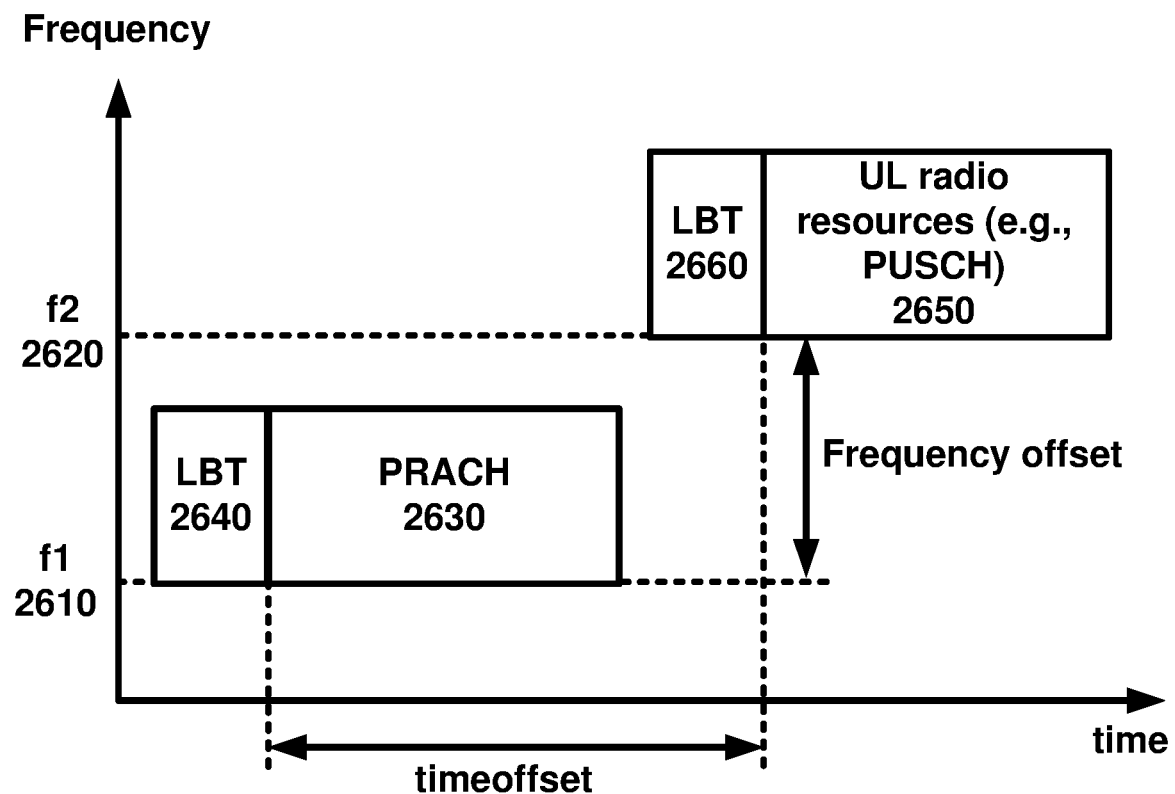
FIG. 26 is an example of radio resource allocation for a two-step RA procedure as per an aspect of an embodiment of the present disclosure.

For example, radio resources for transmissions of Preamble 2530 and one or more transport blocks 2540 may be configured in different channels (or different subbands or different BWPs or different UL carriers e.g., one in NUL and the other one in SUL) that may require separate LBTs. For example, a wireless device may perform an LBT per channel, per subband, per BWP, and/or per UL carrier. For example, a regulation may require a wireless device to perform an LBT per 20 MHz frequency band. FIG. 26 is an example of one or more LBTs performed for a two-step RA procedure. In some cases, UL radio resources 2650 may be allocated before or aligned with PRACH 2630 in time (e.g., frequency offset=0) and/or in frequency (e.g., timeoffset=0). A wireless device may perform a first LBT (e.g., LBT 2640 in FIG. 26) before a first transmission of preamble 2530 (e.g., via PRACH 2630) and perform a second LBT (e.g., LBT 2660 in FIG. 26) before a second transmission of one or more transport blocks 2540 (e.g., via UL radio resources 2650). Depending on results of the first LBT and the second LBT, a wireless device may perform none of, one of, or both of the first transmission and the second transmission.

For example, the first transmission may be performed when a first result of the first LBT is idle. The second transmission may be independent of the first result. For example, the second transmission may be performed when a second result of the second LBT is idle. In this case, there may be a case that a wireless device may transmit Preamble 2530 after or in response to the first LBT being idle and may not be able to transmit one or more transport blocks 2540 in response to the second LBT being busy. For example, a wireless device may not transmit Preamble 2530 after or in response to the first LBT being busy and may transmit one or more transport blocks 2540 after or in response to the second LBT being idle. In a two-step RA procedure, one or more transport blocks may comprise an identifier of the wireless device so that a base station may identify which wireless device transmit the one or more transport blocks. The identity may be configured by the base station and/or may be at least a portion of wireless device-specific information, e.g., resume ID, DMRS sequence/index, IMSI, etc. If a wireless device transmits one or more TBs with no Preamble 2530 (e.g., when a channel, e.g. PRACH 2630 is busy), a base station may identify the wireless device based on the identity in the one or more TBs.

In a two-step RA procedure configured in an unlicensed band, the separate LBTs for transmissions of Preamble and one or more TBs may be performed in one or more cases. For example, a base station may configure a wireless device with the separate LBTs for a wideband operation (e.g., for a case that a bandwidth may be larger than 20 MHz). In the wideband operation, a base station may configure a wireless device with a wideband comprising one or more subbands and/or one or more BWPs. Some of the one or more subbands may be overlapped to each other at least a portion in frequency domain. Some of the one or more subbands may not be overlapped to each other at least a portion in frequency domain. Some of the one or more BWPs may be overlapped to each other at least a portion in frequency domain. Some of the one or more BWPs may not be overlapped to each other at least a portion in frequency domain. In a wideband operation, if two radio resources are allocated with a space larger than a threshold (e.g., 20 MHz) in frequency domain, separate LBTs may be required for transmissions via the two radio resources. For example, a wideband may comprise one or more subbands, and two radio resources may be allocated in different subbands. In this case, a first transmission scheduled in a first subband requires a first LBT, and a second transmission scheduled in a second subband requires a second LBT. The first LBT and the second LBT may be independent of each other.

For example, UL radio resources for transmission of one or more TBs 2540 may be subject to a first LBT (e.g., LBT 2660) and be independent of a second LBT (e.g., LBT 2640) for transmission of Preamble 2530. For example, PRACH 2630 for transmission of Preamble 2530 may be subject to a second LBT (e.g., LBT 2660) and be independent of a first LBT (e.g., LBT 2660) for transmission of one or more TBs 2540. For example, if f1 2610 and f2 2620 are configured in different channels (or different subbands or different BWPs or different UL carriers), a wireless device may perform separate LBTs for a first transmission of Preamble 2530 and a second transmission of one or more transport blocks 2540.

The PRACH and/or Ul radio resources in FIG. 26 may be associated with at least one downlink reference signal (SSB, CSI-RS, DM-RS). A base station may transmit at least one control message to a wireless device to indicate such an association. If the base station transmits a plurality of downlink reference signals, a configuration of each downlink reference signal has an association with at least one PRACH, that may be configured by RRC and/or PDCCH. For each of downlink reference signals, there may be one or more of PRACHs and/or one or more UL radio resources associated with the each of downlink reference signals.

For a two-step RA procedure, a wireless device may transmit MsgA to a base station. the MsgA may comprise at least one preamble transmitted via PRACH occasion(s) and one or more TBs transmitted via PUSCH(s). The wireless device may monitor a downlink control channel for MsgB (e.g., an RAR that the base station transmits as a response to the MsgA, to the wireless device, after or in response to receiving the MsgA). The wireless device may receive a DCI (e.g., a DCI indicating downlink assignment such as DCI format 1_0 and/or DCI 1_1) via the downlink control channel within an RAR window (e.g., a duration of the RAR window starts after or in response to transmitting the MsgA). The DCI may indicate scheduling information of a PDSCH that may carry an MAC PDU. The MAC PDU may comprise at least one MAC subPDU that may comprise a subheader and a MAC RAR. The wireless device may determine that the MAC RAR is a response to the MsgA, e.g., if the subheader comprises a particular preamble identifier that is matched to the at least one preamble that the wireless device transmits via the MsgA. In this case, the MAC RAR may indicate whether the transmission of the one or more TBs is success or needs a retransmission.

Figure 27:
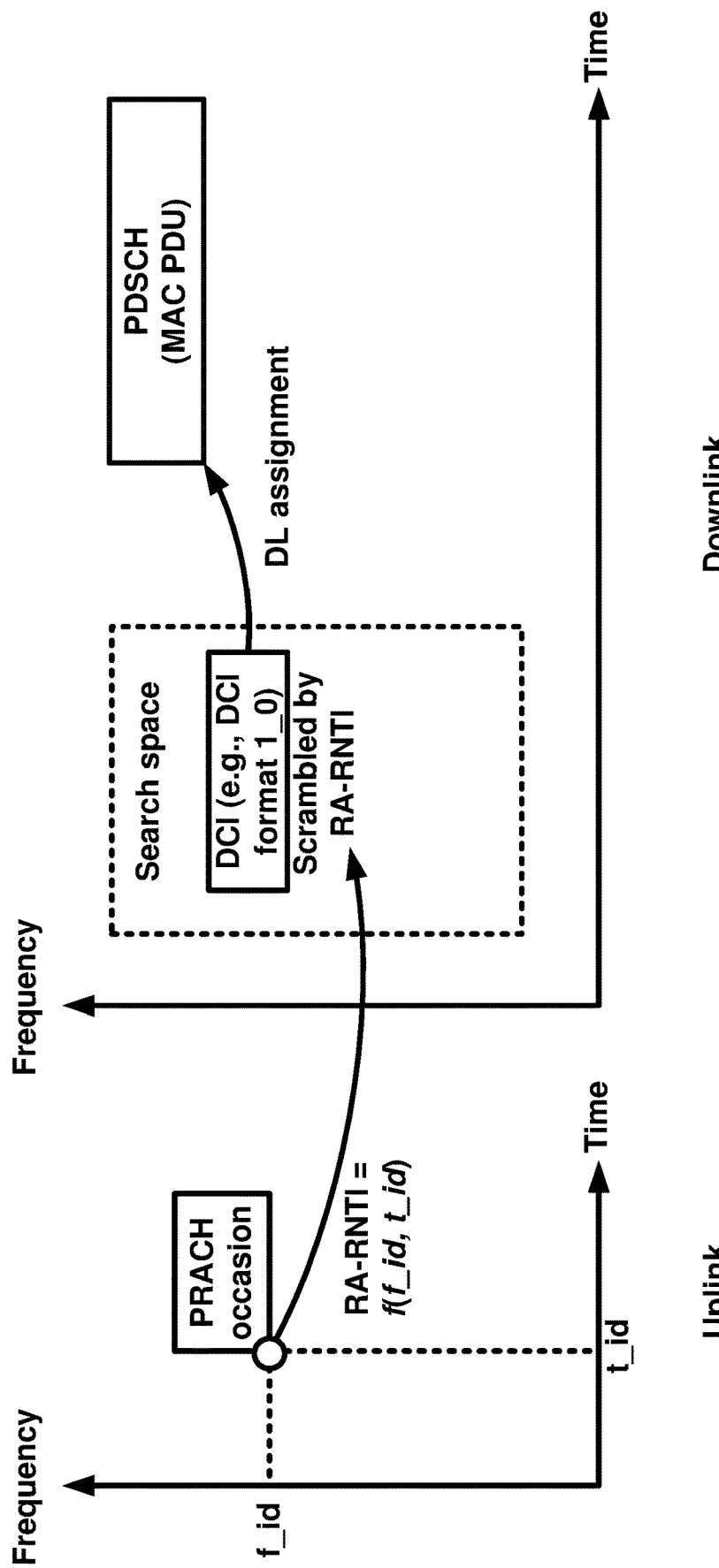
FIG. 27 is an example of MAC PDU reception procedure as per an aspect of an embodiment of the present disclosure.

FIG. 27 is an example of MAC PDU reception procedure. a wireless device may transmit, to a base station, at least one preamble via a PRACH occasion. For example, for a two-step RA procedure, the wireless device may transmit at least one preamble via a PRACH occasion and TB(s) via PUSCH. The wireless device may determine an RA-RNTI based on one or more time resource identifiers t_id of the PRACH occasion (e.g., OFDM symbol number, slot number, and/or frame number) and frequency resource identifiers f_id of the PRACH occasion. For example, the RA-RNTI may be defined as a function of t_id and f_id. The wireless device may start to monitor a downlink control channel (e.g., search space) for a DCI scrambled by the RA-RNTI during an RAR window. The RAR window may start after or in response to transmitting the at least one preamble. For example, the RAR window start from a firstly available PDCCH after or in response to transmitting the at least one preamble. The DCI may indicate a downlink assignment of a PDSCH. For example, the DCI comprises one or more fields indicating required parameters for the wireless device to receive a PDSCH. For example, the one or more fields indicate at least one of: a time domain resource assignment, a frequency domain resource assignment, modulation and coding scheme, RB-to-PRB mapping, and/or TB scaling. The wireless device may receive the PDSCH using the downlink assignment indicated by the one or more fields of the DCI. The PDSCH may comprise an MAC PDU. The MAC PDU may comprise at least one MAC subPDU that may comprise a subheader comprising a particular preamble identifier and a MAC RAR. The wireless device may determine that the MAC RAR is for the wireless device, e.g., if the particular preamble identifier is matched to the at least one preamble.

A wireless device may determine which antenna port(s) (e.g., used for receiving one or more DL transmissions from a base station) are quasi co-located to each other (e.g., quasi-colocation assumption). For example, the wireless device may determine that first antenna port(s) used for a first DL channel and/or a first DL transmission is quasi co-located with second antenna port(s) used for a second DL channel and/or a second DL transmission. The determination may be used for the wireless device to determine a receiving beam (e.g., spatial RX parameters) for downlink reception(s) and/or a transmitting beam (e.g., spatial TX parameters) for uplink transmission(s).

For example, when receiving a PDSCH scheduled with RA-RNTI, a wireless device determines that the DM-RS antenna port of the PDSCH is quasi co-located with the antenna port used for the SS/PBCH block or the CSI-RS transmission (or reception), e.g., with respect to Doppler shift, Doppler spread, average delay, delay spread, and/or spatial RX parameters. For example, when receiving a PDSCH scheduled with RA-RNTI after or in response to a random access procedure triggered by a PDCCH order which may trigger non-contention based random access procedure (e.g., for the SpCell), a wireless device may determine that the DM-RS antenna port of the PDCCH order transmission (or reception) and the DM-RS antenna port of the corresponding PDSCH scheduled based on RA-RNTI are quasi co-located with an antenna port used for the same SS/PBCH block or CSI-RS transmission (or reception), e.g., with respect to Doppler shift, Doppler spread, average delay, delay spread, and/or spatial RX parameters. When a wireless device receives PDSCH (e.g., Msg 4) after or in response to a PUSCH transmission (e.g., Msg 3) scheduled by an RAR UL grant or corresponding PUSCH retransmission, the wireless device may determine that the DM-RS antenna port of the PDSCH is quasi co-located with the antenna port used for SS/PBCH block transmission (or reception), with respect to Doppler shift, Doppler spread, average delay, delay spread, and/or spatial RX parameters.

A wireless device may receive a control message (e.g., DCI, MAC CE, and/or RRC) that schedules the wireless device to receive PDSCH comprising an MAC RAR. The control message may comprise a field indicating a time domain resource allocation of the PDSCH. For example, a DCI scheduling the PDSCH for the wireless device may comprise a time domain resource assignment field value. The time domain resource assignment field value may indicate one of row index of a table (or list). For example, a DCI scheduling the PDSCH for the wireless device may comprise a time domain resource assignment field value m. The time domain resource assignment field value m may indicate a row index m+1 (or a row index m) to a table (or list). The table (or list) may be predefined and/or semi-statically configured to the wireless device. There may be one or more tables (or lists) predefined and/or semi-statically configured to a wireless device. The wireless device may determine to which table (or list) among the one or more tables (or lists) the wireless device maps the time domain resource assignment field value. The indexed row in the selected table (or list) by the wireless device may define (or indicate or determine) the slot offset K0, the start symbol S, the allocation length L (e.g., the start symbol and the allocation length may be indicated by a start and length indicator, SLIV), and/or the PDSCH mapping type that are used for the wireless device to determine the PDSCH reception. For example, if a wireless device receives a message indicating (or configuring) one of the one or more tables (or lists), the message comprises parameters indicating a PDSCH time domain resource allocation table comprising one or more row indexes. Each of one or more row indexes may comprise a slot offset K0, a start symbol S, an allocation length L (e.g., the start symbol and the allocation length may be indicated by a start and length indicator, SLIV), and/or a PDSCH mapping type.

Example Default A table (e.g., PDSCH time domain resource allocation A for normal CP) is as below:

| Row index | dmrs-TypeA-Position | PDSCH mapping type | $K_0$ | S | L |
|---|---|---|---|---|---|
| 1 | 2 | Type A | 0 | 1 | 12 |
|   | 3 | Type A | 0 | 3 | 11 |
| 2 | 2 | Type A | 0 | 2 | 10 |
|   | 3 | Type A | 0 | 3 | 9 |
| 3 | 2 | Type A | 0 | 2 | 9 |
|   | 3 | Type A | 0 | 3 | 8 |
| 4 | 2 | Type A | 0 | 2 | 7 |
|   | 3 | Type A | 0 | 3 | 6 |
| 5 | 2 | Type A | 0 | 2 | 5 |
|   | 3 | Type A | 0 | 3 | 4 |
| 6 | 2 | Type B | 0 | 9 | 4 |
|   | 3 | Type B | 0 | 10 | 4 |
| 7 | 2 | Type B | 0 | 4 | 4 |
|   | 3 | Type B | 0 | 6 | 4 |
| 8 | 2, 3 | Type B | 0 | 5 | 7 |
| 9 | 2, 3 | Type B | 0 | 5 | 2 |
| 10 | 2, 3 | Type B | 0 | 9 | 2 |
| 11 | 2, 3 | Type B | 0 | 12 | 2 |
| 12 | 2, 3 | Type A | 0 | 1 | 13 |
| 13 | 2, 3 | Type A | 0 | 1 | 6 |
| 14 | 2, 3 | Type A | 0 | 2 | 4 |
| 15 | 2, 3 | Type B | 0 | 4 | 7 |
| 16 | 2, 3 | Type B | 0 | 8 | 4 |

Example Default A table (e.g., PDSCH time domain resource allocation A for extended CP) is as below:

| Row index | dmrs-TypeA-Position | PDSCH mapping type | $K_0$ | S | L |
|---|---|---|---|---|---|
| 1 | 2 | Type A | 0 | 2 | 6 |
|   | 3 | Type A | 0 | 3 | 5 |
| 2 | 2 | Type A | 0 | 2 | 10 |
|   | 3 | Type A | 0 | 3 | 9 |
| 3 | 2 | Type A | 0 | 2 | 9 |
|   | 3 | Type A | 0 | 3 | 8 |
| 4 | 2 | Type A | 0 | 2 | 7 |
|   | 3 | Type A | 0 | 3 | 6 |
| 5 | 2 | Type A | 0 | 2 | 5 |
|   | 3 | Type A | 0 | 3 | 4 |
| 6 | 2 | Type B | 0 | 6 | 4 |
|   | 3 | Type B | 0 | 8 | 2 |
| 7 | 2 | Type B | 0 | 4 | 4 |
|   | 3 | Type B | 0 | 6 | 4 |
| 8 | 2, 3 | Type B | 0 | 5 | 6 |
| 9 | 2, 3 | Type B | 0 | 5 | 2 |
| 10 | 2, 3 | Type B | 0 | 9 | 2 |
| 11 | 2, 3 | Type B | 0 | 10 | 2 |
| 12 | 2, 3 | Type A | 0 | 1 | 11 |
| 13 | 2, 3 | Type A | 0 | 1 | 6 |
| 14 | 2, 3 | Type A | 0 | 2 | 4 |
| 15 | 2, 3 | Type B | 0 | 4 | 6 |
| 16 | 2, 3 | Type B | 0 | 8 | 4 |

Example Default B table (e.g., PDSCH time domain resource allocation B) is as below:

| Row index | dmrs-TypeA-Position | PDSCH mapping type | $K_0$ | S | L |
|---|---|---|---|---|---|
| 1 | 2, 3 | Type B | 0 | 2 | 2 |
| 2 | 2, 3 | Type B | 0 | 4 | 2 |
| 3 | 2, 3 | Type B | 0 | 6 | 2 |
| 4 | 2, 3 | Type B | 0 | 8 | 2 |
| 5 | 2, 3 | Type B | 0 | 10 | 2 |
| 6 | 2, 3 | Type B | 1 | 2 | 2 |
| 7 | 2, 3 | Type B | 1 | 4 | 2 |
| 8 | 2, 3 | Type B | 0 | 2 | 4 |
| 9 | 2, 3 | Type B | 0 | 4 | 4 |
| 10 | 2, 3 | Type B | 0 | 6 | 4 |
| 11 | 2, 3 | Type B | 0 | 8 | 4 |
| 12 | 2, 3 | Type B | 0 | 10 | 4 |
| 13 | 2, 3 | Type B | 0 | 2 | 7 |
| 14 | 2 | Type A | 0 | 2 | 12 |
|   | 3 | Type A | 0 | 3 | 11 |
| 15 | 2, 3 | Type B | 1 | 2 | 4 |
| 16 |   | Reserved |   |   |   |

Example Default C table (e.g., PDSCH time domain resource allocation C) is as below:

| Row index | dmrs-TypeA-Position | PDSCH mapping type | $K_0$ | S | L |
|---|---|---|---|---|---|
| 1 (Note 1) | 2, 3 | Type B | 0 | 2 | 2 |
| 2 | 2, 3 | Type B | 0 | 4 | 2 |
| 3 | 2, 3 | Type B | 0 | 6 | 2 |
| 4 | 2, 3 | Type B | 0 | 8 | 2 |
| 5 | 2, 3 | Type B | 0 | 10 | 2 |
| 6 |   | Reserved |   |   |   |
| 7 |   | Reserved |   |   |   |
| 8 | 2, 3 | Type B | 0 | 2 | 4 |
| 9 | 2, 3 | Type B | 0 | 4 | 4 |
| 10 | 2, 3 | Type B | 0 | 6 | 4 |
| 11 | 2, 3 | Type B | 0 | 8 | 4 |
| 12 | 2, 3 | Type B | 0 | 10 | 4 |
| 13 | 2, 3 | Type B | 0 | 2 | 7 |
| 14 | 2 | Type A | 0 | 2 | 12 |
|   | 3 | Type A | 0 | 3 | 11 |
| 15 | 2, 3 | Type A | 0 | 0 | 6 |
| 16 | 2, 3 | Type A | 0 | 2 | 6 |

There may be one or more determination (e.g., selection) rules which table (or list) among one or more tables (or lists) to be used for the PDSCH reception. An table below is an example determination (e.g., selection rules). Among the one or more tables (or lists), at least one of the one or more tables (or lists) may be predefined. For example, Default A, Default B, and Default C in the example table that are referred below are predefined, e.g., as shown in the above example Default A table, Default B table, and/or Default C table. A wireless device may receive, from a base station, message(s) to semi-statically configure one or more tables (or lists). For example, at least one of the one or more tables may be configured to the wireless device by transmitting, from the base station, wireless device specific message(s). For example, in the example determination (e.g., selection rules) shown as a table below, pdsch-TimeDomainAllocationList in pdsch-ConfigCommon is a table (or list) configured to one or more wireless devices as cell configuration parameter(s). For example, in the example determination (e.g., selection rules) shown as a table below, pdsch-TimeDomainAllocationList in pdsch-Config is a table (or list) configured to a particular wireless device as wireless device specific configuration parameter(s). The wireless device may select at least one table (or list) from one or more tables (and/or lists) depending on one or more factors. For example, a wireless device may, based on at least an RNTI (e.g., used for receiving a DCI scheduling PDSCH) determine at least one table (or list) from one or more tables (and/or lists). The wireless device may determine the at least one table (or list) based on at least a priority. For example, in the example table below, pdsch-TimeDomainAllocationList in pdsch-Config has a higher priority than pdsch-TimeDomainAllocationList in pdsch-ConfigCommon. pdsch-TimeDomainAllocationList in pdsch-ConfigCommon may have a higher priority than a predefined table (or list), Default A, Default B, and/or Default C. For example, a wireless device may select one of predefined tables (such as Default A, Default B, and/or Default C), e.g., if pdsch-TimeDomainAllocationList in pdsch-Config and pdsch-TimeDomainAllocationList in pdsch-ConfigCommon are not configured. For example, a wireless device may select pdsch-TimeDomainAllocationList in pdsch-ConfigCommon, e.g., if pdsch-TimeDomainAllocationList in pdsch-Config is not configured and pdsch-TimeDomainAllocationList in pdsch-ConfigCommon is configured. This may be because that pdsch-TimeDomainAllocationList in pdsch-ConfigCommon and predefined tables are available, and pdsch-TimeDomainAllocationList in pdsch-ConfigCommon has a higher priority than a predefined table (or list) such as Default A, Default B, and/or Default C when pdsch-TimeDomainAllocationList in pdsch-Config is not configured and pdsch-TimeDomainAllocationList in pdsch-ConfigCommon is configured. For example, a wireless device may select pdsch-TimeDomainAllocationList in pdsch-Config, e.g., if pdsch-TimeDomainAllocationList in pdsch-Config and pdsch-TimeDomainAllocationList in pdsch-ConfigCommon are configured. A wireless device may, based on an RNTI (e.g., used for receiving a DCI scheduling PDSCH) determine at least one table (or list) from one or more tables (and/or lists). For example, based on the example determination (e.g., selection rules) shown as a table below, the wireless device may not be configured with pdsch-TimeDomainAllocationList in pdsch-Config and/or may not use pdsch-TimeDomainAllocationList in pdsch-Config, e.g., if the wireless device determines PDSCH scheduled by a DCI scrambled by RA-RNTI. The wireless device may select pdsch-TimeDomainAllocationList in pdsch-ConfigCommon, e.g., if pdsch-TimeDomainAllocationList in pdsch-ConfigCommon is configured. The wireless device may select a predefined table (e.g., Default A), e.g., if pdsch-TimeDomainAllocationList in pdsch-ConfigCommon is not configured. An example determination (e.g., selection rules) is shown as a table below. For example, Yes/No in the example determination (e.g., selection rules) may indicate whether a wireless device receives (or is configured with) a corresponding configuration. For example, '–' in the example determination (e.g., selection rules) may indicate N/A or may indicate that a wireless device may determine a table without using the corresponding configuration. For example, a wireless device may determine PDSCH time domain resource allocation scheduled based on RA-RNTI (e.g., PDSCH of Msg 2) or scheduled based on TC-RNTI (e.g., PDSCH of Msg 4). Based on the example determination (or selection rules) shown as a table below, the wireless device may determine Default A if the wireless device does not receive pdsch-TimeDomainAllocationList in pdsch-ConfigCommon, while the wireless device may determine pdsch-TimeDomainAllocationList if the wireless device receives pdsch-TimeDomainAllocationList in pdsch-ConfigCommon.

| RNTI | SS/PBCH block and CORESET multiplexing pattern | pdsch-ConfigCommon comprises pdsch-TimeDomainAllocationList | pdsch-Config comprises pdsch-TimeDomainAllocationList | PDSCH time domain resource allocation to apply |
|---|---|---|---|---|
| SI-RNTI | 1 | — | — | Default A for normal CP |
|  | 2 | — | — | Default B |
|  | 3 | — | — | Default C |
| SI-RNTI | 1 | No | — | Default A |
|  | 2 | No | — | Default B |
|  | 3 | No | — | Default C |
|  | 1, 2, 3 | Yes | — | pdsch-TimeDomainAllocationList provided in pdsch-ConfigCommon |
| RA-RNTI, TC-RNTI | 1, 2, 3 | No | — | Default A |
|  | 1, 2, 3 | Yes | — | pdsch-TimeDomainAllocationList provided in pdsch-ConfigCommon |
| P-RNTI | 1 | No | — | Default A |
|  | 2 | No | — | Default B |
|  | 3 | No | — | Default C |
|  | 1, 2, 3 | Yes | — | pdsch-TimeDomainAllocationList provided in pdsch-ConfigCommon |

-continued

| RNTI | SS/PBCH block and CORESET multiplexing pattern | pdsch-ConfigCommon comprises pdsch-TimeDomainAllocationList | pdsch-Config comprises pdsch-TimeDomainAllocationList | PDSCH time domain resource allocation to apply |
|---|---|---|---|---|
| C-RNTI, MCS-C-RNTI, CS-RNTI | 1, 2, 3 | No | — | Default A |
| | 1, 2, 3 | Yes | — | pdsch-TimeDomainAllocationList provided in pdsch-ConfigCommon |
| C-RNTI, MCS-C-RNTI, CS-RNTI | 1, 2, 3 | No | No | Default A |
| | 1, 2, 3 | Yes | No | pdsch-TimeDomainAllocationList provided in pdsch-ConfigCommon |
| | 1, 2, 3 | No/Yes | Yes | pdsch-TimeDomainAllocationList provided in pdsch-Config |

For example, a DCI, received by a wireless device for scheduling PDSCH may comprise a time domain resource assignment field value indicating a row index to a selected table (or list). The row index in the selected table (or list) by the wireless device may define (or indicate or determine) a slot offset K0, a start symbol S, and an allocation length L, and the PDSCH mapping type. The wireless device may determine PDSCH time domain resource allocation based on the slot offset K0, the start symbol S, and the allocation length L. For example, the slot offset K0 may indicate in which slot the PDSCH is allocated (or transmitted). For example, the start symbol S indicates the PDSCH starts from which symbol in the slot determined based on the slot offset K0. For example, the allocation length L indicates a length of PDSCH that starts from an symbol indicated based on the start symbol S in a slot indicated based on the slot offset K0. For example, a predefined table, e.g., Default A, Default B, and/or Default C, may indicate the start symbol S and the allocation length L. For example, PDSCH-TimeDomainResourceAllocationList may indicate the start symbol S and the allocation length L by the start and length indicator SLIV (e.g., startSymbolAndLength field).

For example, PDSCH-TimeDomainResourceAllocationList may comprise one or more PDSCH-TimeDomainResourceAllocations. Each of PDSCH-TimeDomainResourceAllocations in PDSCH-TimeDomainResourceAllocationsList may indicate at least one of a slot offset K0, a start and length indicator SLIV, and/or a PDSCH mapping type. A base station may indicate in the DL assignment which of the configured time domain allocations a wireless device may apply for that DL assignment. The wireless device may determine a bit width of a DCI field, indicating a PDSCH-TimeDomainResourceAllocation, based on a number of entries in the PDSCH-TimeDomainResourceAllocationList. Value 0 in the DCI field refers to the first element PDSCH-TimeDomainResourceAllocation in the list PDSCH-TimeDomainResourceAllocationList, value 1 in the DCI field refers to the second element in the list, and so on. An example of PDSCH-TimeDomainResourceAllocationList fields are as follows:

```
PDSCH-TimeDomainResourceAllocationList information element
-- ASN1START
-- TAG-PDSCH-TIMEDOMAINRESOURCEALLOCATIONLIST-
START
PDSCH-TimeDomianResourceAllocationList ::=
SEQUENCE (SIZE(1..maxNrofDL-
Allocations)) OF PDSCH-TimeDomainResourceAllocation
PDSCH-TimeDomianResourceAllocation ::= SEQUENCE {
  K0                    INTEGER(0..32)    OPTIONAL, -- Need S
  mappingType           ENUMERATED {typeA, typeB},
  startSymbolAndLength  INTEGER (0..127)
}
-- TAG-PDSCH-TIMEDOMAINRESOURCEALLOCATIONLIST-STOP
-- ASN1STOP
```

For example, K0 indicates a slot offset between a first slot where a wireless device receives a DCI and a second slot where PDSCH is scheduled by the DCI. The wireless device may determine the slot offset value as 0, e.g., if the K0 field is absent. For example, a mappingType field indicates PDSCH mapping type of scheduled PDSCH. For example, a startSymbolAndLength (or SLIV) field indicates an index (e.g., or a value of start and length indicator SLIV) indicating valid combination(s) of (jointly encoded) start symbol S and length L as. A base station may configure the startSymbolAndLength field so that the allocation does not cross a slot boundary.

A wireless device may determine (or identify) a valid PDSCH allocation based on an SLIV field. For example, there are one or more start symbol S and length L combinations that are predefined and/or semi-statically configured. The wireless device may determine the start symbol S and length L based on the SLIV value and the one or more start symbol S and length L combinations. For example, valid S and L combinations are as follows (e.g., The PDSCH mapping type is set to Type A or Type B according to RRC parameter such as mappingType in PDSCH-TimeDomainResourceAllocation):

| PDSCH mapping type | Normal cyclic prefix | | | Extended cyclic prefix | | |
|---|---|---|---|---|---|---|
| | S | L | S + L | S | L | S + L |
| Type A | {0, 1, 2, 3} | {3, . . . ,14} | {3, . . . ,14} | {0, 1, 2, 3} | {3, . . . ,12} | {3, . . . ,12} |
| Type B | {0, . . . ,12} | {2, 4, 7} | {2, . . . ,14} | {0, . . . ,10} | {2, 4, 6} | {2, . . . ,12} |

The SLIV received by a wireless device may be determined differently depending on the length L. For example, if (L−1)≤7 then SLIV=14·(L−1)+S, else SLIV=14·(14−L+1)+(14−1−S), where 0<L≤14−S. For example, a wireless device may determine S=1 and L=7, e.g., if the SLIV configured by PDSCH-TimeDomainResourceAllocation is 85 and PDSCH mapping type is Type A since S=1 and L=7 are a valid combination with SLIV=85.

For example, given the parameter values of the indexed row indicated by a time domain resource assignment field in a DCI, a slot allocated for a PDSCH, scheduled by the DCI, is determined based on a slot n (e.g., where a wireless device receives the DCI) and slot offset K0. For example, K0=0 may indicate that the PDSCH is scheduled slot n, and K0=1 may indicate that the PDSCH is scheduled slot n+1 and so on. The slot allocated for the PDSCH may depend on a numerology. For example, the slot offset K0 is based on the numerology of PDSCH. For example, as an example determination, the slot allocated for the PDSCH is $$\left\lfloor n \cdot \frac{2^{\mu PDSCH}}{2^{\mu PDCCH}} \right\rfloor + K0,$$

where n is the slot where a wireless device receives the DCI, and K0 is the slot offset determined based on the numerology of PDSCH, $\mu_{PDSCH}$ is the subcarrier spacing configuration (e.g., numerology indicator) of PDSCH (e.g., scheduled by the DCI), and $\mu_{PDCCH}$ is the subcarrier spacing configuration (e.g., numerology indicator) of PDCCH (e.g., where the wireless device receives the DCI). The starting symbol S relative to the start of the slot, and the number of consecutive symbols L counting from the symbol S allocated for the PDSCH may be determined from the start and length indicator SLIV.

Figure 28:
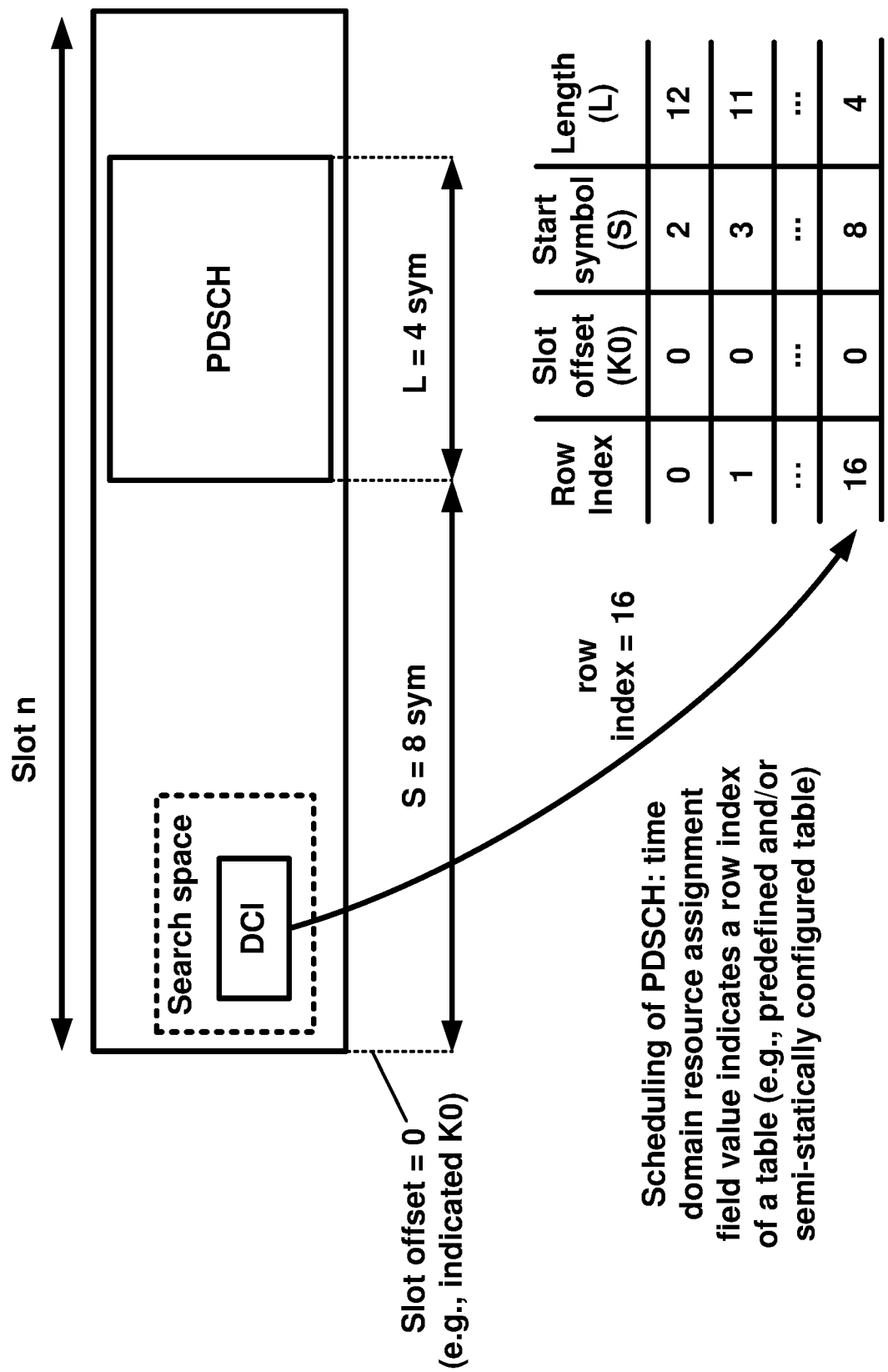
FIG. 28 is an example of time domain resource assignment field as per an aspect of an embodiment of the present disclosure.

FIG. 28 is an example of time domain resource assignment field. For example, a wireless device receives an DCI, in a slot n, that schedules a PDSCH. The DCI may comprise a time domain resource assignment filed indicating a slot offset K0, a start symbol S, and/or a length L of the PDSCH scheduled by the DCI. For example, in FIG. 28, a time domain resource assignment field value is 16. The value 16 may indicate values of a slot offset K0, a start symbol S, and/or a length L in the 16$^{th}$ row of an allocation table. The wireless device may select the allocation table among one or more predefined table and/or one or more semi-statically configured tables (e.g., one or more example allocation table selection rule are in this specification). For example, in FIG. 28, the 16$^{th}$ row index in the selected allocation table indicates K0=0, S=8, and L=4. For example, the selected allocation table may indicate an SLIV value, and the wireless device may determine S and L values based on the indicated SLIV value and valid S and L combinations predefined and/or semi-statically configured. The K0=0 may indicate that the PDSCH is scheduled in a slot with a slot offset 0 from the slot where the wireless device receives the DCI scheduling the PDSCH. For example, K0=0 indicates that the PDSCH is scheduled in a same slot where the wireless device receives the DCI. S=8 may indicate that the PDSCH start from the 8$^{th}$ OFDM symbol in the slot (e.g., slot n+slot offset K0, which is slot n in this example) determined based on the K0=0. L=4 may indicate that the length of the PDSCH is 4 OFDM symbols.

Figure 21:
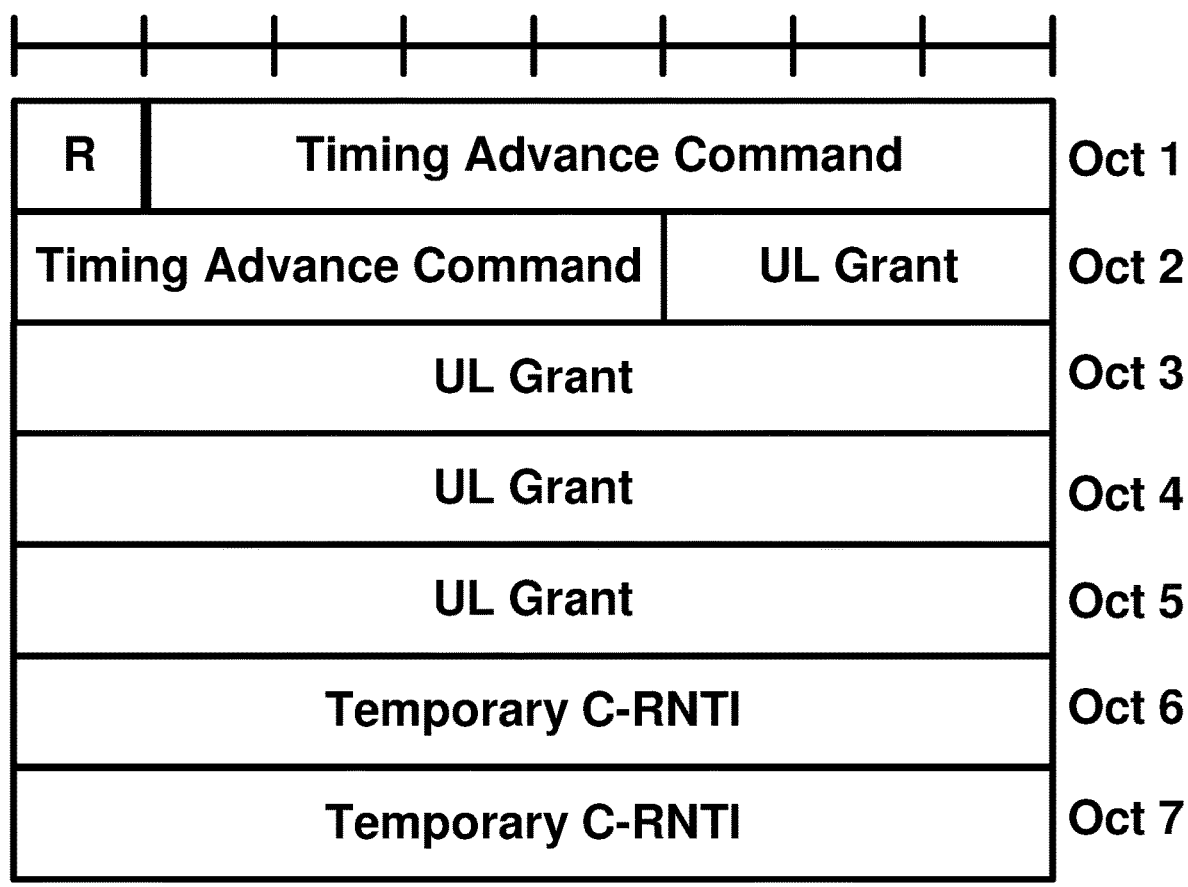
FIG. 21 is an example MAC RAR formats as per an aspect of an embodiment of the present disclosure.

For a two-step RA procedure, a wireless device that transmits, to a base station, MsgA comprising a preamble and/or TB(s) (e.g., payload) may receive, from the base station, a DCI via a control channel. The DCI may be scrambled based on an RA-RNTI. The DCI may indicate a DL assignment of a PDSCH. Based on the DL assignment, the wireless device may receive, via the PDSCH, an MAC PDU comprising at least one MAC subPDU (e.g., MsgB). The at least one MAC subPDU may comprise a subheader comprising a preamble identifier indicating the preamble of the MsgA and an MAC RAR (e.g., MsgB, the MAC subPDU and/or the MAC RAR may be referred to as MsgB in this specification). The response to the MsgA may be split into a first response, an MAC RAR (e.g., MsgB) and a second response that the wireless device receives separately. The MAC RAR (e.g., MsgB) may comprise a DL assignment indicating resources for a second PDSCH. The wireless device may receive the second response via the second PDSCH. For example, the wireless device may determine whether a contention resolution is successful based on one or more fields in the second PDSCH. For example, the MAC PDU received via the PDSCH may have a limited size. For example, if a wireless device transmits an MsgA comprising an RRC message (e.g., CCCH SDU) such as an RRC setup request or an RRC resume request, a corresponding response (e.g., MsgB) to the MsgA may comprise a CCCH SDU (e.g., an RRC setup message) or a DCCH SDU (e.g., an RRC resume message). A size of the response to the RRC message may be large. For example, there may be not enough space for the base station to construct/assemble the MAC PDU that comprises one or more MAC SDUs (e.g., an RRC setup message or an RRC resume message) for different wireless device into one MAC PDU. For example, the base station transmits, to the wireless device, the MAC RAR with the DL assignment for flexible resource allocation. A content of the MAC RAR (e.g., MsgB) may be different, e.g., depending on whether the TB(s) (e.g., payload) in MsgA is successfully decoded by a base station. For example, the MAC RAR (e.g., MsgB) may indicate a UL grant for retransmission of the TB(s), e.g., if the TB(s) (e.g., payload) in MsgA is not successfully decoded by a base station. For example, the MAC RAR (e.g., MsgB) may indicate a DL assignment for scheduling the second PDSCH, e.g., if the TB(s) (e.g., payload) in MsgA is successfully decoded by a base station. In the MAC RAR and/or associated subheader, there may be an indicator, e.g., using R field in FIG. 21, FIG. 22, FIG. 23A, and/or FIG. 23B, based on which the wireless device may determine whether the MAC RAR indicate the UL grant or the DL assignment.

Figure 29:
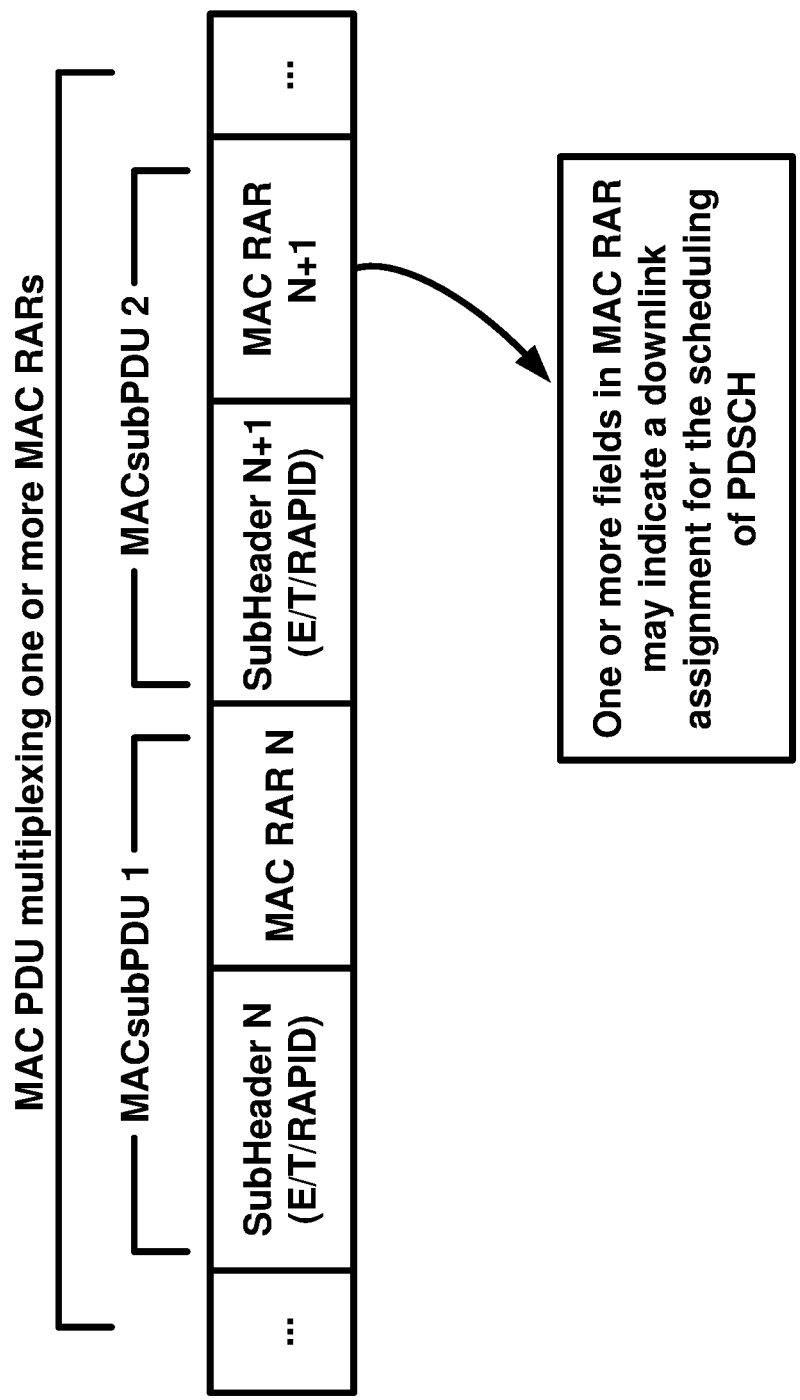
FIG. 29 is an example of an MAC PDU as per an aspect of an embodiment of the present disclosure.

FIG. 29 is an example of an MAC PDU. The MAC PDU may comprise one or more MAC subPDUs. Each of the one or more MAC subPDUs may comprise a subheader and an MAC RAR. The subheader may comprise an RAPID field indicating a particular preamble identifier. The wireless device may identify a MACsubPDU N+1 is a response of an MsgA that the wireless device transmitted, e.g., if an RAPID filed value indicates a preamble of the Msg A. The MAC RAR N+1 in the MAC subPDU2 may comprise a DL assignment for scheduling a PDSCH. The wireless device may receive the PDSCH using one or more fields values (e.g., time domain resource assignment field, frequency domain resource allocation field, TB size indicator, etc.) of the DL assignment. The wireless device that transmits the MsgA and receives the MAC RAR as a corresponding response to the MsgA may, based on the DL assignment, receive a second response to the MsgA (e.g., a rest of part of a response to the MsgA).

During a two-step RA procedure, a wireless device may transmit, to a base station, an MsgA comprising at least one preamble and one or more TBs. The wireless device may receive, from the base station, an MAC RAR. The wireless device may receive the MAC RAR using a first downlink assignment (e.g., PDSCH resources) indicated by a DCI (e.g., the wireless device receives the DCI via a PDCCH). The MAC RAR may indicate a second downlink assignment of a PDSCH. The wireless device may receive, from the base station and based on the second downlink resources, one or more TBs via the PDSCH.

A problem may arise depending on in which symbol in a slot the wireless device receives a random access response (e.g., an MAC RAR). For example, the wireless device may receive the random access response (e.g., an MAC RAR) via one or more symbols in the end of a first slot. As a result, the number of symbols remaining in the first slot may be zero or insufficient for the base station to schedule a DL transmission of one or more downlink transport blocks (e.g., a second response to an MsgA). The base station may schedule the DL transmission such that the wireless device receives the one or more transport blocks in a second slot that is different from the first slot. However, based on existing system(s), the base station may not be able to schedule the DL transmission of the one or more downlink transport blocks in the second slot. This may be because the allocation table used by existing system(s) is limited to same-slot downlink assignments (e.g., allocation table with a slot offset of zero (K0=0)).

There may be a need of a mechanism to indicate PDSCH scheduling in a different slot flexibly. Example embodiments in the present application are example techniques for using a time offset to determine a location in the time domain for receiving one or more downlink transport blocks. Employment of the time offset may be based on a determination that the wireless device is performing the two-step random access procedure. In some implementations, the wireless device may obtain the time offset from a new allocation table that is not limited to same-slot downlink assignments (i.e., an allocation table where K0≥0). The new allocation table may be defined at least a particular type of RA procedure (e.g., two-step RA procedure). Additionally or alternatively, the wireless device may use the existing allocation table and add the time offset to the location indicated by the existing allocation table. The time offset may be a predetermined number of symbols or slots (e.g., equal to a one-slot slot offset where k0=k0+1) or indicated to the wireless device (e.g., provided in the random access response and/or broadcast/wireless specific RRC message).

Figure 30A:
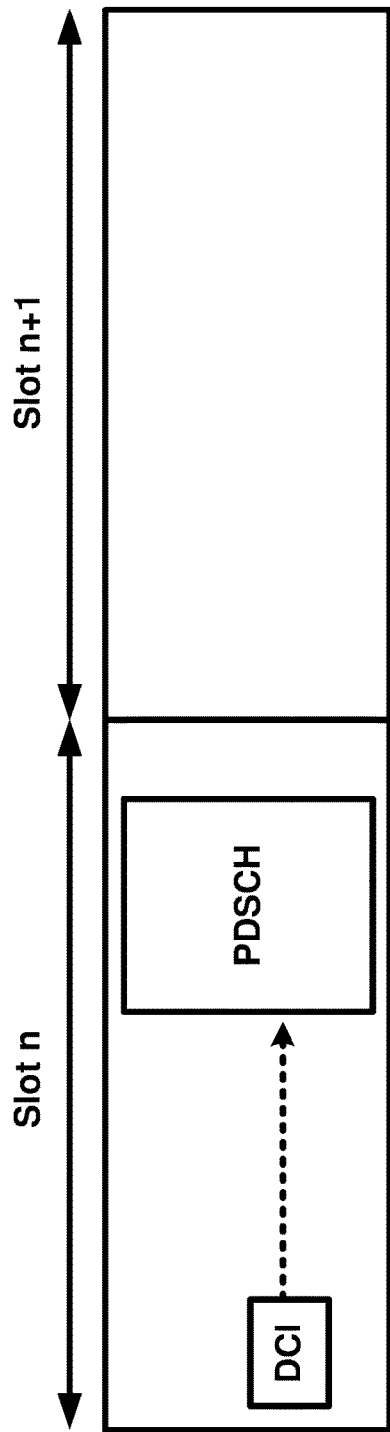
FIG. 30A and FIG. 30B are example of PDSCH scheduling as per an aspect of an embodiment of the present disclosure.
Figure 30B:
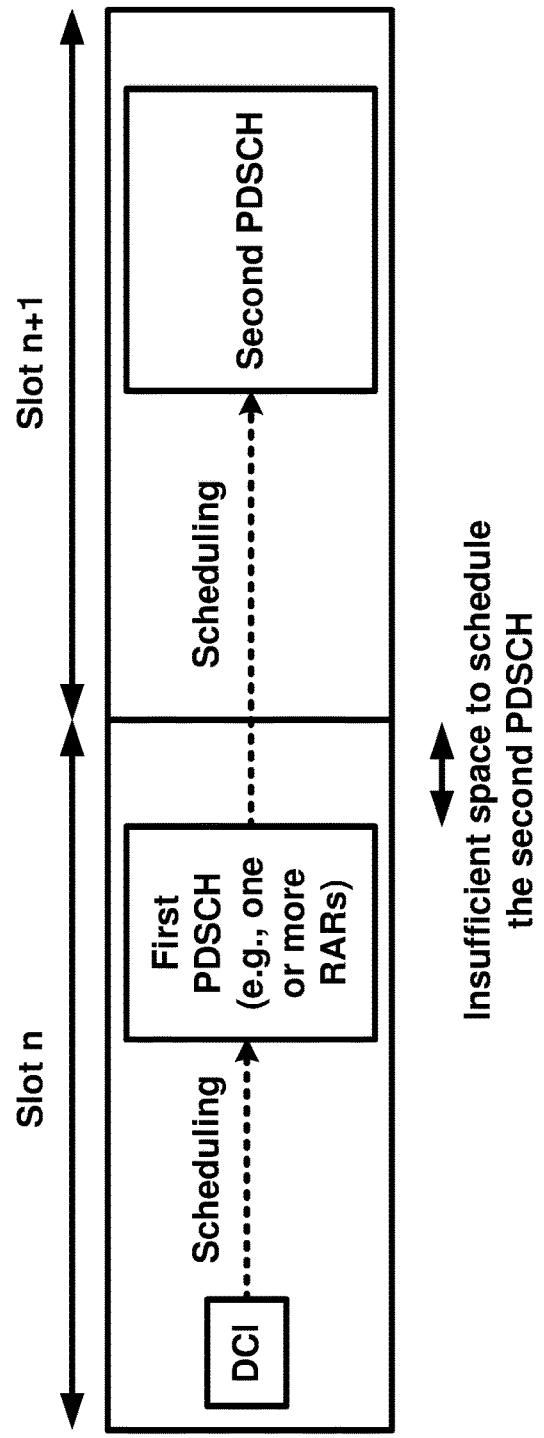

FIG. 30A and FIG. 30B are examples of PDSCH scheduling. In an existing system, as shown in FIG. 30A, a DCI may comprise a DL assignment for scheduling a PDSCH. The DCI and the PDSCH may be scheduled in a same slot (e.g., slot n). The same slot scheduling may be beneficial for a base station (and/or a wireless device) to transmit (and/or to receive respectively) a delay sensitive data. The existing allocation table, e.g., Default A, may not define K0>0, e.g., scheduling a PDSCH in a different slot (e.g., slot n+1). The existing allocation table, e.g., Default A, used for a RA procedure (e.g., two step RA procedure) may not define K0>0, e.g., scheduling a PDSCH in a different slot (e.g., slot n+1). The existing allocation table, e.g., Default A, used for a particular RNTI (e.g., RA-RNTI and/or TC-RNTI) may not define K0>0, e.g., scheduling a PDSCH in a different slot (e.g., slot n+1). FIG. 30B is an example of PDSCH scheduling by a DL assignment of PDSCH. For example, a DCI that a wireless device receives via a downlink control channel indicates a DL assignment of a first PDSCH. The first PDSCH that the wireless device receives using the DL assignment may comprise an MAC RAR for the wireless device. The MAC RAR may indicate a second DL assignment for scheduling a second PDSCH. The wireless device may receive the second PDSCH using the second DL assignment. As shown in FIG. 30B, for a base station, there may be not enough resources after the first PDSCH in slot n to schedule the second PDSCH. There is a need for the base station to schedule the second PDSCH in a different slot (e.g., slot n+x, where x>0). For example, depending on downlink traffic condition and/or a size of the second PDSCH, there may be resources for the base station to schedule the second PDSCH in slot n. The base station (e.g., network/system) may need technique(s)/mechanism(s) that flexibly adjust scheduling of the second PDSCH by the first PDSCH, e.g., in terms of a slot offset K0 and/or a start symbol S.

In an example embodiment, a wireless device may determine a slot, where a PDSCH is scheduled, based on a slot offset K0 and a time offset. The time offset may be defined in terms of slot(s) and/or OFDM symbol(s). The time offset may be predefined. The time offset may be semi-statically configured by a broadcast and/or wireless device specific message (e.g., RRC message). The wireless device may apply the time offset for determining a time resource of scheduling the PDSCH, e.g., for one or more cases. For example, the wireless device applies the time offset for determining a time resource of scheduling the PDSCH, e.g., if a predefined allocation table, e.g., Default A, is selected as the allocation table. For example, the wireless device does not apply the time offset for determining a time resource of scheduling the PDSCH, e.g., if a semi-statically configured allocation table, e.g., pdsch-TimeDomainAllocationList, is selected as the allocation table. For example, a value of the time offset may be defined per numerology. For example, there may be one or more values of the time offset, e.g., value=x for μ=0, value=y for μ=1, and so on. The wireless device may select one of the one or more values based on a numerology of the PDSCH, e.g., $\mu_{PDSCH}$. The wireless device may reuse an existing allocation table. For example, defining and/or configuring the time offset benefits a base station to flexibly schedule one or more downlink transmissions. For a reception of a second PDSCH that follows after a first PDSCH (e.g., the second PDSCH scheduled by a DL assignment of an MAC RAR of the first PDSCH), a wireless device may buffer (e.g., be forced to buffer) the second PDSCH, e.g., across a channel bandwidth. This reception and buffering may be a waste of energy, e.g., if the wireless device, after decoding the first PDSCH, determines that the second PDSCH is not scheduled. Using an existing allocation table (e.g., that may not define K0>1) with the time offset may benefit the wireless device to reduce a battery power consumption, e.g., by determining when to stop and/or start buffering the second PDSCH. For example, the wireless device may determine that the second PDSCH is intended for the wireless device, e.g., before starting buffering and may determine when to start buffering the second PDSCH. For example, the wireless device may stop buffering the second PDSCH and power down the receiver, e.g., if the data is not intended for the UE. For example, the wireless device may not start buffering the second PDSCH and power down the receiver at least during a remaining time duration (e.g., time duration between after (e.g., an end of) the first PDSCH before (e.g., an end of) a slot where the first PDSCH is received) of a slot where the first PDSCH is received e.g., if the time offset is larger than or equal to one.

Figure 31:
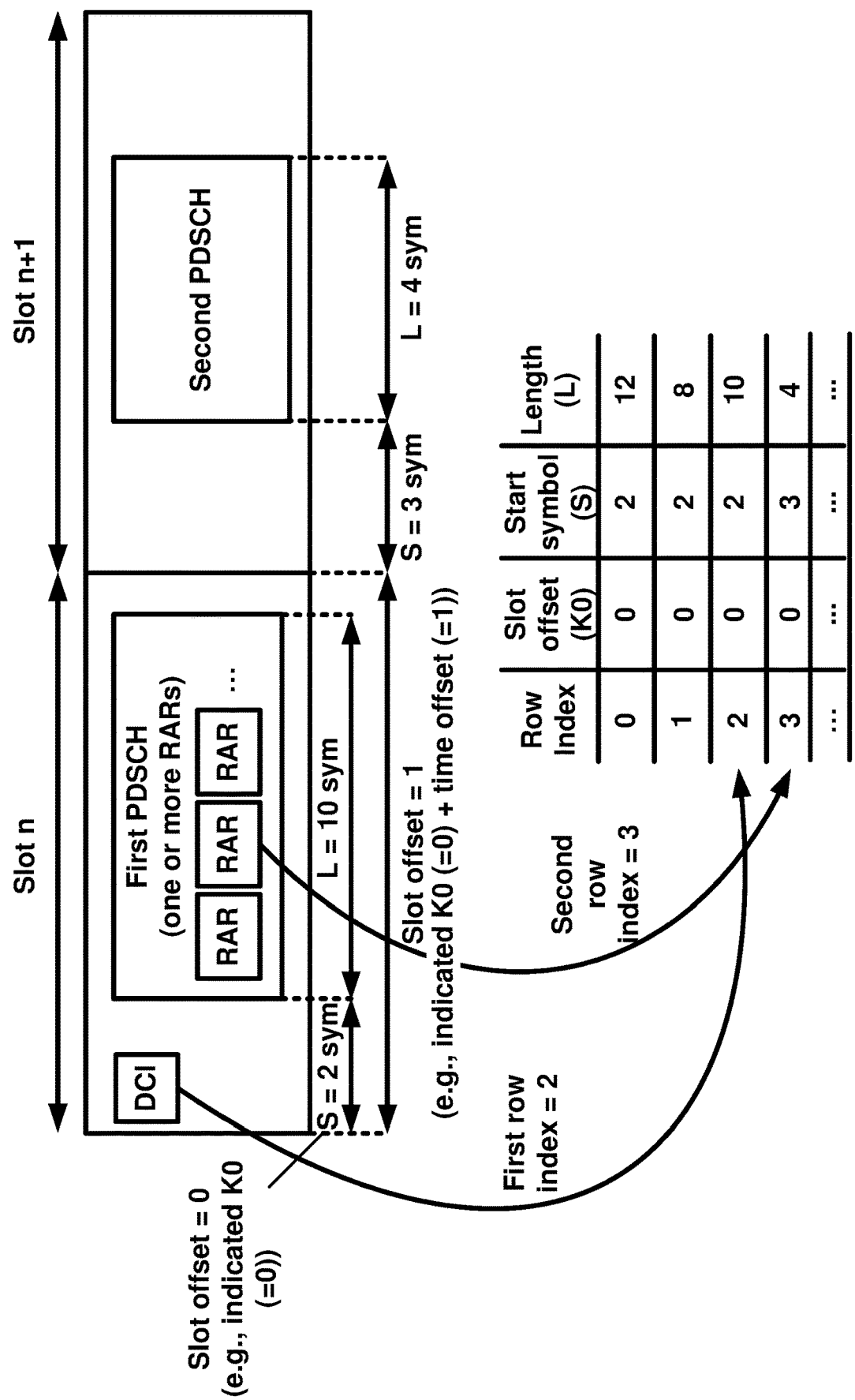
FIG. 31 is an example of PDSCH scheduling as per an aspect of an embodiment of the present disclosure.

FIG. 31 is an example of PDSCH scheduling. A wireless device may transmit, to a base station, a MsgA comprising a preamble and TB(s). The wireless device may monitor a downlink control channel for an MAC RAR after or in response to transmitting the MsgA. The wireless device may receive, via the downlink control channel, a DCI indicating scheduling information for receiving a first PDSCH. For example, the DCI may comprise a time domain resource assignment field value and a frequency domain resource assignment field value. The time domain resource assignment field value and the frequency domain resource assignment field value may indicate time and frequency resource allocation of the first PDSCH. The time domain resource assignment field value may indicate a first row index of a first allocation table. For example, the first row index of the first allocation table determines a slot offset, a start symbol, and a length of the PDSCH scheduled. FIG. 31 shows an example that the first row index value (e.g., row index=2) indicates K0=0, S=2, and L=10, based on which the wireless device may receive a first PDSCH with a length of 10 OFDM symbols from a second OFDM symbol (e.g., S=2) in a slot n (e.g., n=n+K0, where K0=0). The first PDSCH may comprise one or more MAC RARs. The wireless device may determine (or identify) an MAC RAR corresponding to the MsgA at least based on an RAPID filed in a subheader associated with the MAC RAR. For example, the subheader associated with the MAC RAR may comprise an RAPID matched to the preamble of the MsgA. The MAC RAR may comprise a DL assignment indicating scheduling of a second PDSCH. The DL assignment may comprise a time domain resource assignment that may indicate a second row index of a second allocation table. The first allocation table and the second allocation table may be the same. The first allocation table and the second allocation table may be different. The first allocation table and the second allocation table may be the same or different, e.g., depending on the selecting rules of an allocation table among one or more allocation tables (e.g., predefined and/or semi-statically configured). The wireless device may determine in which slot the second PDSCH is scheduled based on a slot offset K0, start symbol S, and length L indicated by the second row index and a time offset predefined and/or semi-statically configured. FIG. 31 is an example that the second row index value (e.g., row index=3) indicates K0=0, S=3, and L=4. The time offset is predefined or semi-statically configured to one, based on which the wireless device determine the reception timing (e.g., buffering) of the second PDSCH as shown in FIG. 31.

Figure 32:
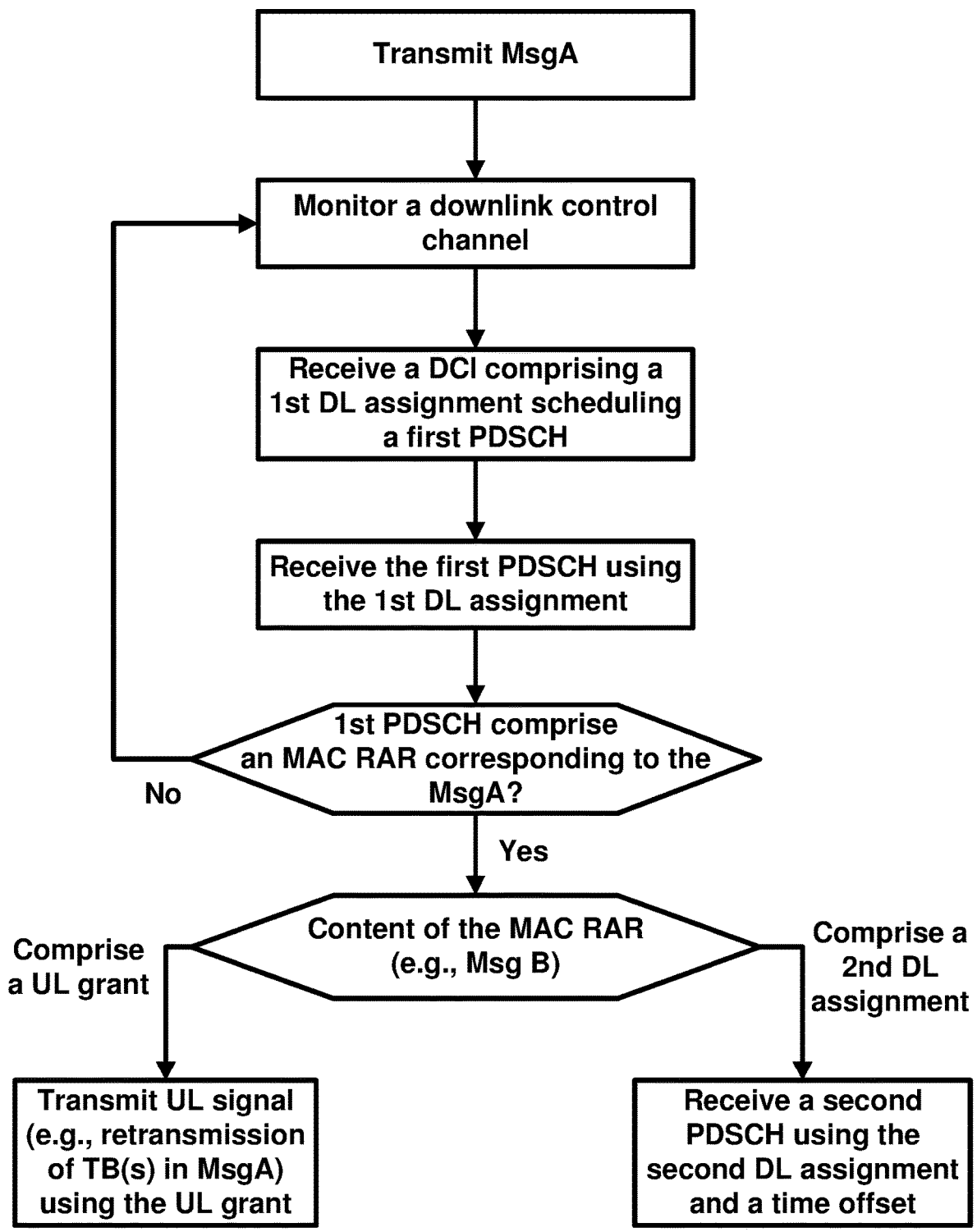
FIG. 32 is an example flow diagram as per an aspect of an embodiment of the present disclosure.

FIG. 32 is an example flow diagram for a wireless device. The wireless device may initiate an RA procedure (e.g., two-step RA procedure). The wireless device may transmit an MsgA comprising a preamble and/or TBs (e.g., comprising a contention resolution identifier). The wireless device may monitor a downlink control channel with an RA-RNTI for a DCI scheduling a first PDSCH comprising one or more MAC RARs. The wireless device may receive the DCI via the downlink control channel. The DCI may indicate a first DL assignment for the first PDSCH. The wireless device may receive, based on the first DL assignment, the first PDSCH comprising one or more MAC RARs. The wireless device may determine whether at least one MAC RAR of the one or more MAC RARs corresponds to the MsgA. For example, the at least one MAC RAR of the one or more MAC RARs corresponds to the MsgA, e.g., if an subheader of the at least one MAC RAR may comprise an RAPID field value indicating the preamble of the MsgA. If none of the one or more MAC RARs is for the MsgA, the wireless device may keep monitoring the downlink control channel during a RAR window (e.g., that may start after or in response to transmitting the MsgA). The wireless device may receive the first PDSCH comprising an MAC RAR corresponding to the MsgA. The MAC RAR may comprise an UL grant and/or a second DL assignment. The wireless device may transmit an UL signal (e.g., retransmission of the TB(s) with the same or different RV) using the UL grant, e.g., if the MAC RAR comprise the UL grant. The wireless device may receive a second PDSCH using the second DL assignment and a time offset (e.g., predefined or semi-statically configured), e.g., if the MAC RAR comprise the second DL assignment of the second PDSCH. For example, the time offset may indicate a slot where the wireless device receive the second PDSCH. For example, the wireless device determines the slot based on the time offset and a slot offset indicated by the second DL assignment. For example, the second PDSCH may comprise a second contention resolution identifier. The wireless device may determine the RA procedure successful, e.g., if the second contention resolution identifier is matched to the contention resolution identifier that the wireless device transmitted via the MsgA.

In an example, a wireless device may receive, from a base station, random access configuration parameters indicating at least one random access channel and at least one uplink channel. The wireless device may transmit, to the base station: a preamble via the at least one random access channel; and/or one or more transport blocks via the at least one uplink channel. The wireless device may receive a random access response comprising: a preamble identifier of the preamble; and/or a time domain resource assignment indicating a slot offset. The wireless device may determine a downlink resource based on: a slot number of a slot in which the random access response is received; the slot offset; and/or a time offset. The wireless device may receive one or more downlink transport blocks via the downlink resource. The wireless device may transmit, to a base station via a uplink control channel, a response corresponding to the one or more downlink transport blocks. For example, the random access configuration is for a two-step random access procedure. For example, the wireless device may receive one or more downlink reference signals. The wireless device may select at least one downlink reference signal among the one or more downlink reference signals. For example, the random access configuration parameters further indicate that the at least one downlink reference signal is associated with the at least one random access channel and the at least one uplink channel. For example, the at least one random access channel and the at least one uplink channel may be multiplexed in time domain. For example, the wireless device may determine a random access identifier based on: one or more first time and frequency resource indices of the at least one random access channel; and/or one or more second time and frequency resource indices of the at least one uplink channel. The wireless device may receive, via a downlink control channel, a downlink control information indicating a downlink assignment of the random access response, wherein the downlink control information is scrambled by the random access identifier. The wireless device may determine the slot in which the random access response is received based on the downlink assignment. For example, the random access response comprises one or more medium access control sub-packet data units, wherein one of the one or more medium access control sub-packet data units comprises: a first subheader comprising the preamble identifier; and/or a medium access control random access response comprising the time domain resource assignment. For example, the medium access control random access response may further comprise at least one of: a frequency domain resource assignment of the downlink resource; a modulation and coding scheme of the one or more downlink transport blocks; a transport block scaling of the one or more downlink transport blocks; and/or a resource block mapping of the one or more downlink transport blocks. For example, the time domain resource assignment further indicating a starting symbol and a length of the one or more downlink transport blocks. For example, the downlink resource starts, in the second slot, from the starting symbol relative to the start of the second slot. For example, the one or more transport blocks comprise a contention resolution identifier. For example, the contention resolution identifier is a wireless device identifier assigned by the base station. For example, the contention resolution identifier is a identifier that the wireless device generates. For example, the one or more downlink transport blocks comprise the contention resolution identifier. For example, the wireless device may flush a buffer used for transmission of the one or more transport blocks in response to receiving the one or more downlink transport blocks comprising the contention resolution identifier. For example, a value of the time offset is predefined and/or semi-statically configured. For example, the value of the time offset is selected, based on a first numerology, from one or more values, each of the one or more values is associated with at least one numerology, wherein the first number of is a numerology used for a channel that the wireless device receives the a random access response. For example, the second slot is determined further based on the first numerology and a second numerology of the downlink control channel. For example, the second slot is determined further based on a ratio of the first numerology and the second numerology.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

FIG. 33 is a flow diagram as per an aspect of an example embodiment of the present disclosure. At 3310, a wireless device may transmit a first message. The first message may comprise a preamble; and a transport block. At 3320, the wireless device may receive downlink control information. The downlink control information may indicate a first slot offset in an allocation table and a first start symbol number in the allocation table. At 3330, the wireless device may receive, via a first slot determined based on the first slot offset and the first start symbol number, a first response of the first message. According to an example embodiment, the first response may indicate a second slot offset in the allocation table and a second start symbol number in the allocation table. At 3340, the wireless device may determine, for receiving a second response of the first message, a second slot based on the second slot offset starting with respect to the first slot and a time offset for the second response. The wireless device may receive the second response from a start symbol of the second slot According to an example embodiment, the start symbol may be determined based on the second start symbol number.

According to an example embodiment, the wireless device may transmit the first message for a two-step random access procedure. According to an example embodiment, the allocation table may be predefined for a two-step random access procedure. According to an example embodiment, the first message may be an MsgA. According to an example embodiment, the downlink control information may indicate a first row of the allocation table, the first row indicating the first slot offset and the first start symbol number. According to an example embodiment, the first response may indicate a second row of the allocation table. According to an example embodiment, the second row may indicate the second slot offset and the second start symbol number. According to an example embodiment, the time offset may be defined based on at least one of one or more symbols and one or more slots. According to an example embodiment, the time offset may be predefined or semi-statically configured. According to an example embodiment, the wireless device may determine, based on a first numerology used for receiving the first response, at least one of one or more values as the time offset. According to an example embodiment, the at least one of the one or more values may be associated with the first numerology. According to an example embodiment, the wireless device may receive random access configuration parameters for a two-step random access procedure. According to an example embodiment, the random access configuration parameters may indicate at least one random access channel for a transmission of the preamble and at least one uplink channel for a transmission of the transport block. According to an example embodiment, the wireless device may determine, based on one or more time and frequency resource indices of the at least one random access channel, a random access identifier used for receiving the downlink control information. According to an example embodiment, the transport block may comprise a contention resolution identifier of the wireless device. According to an example embodiment, the first response may comprise the contention resolution identifier. According to an example embodiment, the wireless device may determine, based on the first response comprising at least one of a preamble identifier of the preamble and the contention resolution identifier, that the first response is for the first message.

In an example embodiment, a wireless device may determine slot(s), where a first PDSCH and/or a second PDSCH are scheduled in FIG. 30B, based on a slot offset K0 using one or more allocation tables. For example, the wireless device may select an allocation table among the one or more allocation tables, e.g., depending on a type of RA procedure. For example, there may be a plurality of allocation tables used for a RA procedure. For example, there may be a plurality of allocation tables used for an RA-RNTI and/or TC-RNTI. For example, the wireless device may use an allocation table A to determine the slot offset K0 for a four-step RA procedure. For example, the wireless device may use an allocation table B to determine the slot offset K0 for a two-step RA procedure. For a two-step RA procedure, the wireless device may use a first allocation table to determine a first slot offset for a first PDSCH that is scheduled by a DCI and use a second allocation table (e.g., that is different from the first allocation table) to determine a second slot offset for a second PDSCH that is scheduled by an MAC RAR of the first PDSCH. For example, if an MAC RAR schedules a second PDSCH, the wireless device may use an allocation table dedicated for a second downlink assignment indicated by an MAC RAR scheduling a second PDSCH). For example, the allocation table dedicated for the second downlink assignment may be a predefined allocation table, and/or a semi-statically configured table. The second allocation table may comprise at least one row index defining a different slot allocation (e.g., K0>0). The second allocation table for a case that an MAC RAR scheduling a PDSCH may be beneficial for a base station to flexibly schedule the second PDSCH. An example determination of the allocation table may be as below (e.g., Default D may be predefined and/or semi-statically configured)

| RNTI | PDCCH search space | SS/PBCH block and CORESET multiplexing pattern | pdsch-ConfigCommon includes pdsch-TimeDomainAllocationList | pdsch-Config includes pdsch-TimeDomainAllocationList | PDSCH time domain resource allocation to apply |
|---|---|---|---|---|---|
| SI-RNTI | Type0 common | 1 | — | — | Default A for normal CP |
|  |  | 2 | — | — | Default B |
|  |  | 3 | — | — | Default C |
| RA-RNTI, TC-RNTI | Type1 common | 1, 2, 3 | No | — | Default A (for four-step RACH) Default D (for two-step RACH) |
|  |  | 1, 2, 3 | Yes | — | pdsch-TimeDomainAllocationList provided in pdsch-ConfigCommon |

Figure 34:
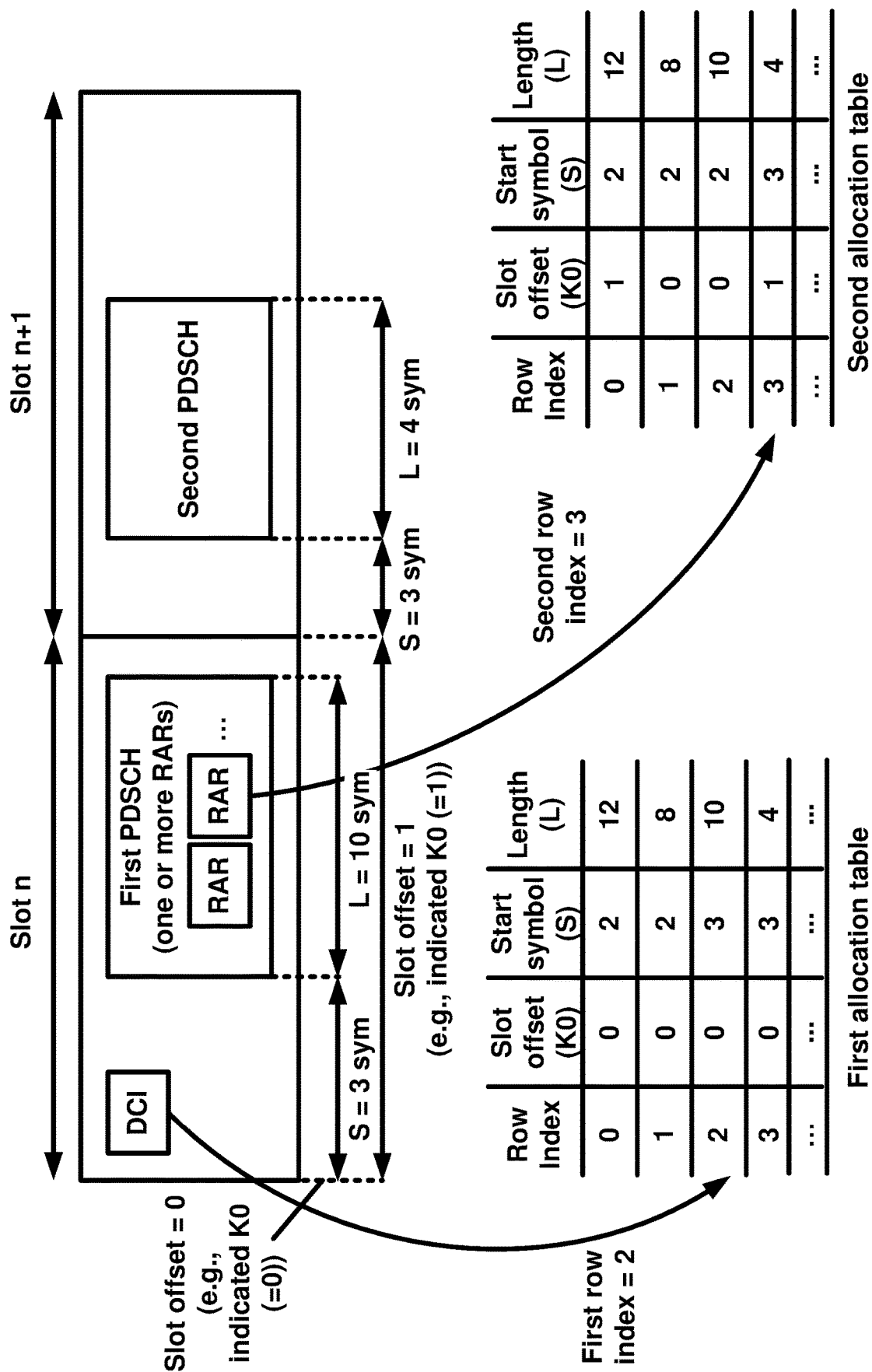
FIG. 34 is an example of PDSCH scheduling as per an aspect of an embodiment of the present disclosure.

FIG. 34 is an example of one or more PDSCH scheduling. A wireless device may perform a two-step RA procedure. The wireless device may transmit, to a base station, MsgA comprising at least one preamble and/or TB(s). The wireless device may monitor a downlink control channel for a DCI scheduling a first PDSCH comprising one or more MAC RARs after or in response to transmitting the MsgA. The wireless device may receive, via the downlink control channel, the DCI in slot n. The DCI may comprise a first time domain resource assignment indicating a first row index of an first allocation table. For example, in FIG. 34, the first row index indicated by the DCI is 2 that defines K0=0, S=3, and L=10 in the first allocation table. The wireless device may determine when to receive the first PDSCH based on the first time domain resource assignment. For example, K0=0, S=3, and L=10 may indicate that the first PDSCH of length 10 OFDM symbols (e.g., L=10) is scheduled from the $3^{rd}$ OFDM symbol (e.g., S=3) in a slot n (e.g., n=n+K0, where K0=0). The wireless device may receive the first PDSCH based on K0=0, S=3, and L=10. The first PDSCH may comprise an MAC RAR, a response to the MsgA. For example, a subheader associated with the MAC RAR in the MAC PDU comprises an RAPID indicating the at least one preamble of the MsgA. The MAC RAR may comprise a second DL assignment indicating scheduling of a second PDSCH. The second DL assignment may comprise a second time domain resource assignment indicating a second row index of a second allocation table. For example, the first allocation table and the second allocation table may be the same. For example, the first allocation table and the second allocation table may be different. There may be one or more allocation table selecting (e.g., determination) rules based on which the wireless device selects the second allocation table different form the first allocation table or not. For example, the second allocation table may comprise at least one slot offset K0>0. For example, in FIG. 34, the second row index indicated by the MAC RAR is 3 that defines K0=1, S=3, and L=4 in the second allocation table. The wireless device may determine when to receive the second PDSCH based on the second time domain resource assignment. For example, K0=1, S=3, and L=4 may indicate that the second PDSCH of length 4 OFDM symbols is scheduled from the $3^{rd}$ OFDM symbol in a slot n+1. The wireless device may receive the second PDSCH based on K0=1, S=3, and L=4. The second PDSCH may comprise a contention resolution identifier. The wireless device may determine that the two-step RA procedure successfully completes, e.g., if the contention resolution identifier is matched to one that the wireless device transmitted, to the base station, via the TB(s).

In an example, a wireless device may receive, from a base station, random access configuration parameters indicating at least one random access channel and at least one uplink channel. The wireless device may transmit to the base station a preamble via the at least one random access channel for a random access procedure. The wireless device may determine an allocation table based on whether the random access procedure is a four-step random access procedure or a two-step random access procedure. The wireless device may receive a message and/or signal comprising a downlink assignment indicating a slot offset value among one or more slot offset values of the allocation table. The wireless device may determine a downlink resource based on the slot offset. The wireless device may receive one or more downlink transport blocks via the downlink resource. For example, the downlink control information is received via a control channel in response to the random access procedure being the four-step random access procedure. For example, the downlink control information is indicated by an MAC RAR in response to the random access procedure being the two-step random access procedure. For example, the wireless device may receive a second downlink control information via a second control channel, wherein the second downlink control information indicates a second downlink assignment of a PDSCH comprising the MAC RAR. For example, a second slot offset indicated by the second downlink assignment is determined based on the allocation table. For example, a second slot offset indicated by the second downlink assignment is determined based on a second allocation table different from the allocation table. For example, the allocation table comprises one or more slot offset values, each of the one or more slot offset values is identified by a particular identifier. For example, the allocation table is predefined. For example, the allocation table is semi-statically configured.

In an example embodiment, a base station may configure an allocation table semi-statically for a two-step RA procedure. For example, wireless device may expect to receive pdsch-TimeDomainAllocationList from the base station via RRC message (e.g., broadcast and/or wireless device specific message). For example, a network or system (e.g., a base station) guarantee to configure a wireless device with an allocation table semi-statically for a two-step RA procedure. For example, pdsch-TimeDomainAllocationList may be located in pdsch-ConfigCommon, and/or pdsch-Config. For example, pdsch-TimeDomainAllocationList may be located in a RACH configuration, e.g., RACH-ConfigGeneric, RACH-ConfigCommon, and/or RACH-ConfigDedicated. For example, if pdsch-TimeDomainAllocationList may be located in a RACH configuration and in other configuration (e.g., pdsch-config and/or pdsch-configcommon), the wireless device may use pdsch-TimeDomainAllocationList in a RACH configuration for the two-step RA procedure. The received pdsch-TimeDomainAllocationList may comprise at least one pdsch-TimeDomainAllocation indicating K0>0. For example, the wireless device that receives an MAC RAR indicating a DL assignment. The DL assignment may indicate one of the at least one pdsch-TimeDomainAllocation indicating K0>0.

In an example, a base station may determine to configure: first random access configuration parameters for a first cell; and second random access configuration parameters for a second cell. The base station may transmit, to at least one second wireless device, a second message comprising the second random access configuration parameters, wherein the second random access configuration parameters comprises at least one PDSCH time domain allocation in response to the second random access configuration parameters are for a two-step random access procedure. The base station may receive TB(s) that a wireless device, one of the at least one second wireless device, transmitted based on the second random access configuration parameters as a part of the two-step random access procedure, wherein the TB(s) indicate a contention resolution identifier. The base station may determine a slot offset based on one of the at least one PDSCH time domain allocation. The base station may transmit, to the wireless device, a random access response comprising a DL assignment indicating the slot offset. The base station may transmit, to the wireless device, a second PDSCH via downlink resource indicated by the DL assignment in a slot determined based on the slot offset, wherein the second PDSCH indicates the contention resolution identifier. For example, the first cell and the second cell are the same. For example, the allocation table is predefined. For example, the allocation table is semi-statically configured. In an example, the base station may transmit, to at least one first wireless device, a first message comprising the first random access configuration parameters, wherein the first random access configuration parameters do not comprise a PDSCH time domain allocation in response to the first random access configuration parameters are for a four-step random access procedure.

Figure 35:
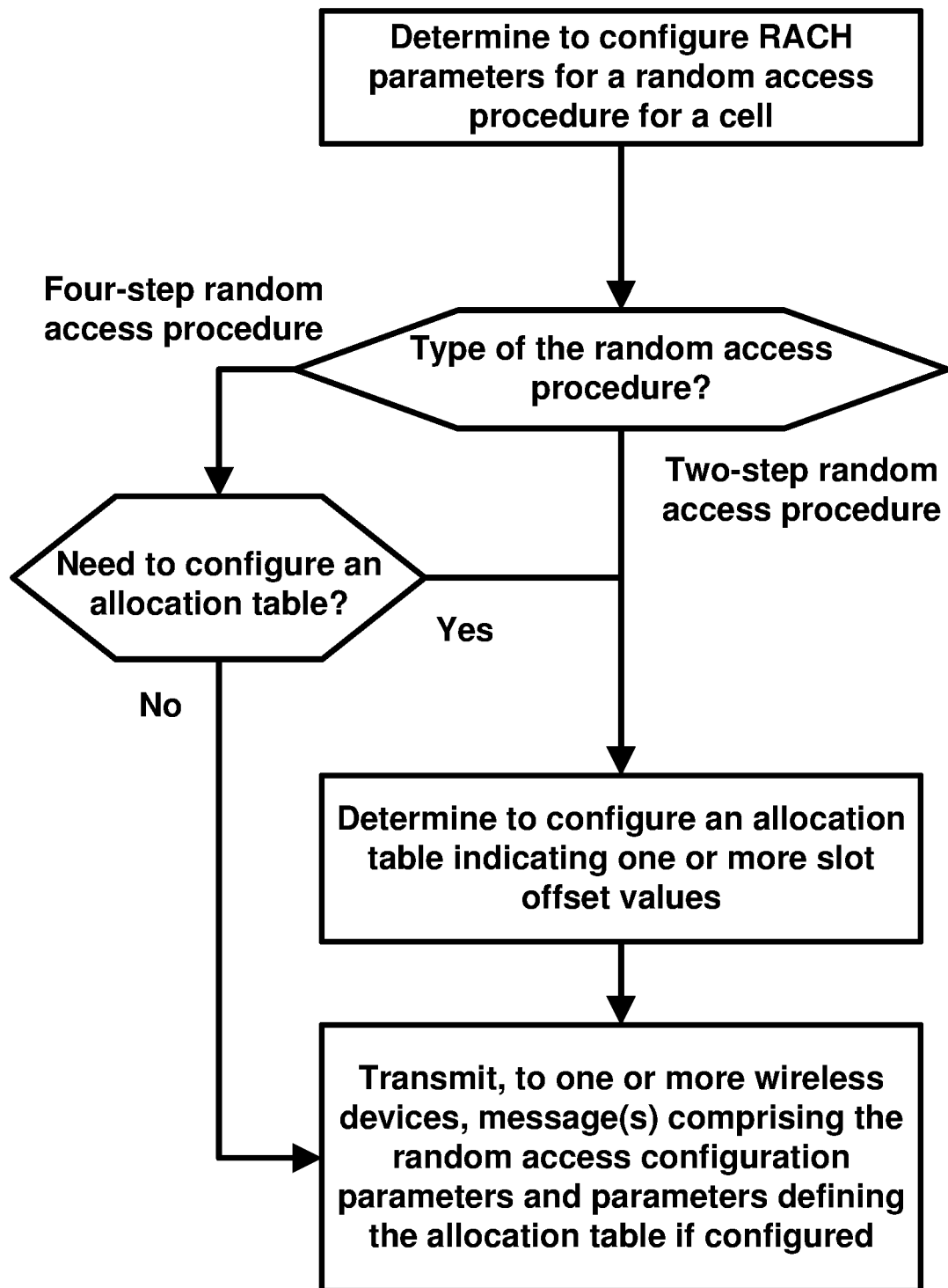
FIG. 35 is a flow diagram as per an aspect of an example embodiment of the present disclosure.

FIG. 35 is an example flow diagram for a base station. The base station may determine to (re)configure a random access procedure for a cell. The base station may determine to configures an allocation table, e.g., at least one pdsch-TimeDomainAllocation of pdsch-TimeDomainAllocationList, depending on a type of the random access procedure. For example, the base station determines to configures an allocation table, e.g., at least one pdsch-TimeDomainAllocation of pdsch-TimeDomainAllocationList, e.g., if the random access procedure is a two-step random access procedure. For example, at least one pdsch-TimeDomainAllocation may be cell specific and/or wireless device specific. For a four-step random access procedure, the base station may not configure the allocation table. For example, a base station configures the allocation table, e.g., if the base station needs flexibility in downlink scheduling, e.g., K0, S, and L values of predefined allocation table are not enough for flexible downlink scheduling. For example, a base station does not configure the allocation table, e.g., if K0, S, and L values of predefined allocation table are enough for flexible downlink scheduling. For example, the allocation table may be cell specific, e.g., pdsch-TimeDomainAllocationList in pdsch-ConfigCommon for the four-step random access procedure. The base station may transmit, to one or more wireless devices, message(s) comprising the random access configuration parameters for the cell and parameters defining the allocation table if configured.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 36:
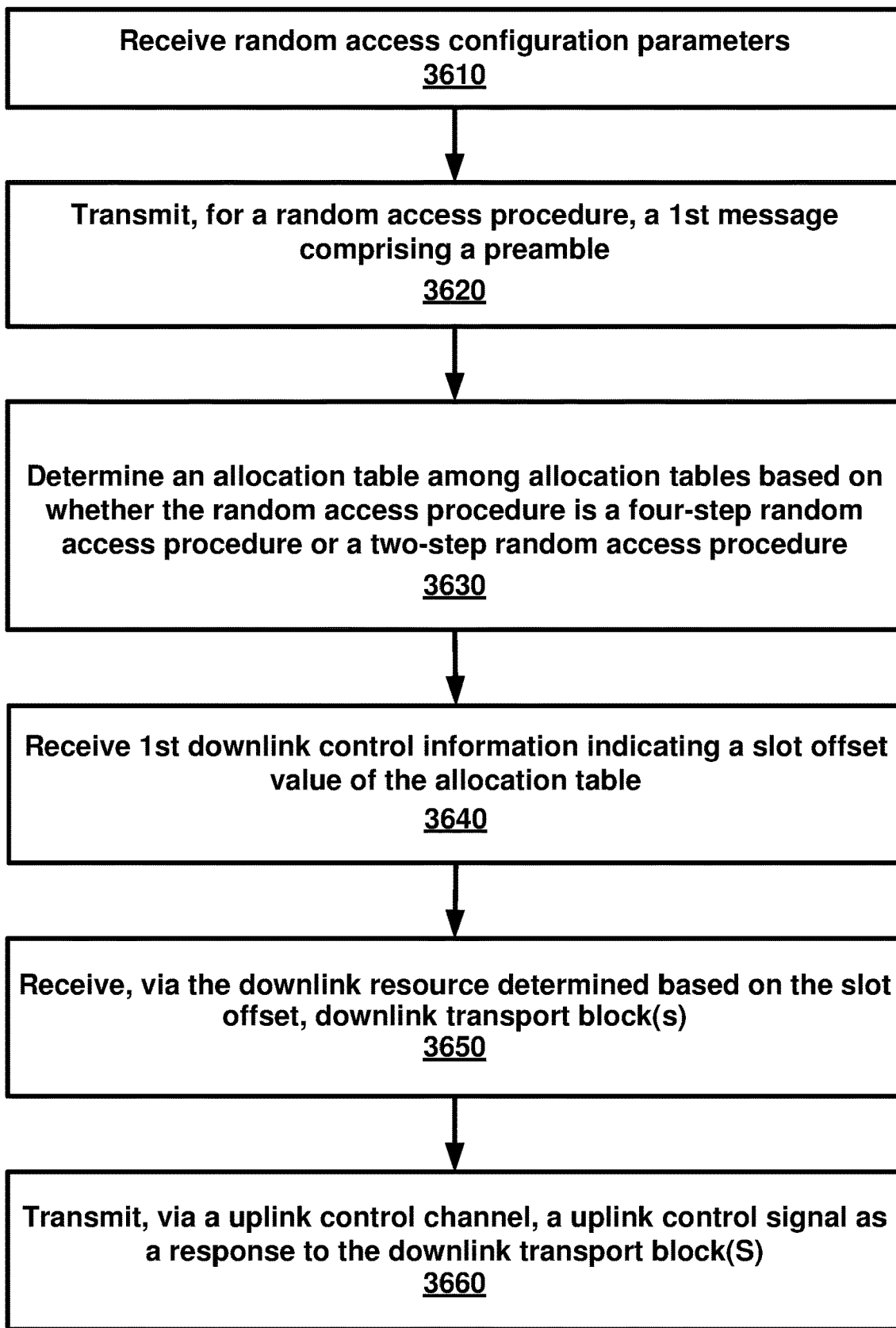
FIG. 36 is a flow diagram as per an aspect of an example embodiment of the present disclosure.

FIG. 36 is a flow diagram as per an aspect of an example embodiment of the present disclosure. At 3610, a wireless device may receive random access configuration parameters. At 3620, the wireless device may transmit, for a random access procedure, a first message comprising a preamble. At 3630, the wireless device may determine an allocation table among a plurality of allocation tables based on whether the random access procedure is a four-step random access procedure or a two-step random access procedure. At 3640, the wireless device may receive first downlink control information indicating a slot offset value of the allocation table. At 3650, the wireless device may receive, via a downlink resource determined based on the slot offset, one or more downlink transport blocks. At 3660, the wireless device may transmit, via an uplink control channel, an uplink control signal as a response to the one or more downlink transport blocks.

According to an example embodiment, based on determining the random access procedure being the two-step random access procedure, the first message may comprise one or more uplink transport blocks. According to an example embodiment, the one or more downlink transport blocks may be a medium access control random access response comprising a first response of the first message. According to an example embodiment, the wireless device may receive second downlink control information indicating a downlink assignment for receiving a second response of the first message. According to an example embodiment, the downlink assignment may indicate a second slot offset of the allocation table. According to an example embodiment, the downlink assignment may indicate a second slot offset of a second allocation table different from the allocation table. According to an example embodiment, the allocation table may be predefined. According to an example embodiment, the allocation table may be semi-statically configured.

Figure 37:
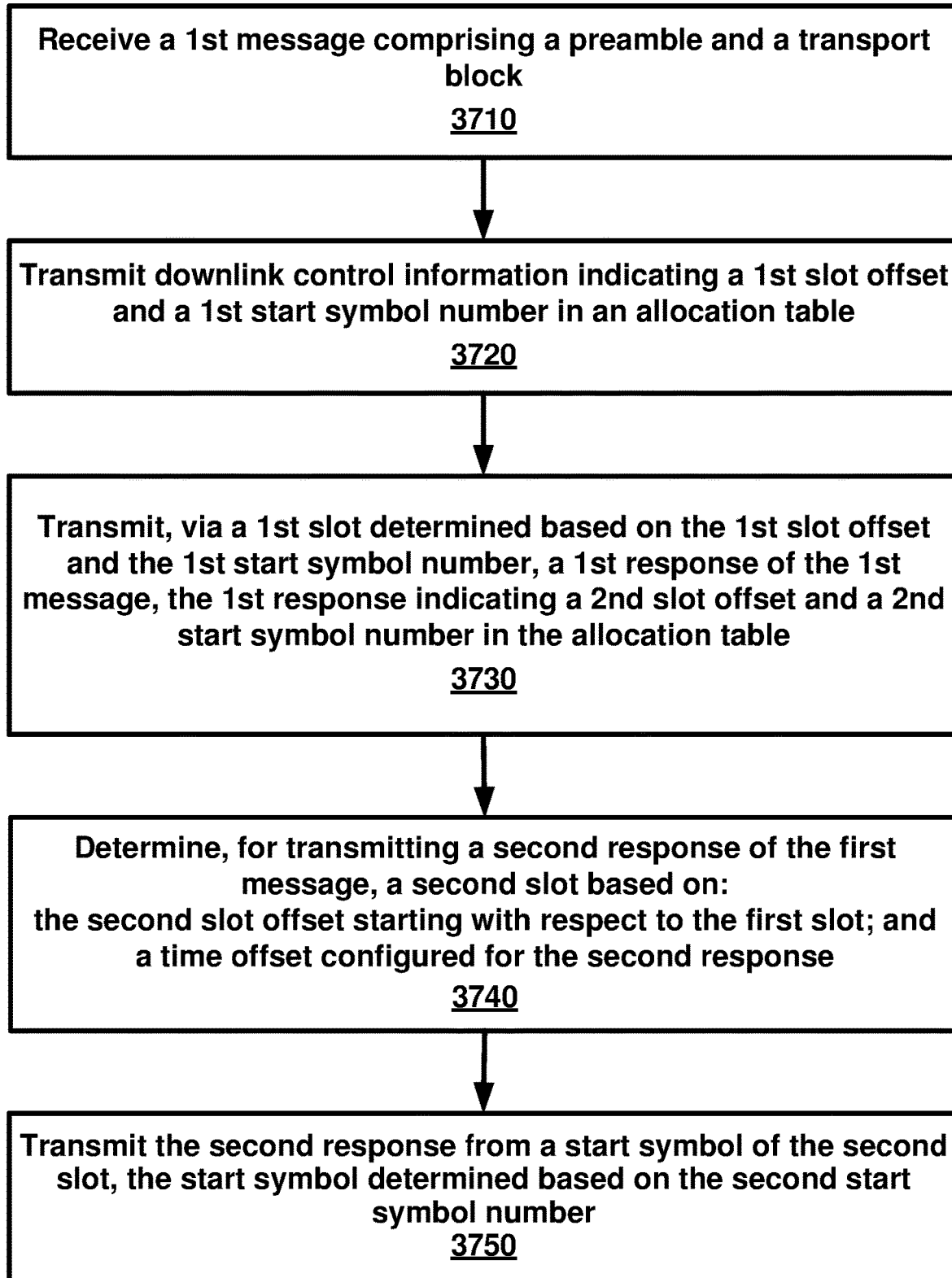
FIG. 37 is a flow diagram as per an aspect of an example embodiment of the present disclosure.

FIG. 37 is a flow diagram as per an aspect of an example embodiment of the present disclosure. At 3710, a base station may receive, from a wireless device, a first message comprising a preamble and a transport block. At 3720, the base station may transmit downlink control information indicating a first slot offset and a first start symbol number in an allocation table. At 3730, the base station may transmit, via a first slot determined based on the first slot offset and the first start symbol number, a first response of the first message. According to an example embodiment, the first response may indicate a second slot offset and a second start symbol number in the allocation table. At 3740, the base station may determine, for transmitting a second response of the first message, a second slot based on the second slot offset starting with respect to the first slot and/or a time offset for the second response. At 3750, the base station may transmit the second response from a start symbol of the second slot. According to an example embodiment, the start symbol may be determined based on the second start symbol number.

According to an example embodiment, the allocation table may be predefined for a two-step random access procedure. According to an example embodiment, the downlink control information may indicate a first row of the allocation table, the first row indicating the first slot offset and the first start symbol number. According to an example embodiment, the first response may indicate a second row of the allocation table, the second row indicating the second slot offset and the second start symbol number. According to an example embodiment, the time offset is defined based on at least one of one or more symbols and one or more slots. According to an example embodiment, the time offset may be predefined. According to an example embodiment, the time offset may be semi-statically configured. According to an example embodiment, the base station may determine, based on a first numerology used for transmitting the first response, at least one of one or more values as the time offset. According to an example embodiment, the at least one of the one or more values may be associated with the first numerology. According to an example embodiment, the base station may transmit random access configuration parameters for a two-step random access procedure. According to an example embodiment, the random access configuration parameters may indicate at least one random access channel for a transmission of the preamble and/or at least one uplink channel for a transmission of the transport block. According to an example embodiment, the base station may determine, based on one or more time and frequency resource indices of the at least one random access channel, a random access identifier used for transmitting the downlink control information. According to an example embodiment, the transport block may comprise a contention resolution identifier of the wireless device. According to an example embodiment, the first response may comprise the contention resolution identifier. According to an example embodiment, the base station may determine, based on the first response comprising at least one of a preamble identifier of the preamble and/or the contention resolution identifier, that the first response corresponds to the first message.

Figure 38:
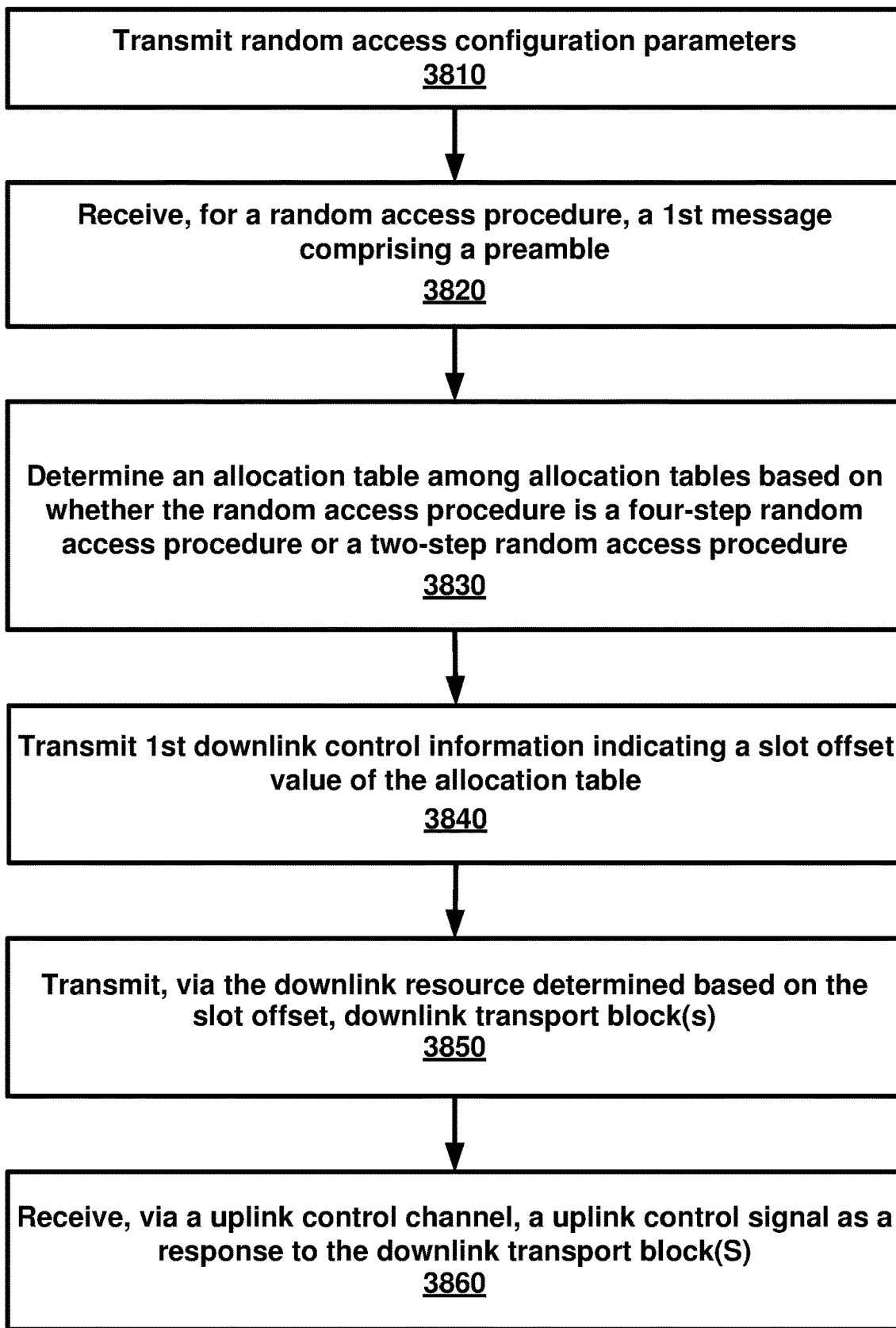
FIG. 38 is a flow diagram as per an aspect of an example embodiment of the present disclosure.

FIG. 38 is a flow diagram as per an aspect of an example embodiment of the present disclosure. At 3810, the base station may transmit, to a wireless device, random access configuration parameters. At 3820, the base station may receive, for a random access procedure, a first message comprising a preamble. At 3830, the base station may determine an allocation table among a plurality of allocation tables based on whether the random access procedure is a four-step random access procedure or a two-step random access procedure. At 3840, the base station may transmit first downlink control information indicating a slot offset value of the allocation table. At 3850, the base station may transmit, via a downlink resource determined based on the slot offset, one or more downlink transport blocks. At 3860, the base station may receive, via an uplink control channel, an uplink control signal as a response to the one or more downlink transport blocks.

According to an example embodiment, the first message may comprise one or more uplink transport blocks based on determining the random access procedure being the two-step random access procedure. According to an example embodiment, the one or more downlink transport blocks may be a medium access control random access response comprising a first response of the first message. According to an example embodiment, the base station may transmit second downlink control information indicating a downlink assignment for receiving a second response of the first message. According to an example embodiment, the downlink assignment may indicate a second slot offset of the allocation table. According to an example embodiment, the downlink assignment may indicate a second slot offset of a second allocation table different from the allocation table. According to an example embodiment, the allocation table may be predefined. According to an example embodiment, the allocation table may be semi-statically configured.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments.

If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state In this disclosure, various embodiments are disclosed. Limitations, features, and/or elements from the disclosed example embodiments may be combined to create further embodiments within the scope of the disclosure.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more (or at least one) message(s) comprise a plurality of parameters, it implies that a parameter in the plurality of parameters is in at least one of the one or more messages, but does not have to be in each of the one or more messages. In an example embodiment, when one or more (or at least one) message(s) indicate a value, event and/or condition, it implies that the value, event and/or condition is indicated by at least one of the one or more messages, but does not have to be indicated by each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (i.e. hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
   transmitting, by a wireless device, a first message, for a random access procedure, comprising a contention resolution identifier of the wireless device;
   receiving, via a first slot indicated by downlink control information (DCI), a first response of the first message, wherein the first response comprises the contention resolution identifier and indicates:
   a slot offset; and
   a start symbol; and
   receiving a second response of the first message from the start symbol of a second slot, wherein the second slot is based on a time offset and the slot offset with respect to the first slot.

2. The method of claim 1, wherein the slot offset is indicated in an allocation table.

3. The method of claim 1, further comprising determining the start symbol based on a start symbol number indicated in an allocation table.

4. The method of claim 1, wherein the slot offset starts with respect to the first slot.

5. The method of claim 1, further comprising determining the first slot based on:
   a first slot offset; and
   a first start symbol number.

6. The method of claim 5, wherein the DCI indicates one or both of the first slot offset and the first start symbol number in an allocation table.

7. The method of claim 1, wherein the random access procedure comprises a two-step random access procedure.

8. The method of claim 1, wherein the time offset is defined based on one or both of:
   one or more symbols; and
   one or more slots.

9. The method of claim 1, wherein the time offset is predefined or semi-statically configured.

10. The method of claim 1, further comprising determining, based on a first numerology used for receiving the first response, at least one of one or more values as the time offset, the at least one of the one or more values being associated with the first numerology.

11. A wireless device comprising:
one or more processors; and
memory storing instructions that, when executed by the one or more processors, cause the wireless device to:
transmit a first message, for a random access procedure, comprising a contention resolution identifier of the wireless device;
receive, via a first slot indicated by downlink control information (DCI), a first response of the first message, wherein the first response comprises the contention resolution identifier and indicates:
a slot offset; and
a start symbol; and
receive a second response of the first message from the start symbol of a second slot, wherein the second slot is based on a time offset and the slot offset with respect to the first slot.

12. The wireless device of claim 11, wherein the slot offset is indicated in an allocation table.

13. The wireless device of claim 11, wherein the instructions further cause the wireless device to determine the start symbol based on a start symbol number indicated in an allocation table.

14. The wireless device of claim 11, wherein the slot offset starts with respect to the first slot.

15. The wireless device of claim 11, wherein the instructions further cause the wireless device to determine the first slot based on:
a first slot offset; and
a first start symbol number.

16. The wireless device of claim 15, wherein the DCI indicates one or both of the first slot offset and the first start symbol number in an allocation table.

17. The wireless device of claim 11, wherein the random access procedure comprises a two-step random access procedure.

18. The wireless device of claim 11, wherein the time offset is defined based on one or both of:
one or more symbols; and
one or more slots.

19. The wireless device of claim 11, wherein the time offset is predefined or semi-statically configured.

20. A system comprising:
a base station; and
a wireless device comprising:
one or more processors; and
memory storing instructions that, when executed by the one or more processors, cause the wireless device to:
transmit, to the base station, a first message, for a random access procedure, comprising a contention resolution identifier of the wireless device;
receive, from the base station via a first slot indicated by downlink control information (DCI), a first response of the first message, wherein the first response comprises the contention resolution identifier and indicates:
a slot offset; and
a start symbol; and
receive, from the base station, a second response of the first message from the start symbol of a second slot, wherein the second slot is based on a time offset and the slot offset with respect to the first slot.

* * * * *